(12) United States Patent
Deore et al.

(10) Patent No.: US 11,940,634 B2
(45) Date of Patent: Mar. 26, 2024

(54) 3D PRINTED ANTENNA

(71) Applicant: National Research Council of Canada, Ottawa (CA)

(72) Inventors: Bhavana Deore, Ottawa (CA); Chantal Paquet, Ottawa (CA); Thomas Lacelle, Ottawa (CA); Patrick Roland Lucien Malenfant, Ottawa (CA); Rony Amaya, Kanata (CA); Joseph Hyland, Ottawa (CA)

( * ) Notice: Subject to any disclaimer, the term of this patent is extended or adjusted under 35 U.S.C. 154(b) by 239 days.

(21) Appl. No.: 17/635,745

(22) PCT Filed: Aug. 26, 2020

(86) PCT No.: PCT/IB2020/057971
§ 371 (c)(1),
(2) Date: Feb. 16, 2022

(87) PCT Pub. No.: WO2021/044258
PCT Pub. Date: Mar. 11, 2021

(65) Prior Publication Data
US 2022/0416424 A1 Dec. 29, 2022

Related U.S. Application Data

(63) Continuation-in-part of application No. PCT/IB2019/058923, filed on Oct. 18, 2019.
(Continued)

(51) Int. Cl.
*H01Q 1/40* (2006.01)
*B29C 64/124* (2017.01)
(Continued)

(52) U.S. Cl.
CPC .......... *G02B 3/0087* (2013.01); *B29C 64/124* (2017.08); *B29D 11/00355* (2013.01);
(Continued)

(58) Field of Classification Search
CPC ....... B33Y 10/00; B33Y 80/00; C08L 101/12; C08F 2/50; C08F 22/18; G02B 1/04;
(Continued)

(56) References Cited

U.S. PATENT DOCUMENTS 5,844,523 A * 12/1998 Brennan ............... H01Q 9/0407
343/846
6,433,936 B1 * 8/2002 Carpenter ............... B29C 67/04
264/2.7
(Continued)

FOREIGN PATENT DOCUMENTS

AU 2014302635 B2 12/2014
CN 105720362 A 6/2016
(Continued)

OTHER PUBLICATIONS

International Search Report and Written Opinion dated Dec. 1, 2020 on PCT/IB2020/057971.
(Continued)

*Primary Examiner* — Tho G Phan
(74) *Attorney, Agent, or Firm* — Brunet & Co. Ltd.; Hans Koenig; Robert Brunet

(57) ABSTRACT

An antenna and a formulation and method for making the antenna are disclosed. The antenna comprises: a first phase comprising at least one polymer; a second phase comprising at least one first component; and, optionally; and an interface between the first and second phases, wherein the interface has a concentration gradient of the at least one first component, whereby the concentration of the at least one first component decreases with distance away from the second phase towards the first phase, wherein the at least one first component comprises at least one functional component, at least one functional precursor component, or combinations thereof, and the at least one first component, in combination with the at least one polymer, has a high dielectric constant (Continued)

and/or a low dielectric loss tangent, wherein the antenna is a functional antenna, a functional precursor antenna, or a combination of a functional and functional precursor antenna.

25 Claims, 30 Drawing Sheets

Related U.S. Application Data

(60) Provisional application No. 62/923,136, filed on Oct. 18, 2019, provisional application No. 62/923,043, filed on Oct. 18, 2019, provisional application No. 62/923,103, filed on Oct. 18, 2019, provisional application No. 62/895,218, filed on Sep. 3, 2019.

(51) Int. Cl.
| | |
|---|---|
| *B29D 11/00* | (2006.01) |
| *B33Y 10/00* | (2015.01) |
| *B33Y 80/00* | (2015.01) |
| *C08F 2/50* | (2006.01) |
| *C08F 22/18* | (2006.01) |
| *G02B 1/04* | (2006.01) |
| *G02B 3/00* | (2006.01) |
| *H01Q 9/04* | (2006.01) |
| *H01Q 15/02* | (2006.01) |
| *B29K 33/00* | (2006.01) |

(52) U.S. Cl.
CPC ............... *B33Y 10/00* (2014.12); *B33Y 80/00* (2014.12); *C08F 2/50* (2013.01); *C08F 22/18* (2013.01); *G02B 1/04* (2013.01); *H01Q 9/04* (2013.01); *H01Q 15/02* (2013.01); *B29K 2033/08* (2013.01)

(58) Field of Classification Search
CPC ........ G02B 5/008; G02B 3/0087; H01B 1/12; H01Q 1/40; H01Q 1/52; H01Q 15/02; H01Q 9/04; B29C 64/124; B29D 11/00355
See application file for complete search history.

(56) References Cited

U.S. PATENT DOCUMENTS

| | | | |
|---|---|---|---|
| 9,882,271 B2 | 1/2018 | Lam et al. | |
| 9,887,356 B2 | 2/2018 | McAlpine et al. | |
| 10,109,920 B2* | 10/2018 | Shrekenhamer | H01Q 1/28 |
| 11,469,514 B2* | 10/2022 | Hugger | B33Y 70/10 |
| 11,721,888 B2* | 8/2023 | Yuan | C09D 181/02 |
| | | | 343/702 |
| 11,789,183 B2* | 10/2023 | Beadie | B29D 11/00355 |
| | | | 359/654 |
| 2012/0235879 A1 | 9/2012 | Eder et al. | |
| 2014/0265049 A1 | 9/2014 | Burris et al. | |
| 2015/0197063 A1 | 7/2015 | Shinar et al. | |
| 2015/0201499 A1 | 7/2015 | Shinar et al. | |
| 2016/0263823 A1 | 9/2016 | Espiau et al. | |
| 2017/0005403 A1 | 1/2017 | Lam et al. | |
| 2018/0217411 A1 | 8/2018 | Karlsen et al. | |
| 2018/0321659 A1 | 11/2018 | Dasappa et al. | |
| 2018/0345374 A1 | 12/2018 | Snis | |
| 2019/0013562 A1 | 1/2019 | Rusch et al. | |
| 2019/0054659 A1 | 2/2019 | Tseng et al. | |
| 2019/0103680 A1 | 4/2019 | Liao et al. | |
| 2019/0110366 A1 | 4/2019 | Gavagnin et al. | |
| 2019/0123448 A1 | 4/2019 | Taraschi et al. | |
| 2019/0168445 A1 | 6/2019 | Jara Rodelgo et al. | |
| 2019/0210278 A1 | 7/2019 | Hikmet et al. | |
| 2019/0232551 A1 | 8/2019 | Van Zak et al. | |
| 2019/0277475 A1 | 9/2019 | Hikmet et al. | |
| 2019/0305435 A1 | 10/2019 | Robinson et al. | |

FOREIGN PATENT DOCUMENTS

| | | |
|---|---|---|
| WO | 2015/157548 A1 | 10/2015 |
| WO | 2017/079130 A1 | 5/2017 |
| WO | 2018/076110 A1 | 5/2018 |
| WO | 2018/093625 A1 | 5/2018 |
| WO | 2018/194583 A1 | 10/2018 |
| WO | 2018/204124 A1 | 11/2018 |

OTHER PUBLICATIONS

Espalin D, et al. Int J Adv Manuf Technol (2014) 72:963-978.
Haghzadeh M, et al. IEEE Transactions On Microwave Theory and Techniques, vol. 65, No. 6, Jun. 2017, 2030-2042.
Huang Y, et al. Layer-by-Layer Stereolithography of Three-Dimensional Antennas. 0-7803-8883-6/05 (2005) IEEE, 276-279.
Kaur A, et al. International Journal of Engineering Science and Computing, Mar. 2018, 16582-16586.
Lee Y, et al. Microwave and Optical Technology Letters, vol. 50, No. 8, Aug. 2008, 2131-2135.
Lei W, et al. Design of Dual-Linearly-Polarized Microstrip Array with Composite Right/Left-handed Transmission Line as Feed Line. 1-4244-0123-2/06 (2006) IEEE, 1511-1514.
Li Y, et al. IEEE Antennas and Wireless Propagation Letters, vol. 16, 2017, 657-660.
Liu B, ete al. IEEE Transactions On Microwave Theory and Techniques, vol. 52, No. 11, Nov. 2004, 2567-2575.
Maas J, et al. Proceedings of the IEEE, vol. 105, No. 4, Apr. 2017, 645-654.
Pan C-W, et al. Microwave Focusing Lenses by Synthesized with Positive or Negative Refractive Index Split-Ring Resonator Metamaterials. (2020) IEEE.
Tai Y, et al. Materials Letters 180 (2016) 144-147.
Zhang B, et al. IEEE Transactions On Components, Packaging and Manufacturing Technology, vol. 6, No. 5, May 2016, 796-804.

* cited by examiner

3D PRINTED ANTENNA

CROSS-REFERENCE TO RELATED APPLICATIONS

This application claims the benefit of, and priority from, the following applications, all of which applications are incorporated herein by reference in their entirety: U.S. Provisional Patent Application No. 62/895,218, filed on Sep. 3, 2019; U.S. Provisional Patent Application No. 62/923,136, filed on Oct. 18, 2019; U.S. Provisional Patent Application No. 62/923,103, filed on Oct. 18, 2019; U.S. Provisional Patent Application No. 62/923,043, filed on Oct. 18, 2019; and PCT Patent Application PCT/IB2019/058923, filed on Oct. 18, 2019.

FIELD

The present invention relates to antennas. Specifically, the present invention relates to methods to fabricate antennas for 5G networks.

BACKGROUND

At the high frequencies used by 5G networks, dielectric loss is significant for electromagnetic structures. These losses cause the size of antennas for 5G networks to be limited to keep losses at a minimum. Existing antennas are typically planar using printed circuit board processes for fabrication, which also contribute to such losses.

Current 3D printing techniques for antennas create antenna scaffolds or structures which are subsequently coated in a metal conductor, for example, by electrolysis deposition. Coatings may be inconsistent and may degrade over time and use.

The background herein is included solely to explain the context of the disclosure. This is not to be taken as an admission that any of the material referred to was published, known, or part of the common general knowledge as of the priority date.

SUMMARY

In accordance with an aspect, there is provided an antenna comprising: i) a first phase comprising at least one polymer; ii) a second phase comprising at least one first component; and, optionally, iii) an interface between the first phase and the second phase, wherein the interface has a concentration gradient of the at least one first component, whereby the concentration of the at least one first component decreases with distance away from the second phase towards the first phase, wherein the at least one first component comprises at least one functional component, at least one functional precursor component, or combinations thereof, and the at least one first component, in combination with the at least one polymer, has a high dielectric constant and/or a low dielectric loss tangent, wherein the antenna is a functional antenna, a functional precursor antenna, or a combination of a functional and functional precursor antenna.

In accordance with another aspect, there is provided a formulation for making an antenna, the formulation being capable of making an antenna having a low dielectric loss, a high gain, and/or tunable permittivities.

In accordance with another aspect, there is provided formulation for making an antenna, the formulation comprising a composition providing a high dielectric constant and/or a low dielectric loss tangent, the composition having at least one first component and at least one polymerizable component, the at least one polymerizable component being polymerizable to form at least one polymer, wherein at least two phases are formed from the at least one first component and the at least one polymer, wherein the at least one first component comprises at least one functional component, at least one functional precursor component, or combinations thereof, wherein the antenna is a functional antenna, a functional precursor antenna, or a combination of a functional and functional precursor antenna.

In accordance with another aspect, there is provided a method for making an antenna, the method comprising: a) combining at least one first component and at least one polymerizable component to form a formulation having a high dielectric constant and/or a low dielectric loss tangent; and b) polymerizing the at least one polymerizable component to form at least one polymer, wherein at least two phases are formed from the at least one first component and the at least one polymer, wherein the at least one first component comprises at least one functional component, at least one functional precursor component, or combinations thereof, and wherein the antenna is a functional antenna, a functional precursor antenna, or a combination of a functional and functional precursor antenna.

It is understood that one or more of the aspects described herein (and above) may be combined in any suitable manner. The novel features of the present invention will become apparent to those of skill in the art upon examination of the following detailed description of the invention. It should be understood, however, that the detailed description of the invention and the specific examples presented, while indicating certain aspects of the present invention, are provided for illustration purposes only because various changes and modifications within the spirit and scope of the invention will become apparent to those of skill in the art from the detailed description of the invention and claims that follow.

BRIEF DESCRIPTION OF THE DRAWINGS

The present invention will be further understood from the following description with reference to the Figures, in which.

DETAILED DESCRIPTION OF CERTAIN ASPECTS

Definitions

Figure 1:
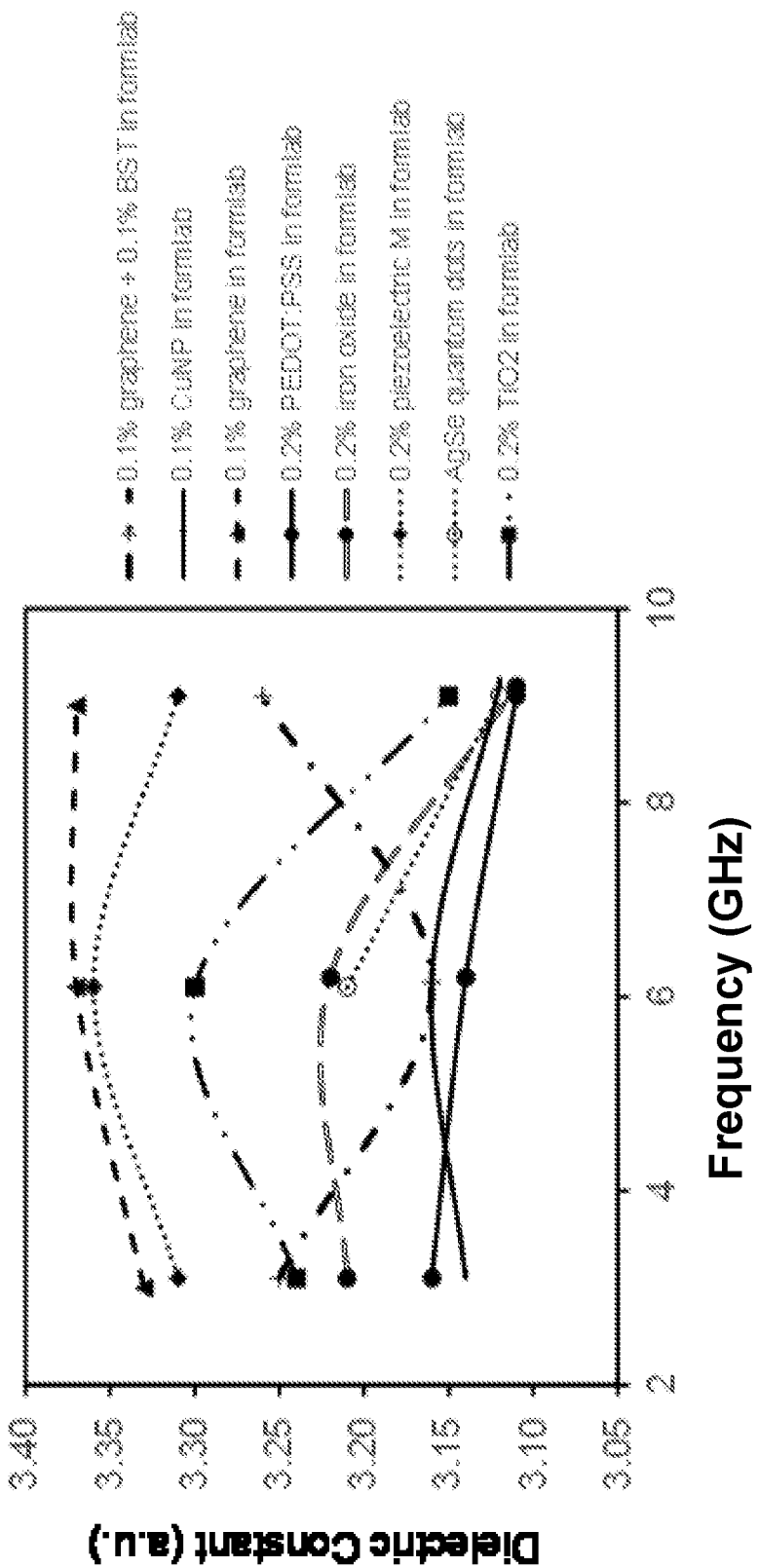
FIG. 1 shows a chart for the dielectric constant vs. frequency for the formulations of Examples 1-8.

Unless otherwise explained, all technical and scientific terms used herein have the same meaning as commonly understood by one of ordinary skill in the art to which this disclosure belongs. Although any methods and materials similar or equivalent to those described herein can be used in the practice for testing of the present invention, the typical materials and methods are described herein. In describing and claiming the present invention, the following terminology will be used.

It is also to be understood that the terminology used herein is for the purpose of describing particular aspects only and is not intended to be limiting. Patent applications, patents, and publications are cited herein to assist in understanding the aspects described. All such references cited herein are incorporated herein by reference in their entirety and for all purposes to the same extent as if each individual publication or patent or patent application was specifically and individually indicated to be incorporated by reference in its entirety for all purposes. To the extent publications and patents or patent applications incorporated by reference contradict the disclosure contained in the specification, the specification is intended to supersede and/or take precedence over any such contradictory material.

In understanding the scope of the present application, the articles "a", "an", "the", and "said" are intended to mean that there are one or more of the elements. Additionally, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives.

It will be understood that any aspects described as "comprising" certain components may also "consist of" or "consist essentially of," wherein "consisting of" has a closed-ended or restrictive meaning and "consisting essentially of" means including the components specified but excluding other components except for materials present as impurities, unavoidable materials present as a result of processes used to provide the components, and components added for a purpose other than achieving the technical effect of the invention. For example, a composition defined using the phrase "consisting essentially of" encompasses any known acceptable additive, excipient, diluent, carrier, and the like. Typically, a composition consisting essentially of a set of components will comprise less than 5% by weight, typically less than 3% by weight, more typically less than 1%, and even more typically less than 0.1% by weight of non-specified component(s).

It will be understood that any component defined herein as being included may be explicitly excluded from the claimed invention by way of proviso or negative limitation.

In addition, all ranges given herein include the end of the ranges and also any intermediate range points, whether explicitly stated or not.

Terms of degree such as "substantially", "about" and "approximately" as used herein mean a reasonable amount of deviation of the modified term such that the end result is not significantly changed. These terms of degree should be construed as including a deviation of at least ±5% of the modified term if this deviation would not negate the meaning of the word it modifies.

The abbreviation, "e.g." is derived from the Latin exempli gratia, and is used herein to indicate a non-limiting example. Thus, the abbreviation "e.g." is synonymous with the term "for example." The word "or" is intended to include "and" unless the context clearly indicates otherwise.

The phrase "at least one of" is understood to be one or more. The phrase "at least one of . . . and . . . " is understood to mean at least one of the elements listed or a combination thereof, if not explicitly listed. For example, "at least one of A, B, and C" is understood to mean A alone or B alone or C alone or a combination of A and B or a combination of A and C or a combination of B and C or a combination of A, B, and C. "At least one of at least one of A, at least one of B, and at least one of C" is understood to mean at least one of A alone or at least one of B alone or at least one of C alone or a combination of at least one of A and at least one of B or a combination of at least one of A and at least one of C or a combination of at least one of B and at least one of C or a combination of at least one of A, at least one of B, and at least one of C.

The term "composition" is understood to mean having two or more components/elements.

The term "a substantially homogeneous mixture" is understood to mean a substantially uniform mixture or combination of components.

The term "morphology" is understood to mean a shape and size of an area or a volume (e.g. the texture or topography of a surface; the habit of a crystal; the distribution of phases in a material).

The term "phase" is interchangeably used herein with "morphology", "layer", "zone", and/or "structure". These terms are understood to mean a region of a functional antenna and/or a functional precursor antenna having an area or volume of material with relatively uniform chemical and/or physical properties. For example, one phase or region may have uniform chemical and/or physical properties and another phase or region may have different uniform chemical and/or physical properties. It is understood that a given phase or region having relatively uniform chemical and/or physical properties can, but does not necessarily require, homogeneity throughout the phase. An interface between phases may also constitute a distinct phase. For example, a phase may have a component present in amounts falling within a desired concentration range. Alternatively, there may be a variation in the degree of polymer cross-linking in a phase to provide a desired level of flexibility, rigidity or other property to a functional antenna. Phases may arise from printing using distinct formulations, in sequence, to produce distinct regions, or may arise out of polymerization processes designed to result in antenna component phase separation, or a concentration gradient. In this regard, phases may be characterized according to one or more chemical and/or physical properties having regard to one or more components in order to delineate between phases/regions of a functional antenna and/or a functional precursor antenna. A combination of one or more phases/regions may be considered a single concentration gradient. In the context of an intermediate or final antenna structure, there may be one or more phases.

The term "resin" is understood to be a solid or viscous material which provides a polymer after polymerization via, for example, curing.

The term "concentration gradient" is understood to be spatial positioning of one or more molecules/ions from a region having a higher concentration of the one or more molecules/ions to a region having a lower concentration of the one or more molecules/ions.

The term "functional antenna" is considered herein to be an antenna that performs at least one function. It may encompass an antenna that has, for example, one or more chemical, mechanical (including structural), magnetic, thermal, electrical, optical, electrochemical, protective, and catalytic properties. It could also, or instead, include a antenna that has an aesthetically pleasing property. Functional antennas can include a functional material such as a functionally graded material (FGM), and more specifically, a functionally graded composite material (FGCM). FGMs may be applied in a variety of industries, including, for example, aerospace, automobile, biomedical, defence, electrical/electronic, energy, marine, mining, opto-electronics, thermoelectronics, dentistry, and sports. FGMs may be used under a variety of conditions, including extreme temperature and wear conditions.

The term "interface", "functional interface" or "functional precursor interface" refers to a region or surface of a functional and/or functional precursor antenna, which can include a surface of an intermediate antenna in or comes into contact with another region/phase/material. For example, the interface may be a functional and/or functional precursor coating on the antenna (e.g at an exterior surface) or as a layer/region within the antenna. The antenna may be an intermediate antenna, which is further processed (e.g. further layered/coated) such that the exterior surface now acts as an interface between the intermediate antenna and the additional layer/coating. In another example, the interface may be a graded functional and/or functional precursor material, the interface may be the region of the antenna where there is a certain concentration range of functional and/or functional precursor components to provide a function of the antenna. In a further example, the interface may be a functional and/or functional precursor composite material, the interface may be the region of the antenna where the composite provides a function of the antenna.

The term "particle" refers to a particle with any suitable size. In embodiments, the particle has an average particle size of about 10 nm to about 150 µm in diameter, for example, ranging from about 10 nm to about 100 µm; about 25 nm to about 100 µm; about 10 nm to about 50 µm; about 25 nm to about 50 µm; about 10 nm to about 25 µm; about 25 nm to about 25 µm; about 10 nm to about 10 µm; about 25 nm to about 10 µm; about 10 nm to about 5 µm; about 25 nm to about 5 µm; about 10 nm to about 2.5 µm; about 25 nm to about 2.5 µm; about 10 nm to about 500 nm; about 25 nm to about 500 nm; about 10 nm to about 250 nm; about 25 nm to about 250 nm; about 10 nm to about 100 nm; about 25 nm to about 100 nm; or about 50 nm to about 100 nm. The term "particle" as used herein thus includes "nanoparticle," which is considered herein to be a particle having a diameter less than about 1000 nm, and "microparticle," considered herein to be a particle having a diameter ranging from about 1 µm to about 1000 µm. In some embodiments, the particles described herein can be any shape, including generally spherical.

The term "coating" refers to a substantially homogenous layer (2D or 3D) or region within or on a antenna.

The term "functional coating" or "functional precursor coating" refers to a substantially homogenous layer (2D or 3D) or region of one or more functional and/or functional precursor components within or on a functional and/or functional precursor antenna. For example, the coating is a substantially homogenous layer (2D or 3D) of one or more functional and/or functional precursor components at or is an interface of the antenna. In another example, the coating of functional and/or functional precursor component(s) may be layered on a polymer (e.g. matrix or scaffold) but the coating (e.g. nanoparticles or a distinct polymer coating of functional and/or functional precursor components) itself is not per se distributed within (e.g. incorporated in) the polymer.

The term "graded" refers to the presence of a concentration gradient of one or more components. For example, a concentration gradient of one or more functional and/or functional precursor components, where the highest concentration of one or more of the functional and/or functional precursor components is at an interface of a antenna. In embodiments, the components of a concentration gradient are distributed within a polymer (e.g. matrix or scaffold) of the antenna and such non-homogenous graded functional and/or functional precursor material may exhibit changes in microstructures and/or composition through different regions of the antenna. The concentration gradient of a given component may change uniformly or change from shallow to steeper gradients (and vice-versa) through different regions of an antenna.

The term "composite" refers to a material made from two or more different components having different physical and/or chemical properties that, when combined, produce a material with characteristics different from the individual components themselves. The individual components remain as individual components within the antenna. For example, the functional and/or functional precursor antennas may have regions (e.g. functional and/or functional precursor interface) or phases of one or more functional and/or functional precursor components that are not phase separated from a polymer (e.g. matrix or scaffold), and that are not distributed in a polymer as a concentration gradient. In another example, the functional and/or functional precursor antennas may have regions (e.g. functional and/or functional precursor interface) or phases of one or more functional and/or functional precursor components at a functional interface that are not phase separated from a polymer (e.g. matrix or scaffold), and that are not distributed in a polymer as a concentration gradient. In certain embodiments, composite concentrations and distributions of functional and/or functional precursor components are substantially the same as the starting composition of components prior to polymerization of a polymerizable component (e.g. resin) to form the polymer (e.g. matrix or scaffold) of the antenna.

The term "functional group" refers to a specific group of atoms that has its own characteristic properties, regardless of the other atoms present in a compound. Common examples are alkenes, alkynes, alcohols, amines, amides, carboxylic acids, ketones, esters, epoxides, and ethers.

As used herein, the term "dielectric constant" or "relative permittivity" are used interchangeably and refers to how easily a material can become polarized by imposition of an electric field on an insulator. Relative permittivity is the ratio of "the permittivity of a substance to the permittivity of space or vacuum". Relative permittivity can be expressed as $\varepsilon_r = E\varepsilon/\varepsilon_0$, where $\varepsilon_r$=relative permittivity, $\varepsilon$=permittivity of substance, and $\varepsilon_0$=permittivity of vacuum or free space $(8.854187817 \times 10^{-12}$ F/m)

As used herein, the term "dielectric loss" refers to a dielectric material's inherent dissipation of electromagnetic energy (e.g. heat). It can be parameterized in terms of a dielectric loss tangent (tan δ). The dielectric loss tangent (tan δ) of a material denotes quantitatively dissipation of the electrical energy due to different physical processes such as electrical conduction, dielectric relaxation, dielectric resonance and loss from non-linear processes.

It is further to be understood that all molecular weight or molecular mass values, are approximate and are provided for description. Although methods and materials similar or equivalent to those described herein can be used in the practice or testing of this disclosure, suitable methods and materials are described below.

3D Printed Antennas 3D printing using a formulation to provide an antenna having a low dielectric loss, a high gain, and/or tunable permittivities. A low dielectric loss may be in the range of about 0 to about 10%. A high gain may be in the range of about 0 to about 6 dB. A high permittivity may be in the range of about 1 to about 5. Such antennas may be useful for 5G applications. In general, the formulations may provide performance antennas 3D printed in a fast and cost-effective manner. Multiple material formulations combined with 3D printing techniques as stereolithographic analysis (SLA) and digital light processing (DLP), may allow for improved antennas to be printed, for example, without a separate metal coating step. 3D printing using the formulations described herein may allow an antenna to be designed to be suspended in air to reduce signal losses in the substrate.

Figure 2:
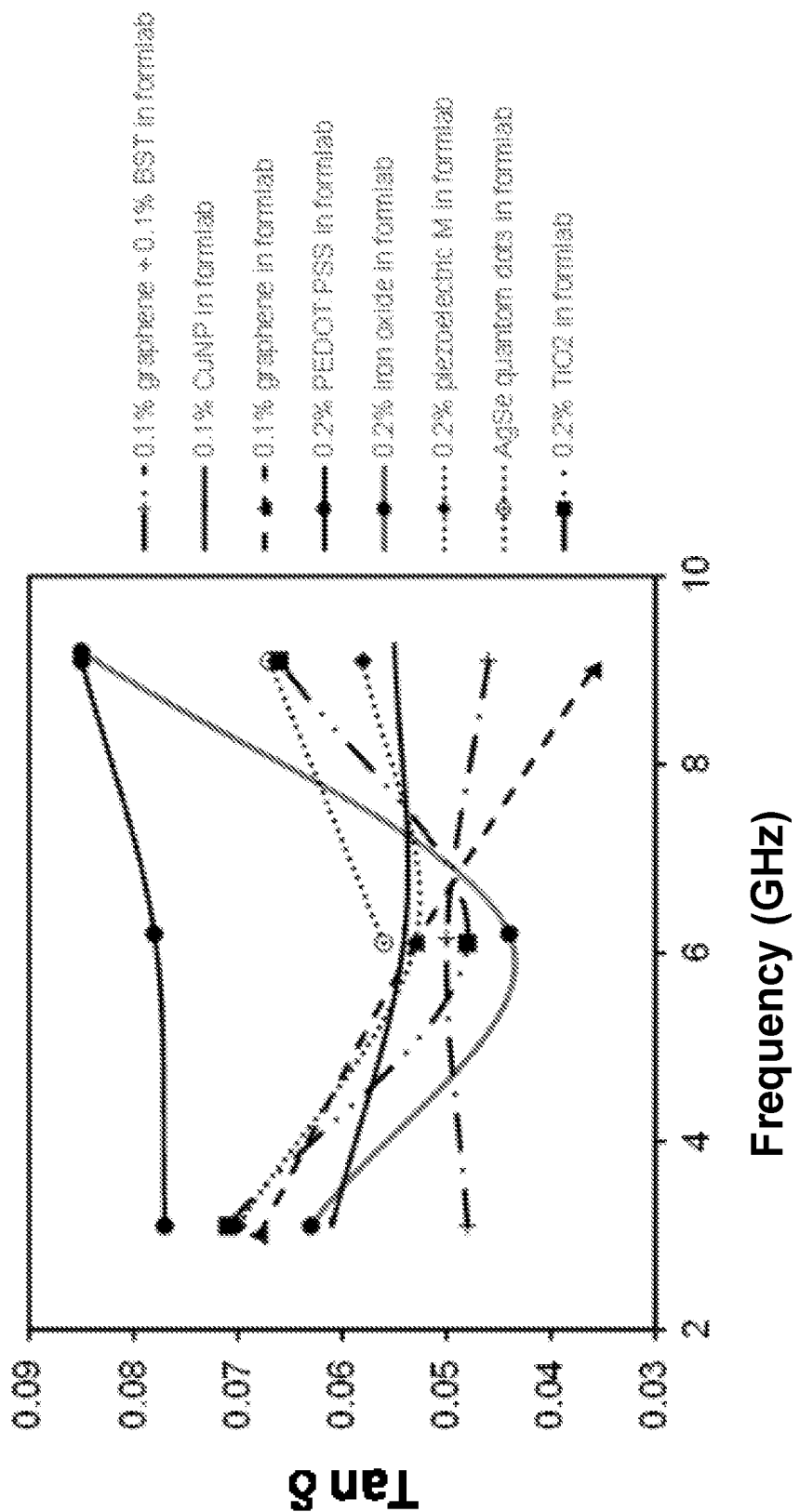
FIG. 2 shows a chart for the loss tangent vs. frequency for the formulations of Examples 1-8.

The formulations that may be used have a high dielectric constant and/or a low dielectric loss tangent. More specifically, the formulation may have a high dielectric constant and a low dielectric loss tangent. In an example, a formulation with a high dielectric constant may be in the range of about 1 to about 5, and a formulation with a low loss tangent may be in the range of about 0.0001 to about 0.05. FIGS. 1 and 2 show examples of formulations for 3D printing antennas, showing the dielectric constants and dielectric loss tangent thereof.

FIG. 1 and FIG. 2 show the measurement of relevant parameters such as dielectric constants and loss tangents, respectively, of various dielectric materials (e.g. at least one first component) dispersed into a polymer to obtain materials with high dielectric permittivity and low loss for 3D printing antennas. Each dielectric material has different characteristic properties.

Ceramic based dielectric materials have high dielectric constants and have been used to create polymer-based dielectric materials with high permittivity. As seen in FIGS. 1 and 2, graphene and ferroelectric material BST have high dielectric constant and low loss. When the at least one first component (e.g. conducting material such as graphene) is added to a polymer matrix, the dielectric constant of the matrix is enhanced dramatically with an increasing amount of graphene until the content is below a percolation threshold. In light of the percolation phenomenon, a sudden increase in the composite permittivity (e.g. about one or even several orders of magnitude) occurs when the loading of conducting materials reaches a critical value, i.e. the percolation threshold.

Ferroelectric material, such as BST, has a high dielectric constant. The high dielectric constant reflects that ferroelectrics have spontaneous polarization below the ordering temperature. A small electric field suffices to create large polarization. In a linear response regime that means the susceptibility of the material is very high. The susceptibility is directly proportional to the dielectric constant. Antennas made with a ferroelectric component can be addressed electrically or magnetically during variable environmental and operational conditions.

The formulations can act as the physical scaffold to a conductor material. With a formulation having a high dielectric constant and low dielectric loss tangent, antennas may be made smaller and radiate more efficiently. Certain formulations may allow the fabrication of high permittivity substrates which may be used to make antennas physically smaller while maintaining electrical size.

Formulations that incorporate material with tunable permittivity, such as ferroelectric materials, may allow an antenna to be tuned post fabrication in real time. Other formulations may, upon printing, the metal particles therein migrate to the surface of the printed antenna. In this fashion, antennas with a metal finish can be generated without a separate coating step (e.g. dipping the antenna in a metal solution). In other words, there is no need to plate the resultant antenna with a conductor. This may result in better adhesion and the metal finish produced may be more uniform in comparison to other coating processes.

Certain formulations described herein may provide tunability of a substrate permittivity to allow the radiation pattern of the centre frequency of an antenna to be controlled post fabrication or in real time. 3D printing may also allow for suspended structures otherwise not available on standard laminates. 3D printing may also allow the addition of embedded conductive structures (metamaterials) within the substrate to control the permittivity.

To fabricate an antenna, any 3D printing method utilizing the formulations described herein. In embodiments, the methods may include, but are not limited to:
  a) Generating a formulation that may be 3D printed and contains functional materials (with or without metal precursor);
  b) In parallel, designing an antenna structure that accounts for the material properties of the formulation and takes advantage of the 3D printing process;
  c) Print the antenna design;
  d) In the case of the formulation containing the metal precursor, sintering to convert the metal precursor to a metal;
  e) Assembling into a device, an antenna and make the appropriate measurements (reflection and radiation pattern) to verify operation.

The formulations described herein may be used for making various types of antennas. Examples include: 3D printed antennas suspended in air, Vivaldi antenna, low loss suspended antennas such as conformal helical antennas, electrically small suspended antenna coils, 3D suspended antenna feeding surface integrated waveguide (SIW) networks, Ultra-Large Arrays (ULA) of antennas, Frequency Selective Structures (FSS), and/or 3D suspended Metasurfaces and conformal 3D reflect arrays.

Figure 5:
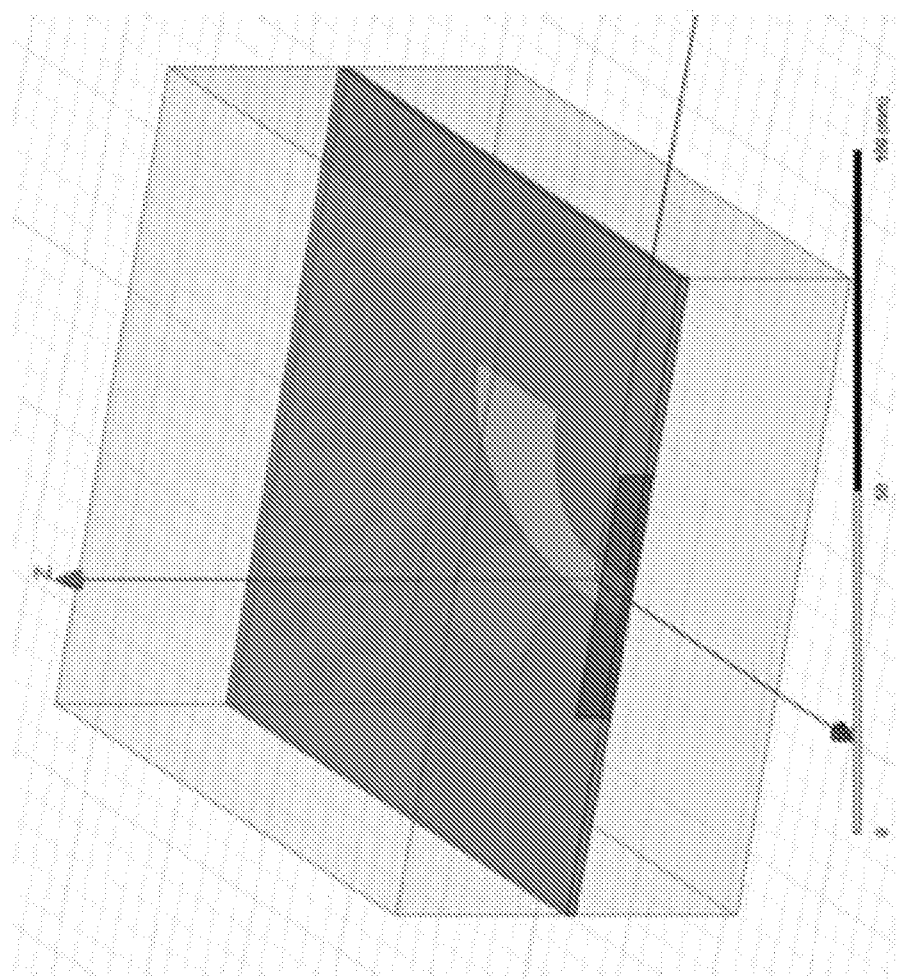
FIG. 5 shows a simulated Vivaldi antenna, which was 3D printed using the formulation of Example 1.
Figure 6:
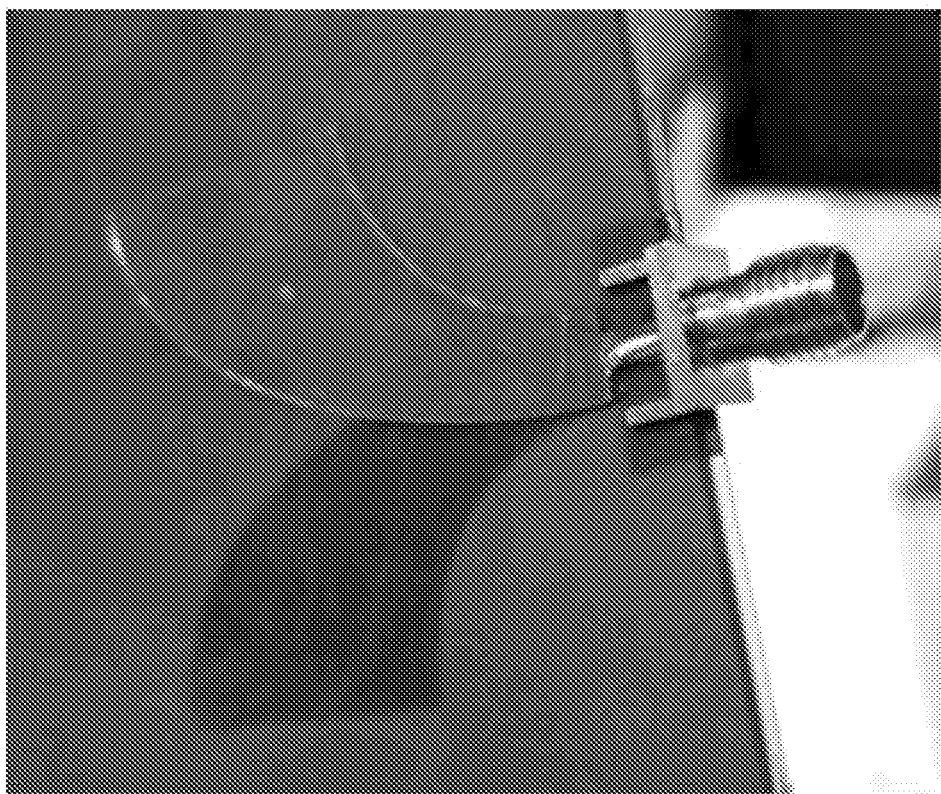
FIG. 6 shows a photograph of a fabricated Vivaldi antenna, which was 3D printed using the formulation of Example 1.

To demonstrate the suitability of 3D printed formulations for antenna applications, a 2D Vivaldi antenna was fabricated on a 3D printed graphene plus BST substrate. A Vivaldi antenna is a planar broadband antenna, which can be made from a solid piece of sheet metal, a printed circuit board, or from a dielectric plate metalized on one or both sides. A Vivaldi antenna is used since the design utilizes dielectric reflectors, which re-shape or focus an existing antenna design by simply changing: a) air hole concentration, b) adding metallic floating pins, controlling the depth that the metal is allowed to interact with the polymer. FIG. 5 shows the simulated Vivaldi antenna. This simulation performed using Ansys HFSS. FIG. 6 shows the fabricated Vivaldi antenna from Example 1.

Figure 7:
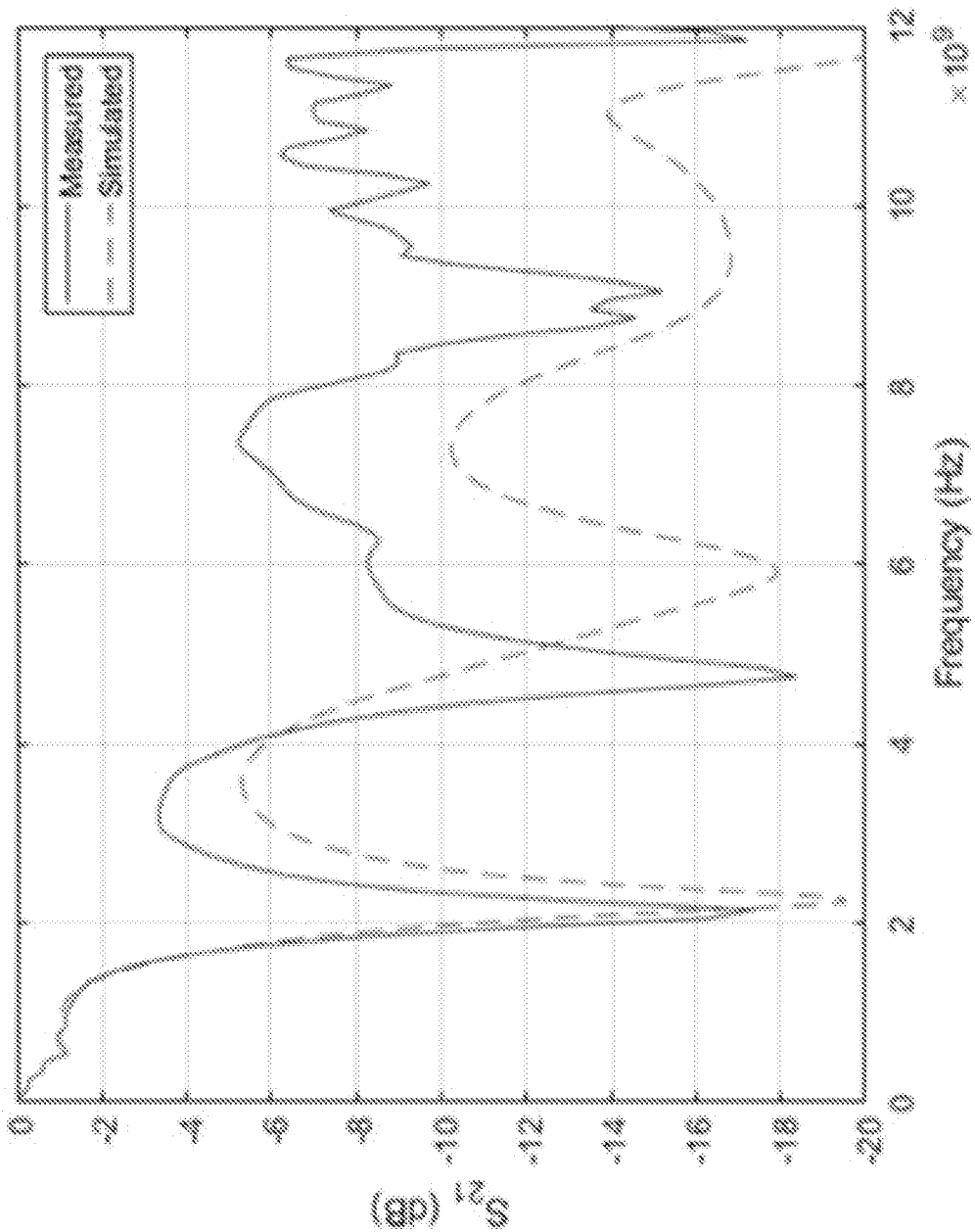
FIG. 7 shows a graph depicting the simulated and measured reflection for Vivaldi antenna, which was 3D printed using the formulation of Example 1.
Figure 8:
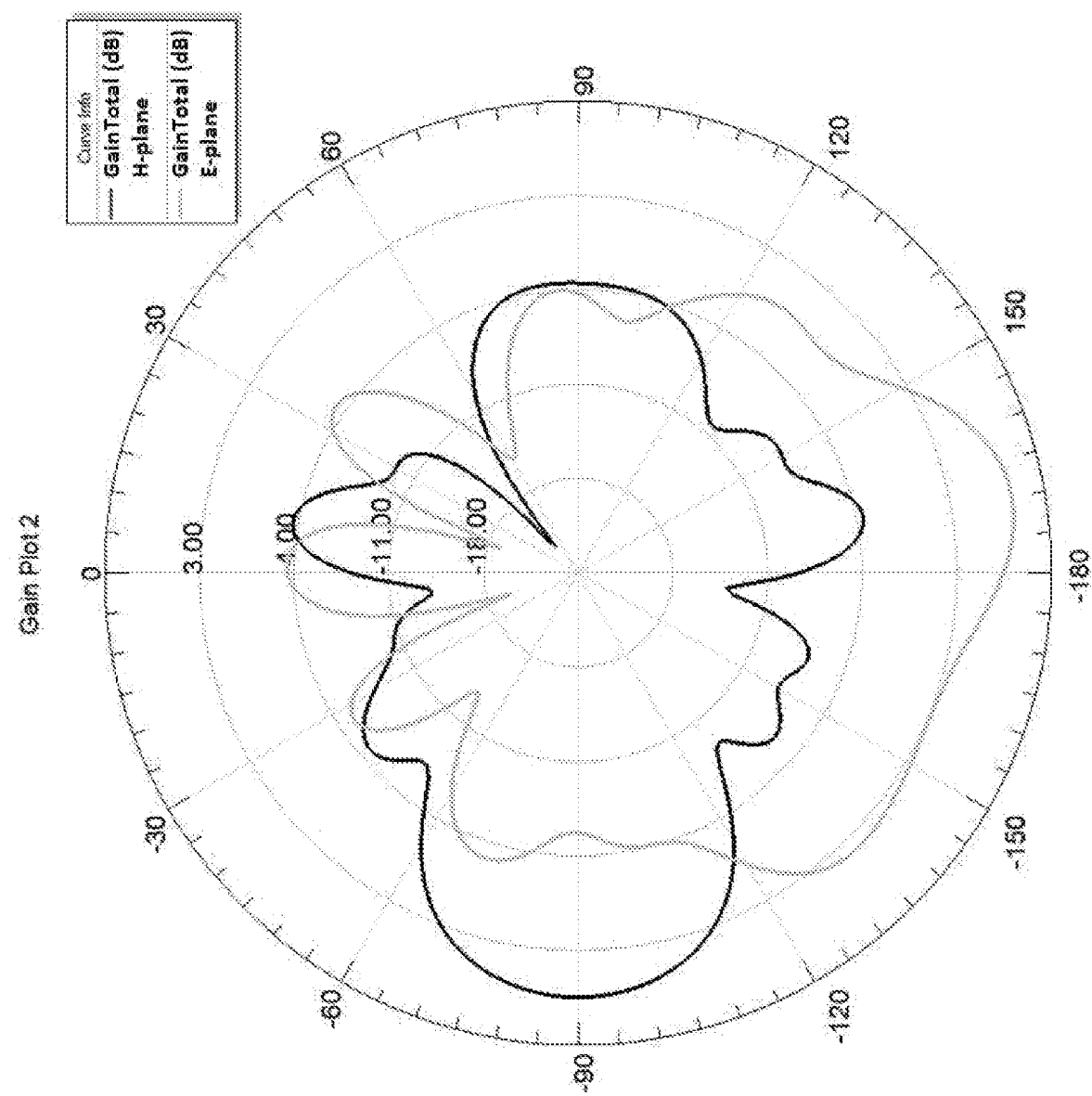
FIG. 8 shows the simulated radiation pattern for the Vivaldi antenna, which was 3D printed using the formulation of Example 1, in the two principal planes.

Simulated and measured reflections are compared in FIG. 7. The input reflection shows that the simulation which used substrate values extracted using the ring resonators broadly agrees with the measured values. This shows that the antenna is absorbing, and presumably radiating, most of the input power from about 2 to about 12 GHz FIG. 8 shows the simulated radiation pattern at 10 GHz in the two principal planes. FIG. 8 shows how much power is radiated at an angle theta, phi based on the spherical coordinate system, where theta is the angle from the z-axis and phi is from the x-axis. In FIG. 8, gain is plotted as the radiated power relative to the power input to the antenna. FIG. 8 shows how the gain is focused in a particular direction, most notably in the plane where phi=0. This shows the operation of the antenna, fabricated using a 3D printed tile with graphene and FIG. 7 shows that it is wide-band so it may be used from about 2 GHz up to about 12 GHz.

Figure 9:
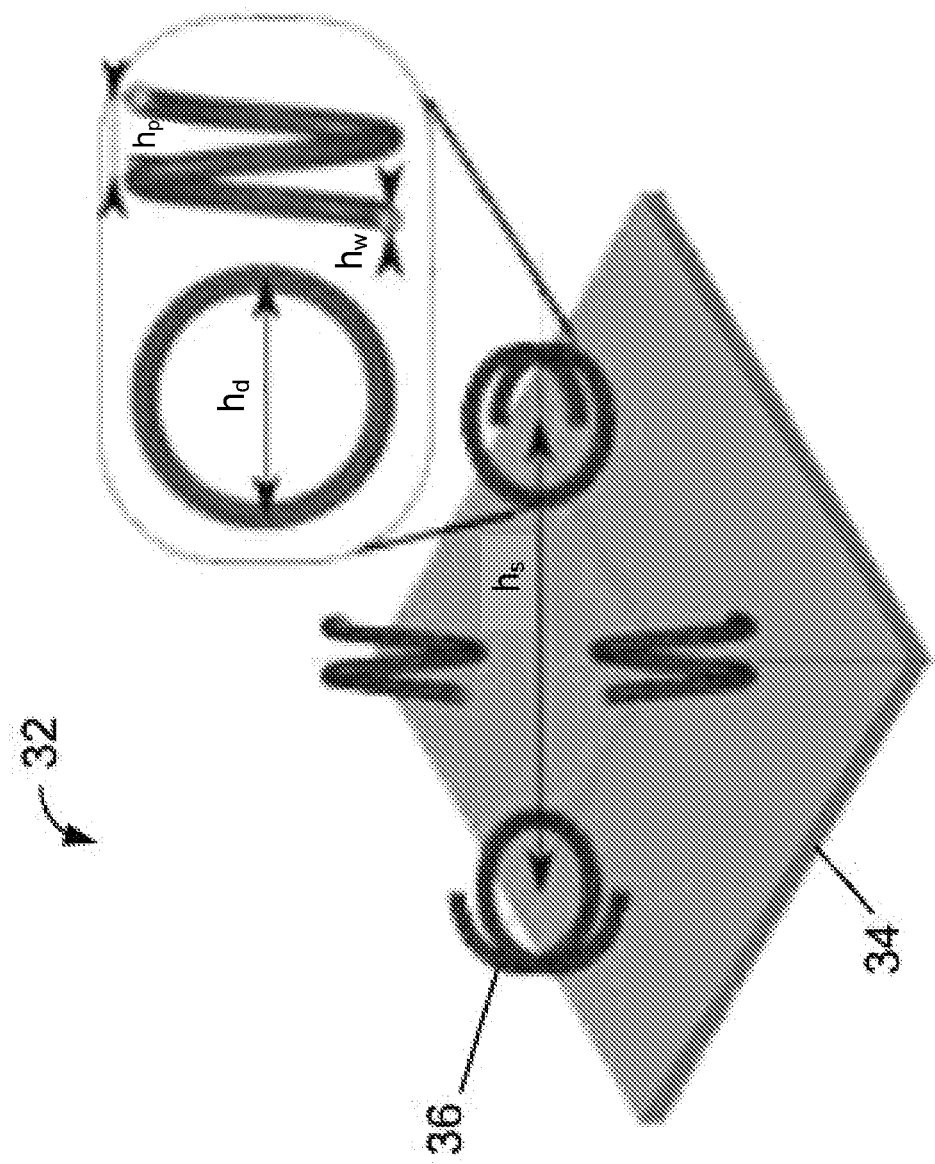
FIG. 9 shows an exemplary metastructure for an antenna substrate.

FIG. 9 shows an exemplary Huygens' metasurface 32, which may be fabricated using the above formulations described herein. The Huygens' metasurface 32 is an example of a 3D suspended metasurface. The metastructure 32 may be fabricated to have helices 36 protruding from the surface of a planar dielectric 34 to radiate more efficiently in air. In this embodiment, the helices 36 are coated in conductive silver. To demonstrate the capability of 3D vat-polymerization multi-material one-step printing process, 3D electromagnetic (EM) structures requiring sophisticated geometries at scales comparable to wavelengths, such as those shown in FIG. 9, may be printed combining silver and a resin dielectric. A polarization rotating metasurface may be taken as an example and a single helix-based Huygens' unit cell may be fabricated using silver-based conductive wires. The idealized polarizer twister unit cell consists of 4 helices 36. The 3D printing process allows for the realization of complicated 3D geometries for achieving high performance wave transformations. The 3D printing capability allows for the ability to print complex structures, without restricting it to planar geometries imposed by conventional Printed Circuit Board (PCB) process, and improved loss performance by separating the dielectric and conducting parts of the structure or by eliminating the dielectric losses. Since dielectric losses are particularly high at mm-wave frequencies, this 3D printing process may be specially suited for high performance EM structures such as antennas and metasurfaces.

Formulation and Method for Making an Antenna

In embodiments, there is provided a formulation for making an antenna. As described above, the formulation may be capable of providing an antenna having a low dielectric loss, a high gain, and/or tunable permittivities. In certain examples, the formulation has a high dielectric constant and/or a low dielectric loss tangent. More specifically, the formulation may have a high dielectric constant and a low dielectric loss tangent. A low dielectric loss may be in the range of about 0 to about 10%. A high gain may be in the range of about 0 to about 6 dB. A high permittivity may be in the range of about 1 to about 5.

In examples, with respect to composite formulations, a higher concentration of materials with high dielectric constant or low dielectric loss tangent are more suitable and ceramic particles (e.g. ceramic nanoparticles) are examples of materials with these properties. A 3D printable formulation having a high concentration of ceramic nanoparticles is an example of a suitable material for this application. Polymer materials that may be used include many suitable polymers, such as fluorinated polymers, which also have low dielectric loss tangents and are often used in planar antennas.

The formulation comprises a composition (e.g. substantially homogeneous composition or substantially homogeneous mixture) having the at least one first component and the at least one polymerizable component. The at least one polymerizable component is polymerizable to form at least one polymer, wherein at least two phases are formed from the at least one first component and the at least one polymer. The at least one first component comprises at least one functional component, at least one functional precursor component, or combinations thereof. The antenna is a functional antenna, a functional precursor antenna, or a combination of a functional and functional precursor antenna. In an embodiment, the method comprises: a) combining at least one first component and at least one polymerizable component to form a composition and b) polymerizing the at least one polymerizable component to form at least one polymer, wherein at least two phases are formed from the at least one first component and the at least one polymer.

In an embodiment, the at least one first component comprises at least one functional component and the antenna is the functional antenna. In another embodiment, the at least one first component comprises at least one functional precursor component and the antenna is the functional precursor antenna. In a further embodiment, the at least one first component comprises at least one functional component and at least one functional precursor component and the antenna is the combination of the functional and functional precursor antenna.

The antenna formed from the formulation and method may comprise: i) a first phase comprising at least one polymer and ii) a second phase comprising at least one first component. It is understood that the first phase may further comprise other component(s) (e.g. same or different from the first component in the second phase). It is similarly understood that the second phase may further comprise other component(s) (e.g. same or different from the polymer in the first phase). With respect to these embodiments, i) the concentration of the polymer may be higher compared to the concentration of the first component in the first phase; and ii) the concentration of the polymer may be lower compared to the concentration of the first component in the second phase. In these embodiments, the phases can form a concentration gradient from one area of the antenna to another area of the antenna, whereby the concentration of the first component increases from the first phase to the second phase. Each of the phases described herein may comprise concentration gradients, composites, and/or coatings. For example, 1) one phase comprises a gradient and another phase comprises a composite; 2) one phase comprises a gradient and another phase comprises a coating; 3) the first and second phases form a gradient; 4) one phase comprises a composite and another phase comprises a composite (e.g. similar or different); or 5) one phase comprises a composite and another comprises a coating.

In other embodiments, an antenna formed from the formulation and method comprises: i) a first phase comprising at least one polymer; ii) a second phase comprising at least one first component; and iii) an interface between the first phase and the second phase. The interface has a concentration gradient of the at least one first component, whereby the concentration of the at least one first component decreases with distance away from the second phase towards the first phase. In additional embodiments, it is understood that the first phase may further comprise other component(s) (e.g. same or different from the first component in the second phase). It is similarly understood that the second phase may further comprise other component(s) (e.g. same or different from the polymer in the first phase). With respect to these embodiments, i) the concentration of the polymer may be higher compared to the concentration of the first component in the first phase; and ii) the concentration of the polymer may be lower compared to the concentration of the first component in the second phase. In these embodiments, the phases can form a concentration gradient from one area of the antenna to another area of the antenna, whereby the concentration of the first component increases from the first phase, through the interface, to the second phase. Each of the phases described herein may comprise concentration gradients, composites, and/or coatings. For example, 1) one phase comprises a gradient and another phase comprises a composite; 2) one phase comprises a gradient and another phase comprises a coating; 3) one phase comprises a composite and another comprises a composite (e.g. similar or different); or 4) one phase comprises a composite and another comprises a coating.

With respect to the above described embodiments, the formulation comprises a composition (e.g. substantially homogeneous composition or substantially homogeneous mixture) having the at least one first component and the at least one polymerizable component. The at least one polymerizable component is polymerizable to form at least one polymer, wherein at least two phases are formed from the at least one first component and the at least one polymer. The at least two phases comprise first and second phases. The first phase comprises the at least one polymer and the second phase is a coating of the at least one first component. For example, the first phase may be a layer comprising the polymer and the second phase is a coating comprising the first component. The first component(s) can be any of the examples outlined below with respect to the first component(s). In certain embodiments, the first component(s) may be ceramic precursors, metal precursors, ceramic precursors, piezoelectric materials, carbon nanotubes (CNT), graphene, metal alloy precursors, metalloid precursors, quantum dots, or combinations thereof. More specifically, the first component(s) may be ferroelectric, ferromagnetic, metal oxide nanoparticles, ceramic precursors, piezoelectric nanoparticles, carbon-based materials such as graphene, CNTs, BNNTs, quantum dots, or combinations thereof. The at least one first component may be a metal precursor, a ceramic precursor, ferroelectric, ferromagnetic, and/or metal oxide nanoparticles. Accordingly, in an embodiment, the method comprises: a) combining the at least one first component and the at least one polymerizable component to form the composition and b) polymerizing the at least one polymerizable component to form the at least one polymer, wherein the at least two phases are formed from the at least one first component and the at least one polymer. The at least two phases comprise the first and second phases. The first phase comprises the at least one polymer and the second phase is the coating of the at least one first component.

The formulation may comprise a composition (e.g. substantially homogeneous composition or substantially homogeneous mixture) having the at least one first component and the at least one polymerizable component. The at least one first component comprises first component (i) and first component (ii). The at least one polymerizable component is polymerizable to form at least one polymer, wherein at least two phases are formed from the at least one first component and the at least one polymer. The at least two phases comprise a first and second phase. The first phase comprises the at least one polymer and the first component (i) and the second phase is a coating of the first component (ii). For example, the first phase may be a layer comprising the polymer and the first component (i), and the second phase is a coating comprising the first component (ii). With respect to the first phase, the first phase may be a concentration gradient and/or a composite. Again, the first component(s) can be any of the examples outlined below with respect to the first component(s). In certain embodiments, the first component(s) may be ceramic precursors, metal precursors, ceramic precursors, piezoelectric materials, carbon nanotubes (CNT), graphene, metal alloy precursors, metalloid precursors, quantum dots, or combinations thereof. More specifically, the first component(s) may be ferroelectric, ferromagnetic, metal oxide nanoparticles, ceramic precursors, piezoelectric nanoparticles, carbon-based materials such as graphene, CNTs, BNNTs, quantum dots, or combinations thereof. The at least one first component may be a metal precursor, a ceramic precursor, ferroelectric, ferromagnetic, and/or metal oxide nanoparticles. In certain embodiments, the first component (i) comprises ferroelectric, ferromagnetic, metal oxide nanoparticles, ceramic precursors, piezoelectric nanoparticles, quantum dots, or combinations thereof, and the first component (ii) comprises metal precursor(s). Accordingly, in an embodiment, the method comprises: a) combining the at least one first component and the at least one polymerizable component to form the composition and b) polymerizing the at least one polymerizable component to form the at least one polymer, wherein the at least two phases are formed from the at least one first component and the at least one polymer. The at least two phases comprise the first and second phase. The at least one first component comprises the first component (i) and the first component (ii). The first phase comprises the at least one polymer and the first component (i) and the second phase is the coating of the first component (ii). For example, the first phase may be the layer comprising the polymer and the first component (i), and the second phase is the coating comprising the first component (ii).

The formulation may comprise a composition (e.g. substantially homogeneous composition or substantially homogeneous mixture) having the at least one first component and the at least one polymerizable component. The at least one first component comprises first component (i) and first component (ii). The at least one polymerizable component is polymerizable to form at least one polymer, wherein at least two phases are formed from the at least one first component and the at least one polymer. The at least two phases comprise a first and second phase. The first phase comprises the at least one polymer and the second phase comprises the first component (i) and first component (ii). For example, the first phase is a layer comprising the polymer and the second phase is a coating, concentration gradient, and/or composite. In certain examples, the second phase is a coating and/or concentration gradient. With respect to the first phase, the first phase may be a concentration gradient and/or a composite. Again, the first component(s) can be any of the examples outlined below with respect to the first component(s). In certain embodiments, the first component(s) may be ceramic precursors, metal precursors, ceramic precursors, piezoelectric materials, carbon nanotubes (CNT), graphene, metal alloy precursors, metalloid precursors, quantum dots, or combinations thereof. More specifically, the first component(s) may be ferroelectric, ferromagnetic, metal oxide nanoparticles, ceramic precursors, piezoelectric nanoparticles, carbon-based materials such as graphene, CNTs, BNNTs, quantum dots, or combinations thereof. The at least one first component may be a metal precursor, a ceramic precursor, ferroelectric, ferromagnetic, and/or metal oxide nanoparticles. In certain embodiments, the first component (i) comprises ferroelectric, ferromagnetic, metal oxide nanoparticles, ceramic precursors, piezoelectric nanoparticles, quantum dots, or combinations thereof, and the first component (ii) comprises metal precursor(s). Accordingly, in an embodiment, the method comprises: a) combining the at least one first component and the at least one polymerizable component to form the composition and b) polymerizing the at least one polymerizable component to form the at least one polymer, wherein the at least two phases are formed from the at least one first component and the at least one polymer. The at least one first component comprises the first component (i) and first component (ii). The at least two phases comprise the first and second phase. The first phase comprises the at least one polymer and the second phase comprises the first component (i) and first component (ii). For example, the first phase may be the layer comprising the polymer and the second phase is a coating, concentration gradient, and/or composite.

In other embodiments, an antenna formed from the formulation comprises: i) a first phase comprising at least one polymer; ii) a second phase comprising at least one first component; and iii) an interface between the first phase and the second phase. The interface has a concentration gradient of the at least one first component, whereby the concentration of the at least one first component decreases with distance away from the second phase towards the first phase. The first phase comprises the at least one polymer and the second phase is a coating of the at least one first component. For example, the first phase may be a layer comprising the polymer and the second phase is a coating comprising the first component. The first component(s) can be any of the examples outlined below with respect to the first component(s). In certain embodiments, the first component(s) may be ceramic precursors, metal precursors, ceramic precursors, piezoelectric materials, carbon nanotubes (CNT), graphene, metal alloy precursors, metalloid precursors, quantum dots, or combinations thereof. More specifically, the first component(s) may be ferroelectric, ferromagnetic, metal oxide nanoparticles, ceramic precursors, piezoelectric nanoparticles, carbon-based materials such as graphene, CNTs, BNNTs, quantum dots, or combinations thereof. The at least one first component may be a metal precursor, a ceramic precursor, ferroelectric, ferromagnetic, and/or metal oxide nanoparticles.

In other embodiments, an antenna formed from the formulation comprises: i) a first phase comprising at least one polymer; ii) a second phase comprising at least one first component; and iii) an interface between the first phase and the second phase. The at least one first component comprises first component (i) and first component (ii) such that the second phase has first component (ii) and the interface has a concentration gradient of the first component (i) and the at least one polymer. The concentration of the first component (i) in the interface decreases with distance away from the second phase towards the first phase. The second phase is a coating. For example, the first phase is a layer comprising the polymer and the second phase is a coating comprising the first component. The first component(s) can be any of the examples outlined below with respect to the first component(s). In certain embodiments, the first component(s) may be ceramic precursors, metal precursors, ceramic precursors, piezoelectric materials, carbon nanotubes (CNT), graphene, metal alloy precursors, metalloid precursors, quantum dots, or combinations thereof. More specifically, the first component(s) may be ferroelectric, ferromagnetic, metal oxide nanoparticles, ceramic precursors, piezoelectric nanoparticles, carbon-based materials such as graphene, CNTs, BNNTs, quantum dots, or combinations thereof. The at least one first component may be a metal precursor, a ceramic precursor, ferroelectric, ferromagnetic, and/or metal oxide nanoparticles. In certain embodiments, the first component (i) comprises ferroelectric, ferromagnetic, metal oxide nanoparticles, ceramic precursors, piezoelectric nanoparticles, quantum dots, or combinations thereof, and the first component (ii) comprises metal precursor(s).

With respect to the embodiments described herein, the formulation(s) have a suitable concentration of the at least one first component (e.g. the at least one functional component, at least one functional precursor component, or combinations thereof) such that the formulation is 3D printable (e.g. vat polymerization). In examples, when the at least one first component comprises first component (i) and first component (ii), about 7 to about 15 wt % of the first component (i) that comprises ferroelectric, ferromagnetic, metal oxide nanoparticles, ceramic precursors, piezoelectric nanoparticles, quantum dots, or combinations thereof, and about 1 to about 50 wt % of the first component (ii) that comprises metal precursor(s) may be used.

In embodiments, the formulation is capable of being sintered to form the antenna, pyrolyzed to form the antenna, or sintered and pyrolyzed to form the antenna. In more specific embodiments, sintering is thermal sintering, UV-VIS radiation sintering, laser sintering or any combination thereof. In typical embodiments, minimum thermal sintering temperatures are selected based on a minimum temperature for converting the functional precursor to the functional antenna. Maximum thermal sintering temperatures may be selected based on a maximum temperature that the functional precursor and/or the functional antenna may be heated to without causing substantive decomposition or degradation. With respect to thermal sintering, the temperature ranges include, but are not limited thereto, from about 50° C. to about 300° C., or about 50° C. to about 280° C., or about 100° C. to about 280° C., or about 100° C. to about 270° C., or about 150° C. to about 280° C., or about 160° C. to about 270° C., or about 180° C. to about 250° C., or about 230° C. to about 250° C. Thermal sintering may occur under air or under inert condition(s), such as nitrogen. Thermal sintering may be performed for a time in ranges of about 15 minutes to about 180 minutes, or about 30 minutes to about 120 minutes, or about 45 minutes to about 60 minutes. In typical embodiments, sintering occurs under nitrogen with about 500 ppm oxygen. With respect to UV-VIS radiation sintering, sintering energies may range from about 1 J/cm$^2$ to about 30 J/cm$^2$, or about 2 J/cm$^2$ to about 10 J/cm$^2$, or about 2.5 J/cm$^2$ to about 5 J/cm$^2$, or about 2.4 J/cm$^2$ to about 3.1 J/cm$^2$. In certain embodiments, the pulse widths are about 500 μs to about 5000 μs, or about 1000 μs to about 4000 μs, or about 2500 μs to about 3000 μs. In typical embodiments, UV-VIS radiation sintering occurs under air. With respect to pyrolyzing, the temperature ranges include, but are not limited thereto, from about 350° C. to about 1200° C., or about 400° C. to about 900° C., or about 600° C. to about 800° C., or about 700° C. to about 800° C. Pyrolyzing may be performed for a time in a range of about 1 to about 60 minutes. Pyrolyzing may occur under air or under inert condition(s), such as nitrogen.

In another embodiment, the at least one functional precursor component is capable of being converted into at least one second functional component. In an embodiment, the at least one second functional component is different from said at least one functional component. In another embodiment, the at least one second functional component is the same as the at least one functional component. In embodiments, the at least one functional precursor component is capable of being converted into at least one second functional component via sintering and/or pyrolyzing, for example, as described above. In some embodiments, the at least one functional precursor component is capable of being converted into at least one second functional component via sintering. The sintering may be at least one of thermal sintering, UV-VIS radiation sintering, and laser sintering. In embodiments, sintering may occur during or after printing.

In another embodiment, the antenna has two or more phases. When the antenna has two phases it comprises a first phase and a second phase. The first phase has the at least one polymer and the second phase has at least one first component. In still another embodiment, the antenna has three phases. The three phases comprise a first phase, a second phase, and a third phase. The first phase has the at least one polymer, the second phase has the at least one polymer and the at least one first component, and the third phase has the at least one first component. In other embodiments, the antenna can have a concentration gradient of a given component. Moreover, in various embodiments, at least one of the phases is a composite.

In embodiments, thicknesses of the phase(s) having the at least one first component may be from about 10 nm to about 1000 μm, or from about 100 nm to about 1000 μm, or from about 10 nm to about 500 μm, or from about 100 nm to about 500 μm, or from about 100 nm to about 50 μm, or from about 500 nm to about 50 μm, or from about 500 nm to about 10 μm, or from about 500 nm to about 2 μm. Such phase(s) may be coating(s), in typical embodiments, the coating(s) may have thicknesses from about 10 nm to about 100 μm, from about 10 nm to about 50 μm, from about 10 nm to about 20 μm, from about 100 nm to about 50 μm, from about 100 nm to about 20 μm, from about 100 nm to about 10 μm, or from about 100 nm to about 1 μm.

With respect to the at least one polymerizable component, polymerizing may be achieved by exposing the composition (e.g. substantially homogeneous composition or substantially homogeneous mixture) to a radiation and/or a heat source capable of initiating polymerization of the at least one polymerizable component. The radiation and/or heat source may be selected from a UV-Vis source, a laser, an electron beam, a gamma-radiation, an IR (heat) source, LED, microwave radiation, plasma and thermal treatment.

In embodiments, the polymerizing may comprise photopolymerization (e.g. photoinduced polymerization). In embodiments, the composition (e.g. substantially homogeneous composition or substantially homogeneous mixture) further comprises at least one photoinitiator. In another embodiment, the composition (e.g. substantially homogeneous composition or substantially homogeneous mixture) comprises at least one polymerizable component, which includes at least one cross-linking agent. This embodiment may also comprise a photoinitiator. Polymerization may also occur via free-radical polymerization without a photoinitiator. The at least one polymerizable component may be polymerized via 3D printing. In an embodiment, the 3D printing uses photoactivation and may be selected from stereolithographic (SLA) printing or digital light processing (DLP). In embodiments, a coating of the at least one first component is formed during the printing stage.

In embodiments, the at least one first component phase can separate and migrate towards an area where the concentration of the at least one polymerizable component is greater. In an embodiment, the at least one first component forms a coating. In other embodiments, the antenna comprises a core and a coating. The core comprises the at least one polymer and the coating comprises the at least one first component. In further embodiments, between the at least one polymer and the at least one first component is an interface having a concentration gradient of the at least one first component, wherein a concentration of the at least one first component decreases with distance away from a surface of the antenna towards the polymer core. In yet another embodiment, with increasing volume of the antenna, the thickness of the coating increases.

In embodiments, the antenna comprises at least about 0.1% by weight of the at least one first component, or at least about 1% by weight of the at least one first component, or at least about 3% by weight of the at least one first component, or at least about 5% by weight of the at least one first component, or at least about 7% by weight of the at least one first component, or at least about 10% by weight of the at least one first component, or at least about 15% by weight of the at least one first component, or at least about 20% by weight of the at least one first component, or at least about 25% by weight of the at least one first component, or at least about 30% by weight of the at least one first component, based on the total weight of the antenna. In typical embodiments, the antenna comprises about 0.1 wt % to about 30 wt % by weight of the at least one first component, or about 3 wt % to about 25 wt % by weight of the at least one first component, or about 5 wt % to about 20 wt % by weight of the at least one first component, or about 5 wt % to about 15 wt % by weight of the at least one first component, based on the total weight of the antenna. In typical embodiments, the antenna comprises a functional material. The functional material may be a functionally graded material (FGM). The FGM may be a functionally graded composite material (FGCM).

With respect to the amount of the at least one polymerizable component that may be used in embodiments, any suitable amount can be used. One embodiment includes from about 10% to about 99% by weight based on the weight of the composition. In some embodiments, the amount is from about 20% to about 99% by weight, from about 30% to about 99% by weight, from about 40% to about 99% by weight, from about 50% to about 99% by weight, from about 60% to about 99% by weight, from about 70% to about 99% by weight, or from about 80% to about 99% by weight based on the weight of the composition.

The antenna may be any suitable structure. The antenna may be a 3D- or 2D-antenna. In embodiments, the antenna is a film or a 3D-antenna. The antenna may have any desired geometry (e.g. shape). In embodiments, the antenna is conductive. The antenna may be selected to be any suitable conductivity. For example, it may have a conductivity (e.g. resistance) of at least about 1 Ω/cm; at least about 2 Ω/cm; at least about 5 Ω/cm; at least about 10 Ω/cm; at least about 15 Ω/cm; or at least about 20 Ω/cm. In other examples, the conductivity may be from about 1 to about 50 Ω/cm; from about 2 to about 50 Ω/cm; from about 5 to about 50 Ω/cm; from about 10 to about 50 Ω/cm; from about 15 to about 50 Ω/cm; from about 20 to about 50 Ω/cm; from about 1 to about 40 Ω/cm; from about 2 to about 40 Ω/cm; from about 5 to about 40 Ω/cm; from about 10 to about 40 Ω/cm; from about 15 to about 40 Ω/cm; from about 20 to about 40 Ω/cm; from about 1 to about 30 Ω/cm; from about 2 to about 30 Ω/cm; from about 5 to about 30 Ω/cm; from about 10 to about 30 Ω/cm; from about 15 to about 30 Ω/cm; from about 20 to about 30 Ω/cm; from about 1 to about 25 Ω/cm; from about 2 to about 25 Ω/cm; from about 5 to about 25 Ω/cm; from about 10 to about 25 Ω/cm; from about 15 to about 25 Ω/cm; from about 20 to about 25 Ω/cm; from about 10 to about 23 Ω/cm; or about 18 to about 23 Ω/cm.

In embodiments, the at least one polymer has a weight average molecular weight of about 10,000 to about 10,000,000, or about 10,000 to about 5,000 000, or about 10,000 to about 1,000,000, or about 50,000 to about 1,000,000, or about 50,000 to about 500,000. With respect to the at least one polymerizable component, it may comprise at least one monomer and/or at least one oligomer. In embodiments, the at least one polymerizable component comprises at least one monomer and/or at least one oligomer. The at least one polymerizable component may comprise at least one liquid monomer and/or at least one liquid oligomer. In a certain embodiment, the at least one polymerizable component comprises at least one resin. Some examples include resins based on epoxies, vinyl ethers, acrylates, urethane-acrylates, methacrylates, acrylamides, thiol-ene based resins, styrene, siloxanes, silicones, and any functionalized derivatives thereof (e.g. fluorinated methacrylates, PEG-functionalized methacrylates or epoxies). The at least one resin may comprise at least one commercial resin. In particular, typical examples of the at least one resin comprises at least one commercial resin for 3D printing such as, and without being limited thereto, 3D printing via photoactivation (e.g. stereolithographic (SLA) printing or digital light processing (DLP)). In further embodiments, the at least one resin may comprise at least one acrylate based-resin. The monomer resins may be elastomers or pre-ceramic polymers. Polymers with high permittivity and low dielectric loss tangent materials may include but are not limited to poly(vinylidine fluoride-trifluoroethylene, poly(vinylidine fluoride-chlorotrifluoroethylene poly(vinylidine fluoride-hexafluoropropylene and their copolymers with different mole ratios, epoxy based photoresins, polystyrene, parylene, polyimide, fluorinated polyimide, polyester acrylate, PEG acrylates, commercial SLA resins, polyarylene ether.

In embodiments, the monomers and oligomers are selected according to their physico-chemical and chemical properties, such as viscosity, surface tension, elasticity or hardness, number of polymerizable groups, and according to the printing method and the polymerization reaction type, e.g., the radiation source or heat source of choice. With respect to elasticity or hardness, some embodiments include modulus value ranges of from about 0.1 MPa to about 8000 MPa. In some embodiments, the monomers are selected from acid containing monomers, acrylic monomers, amine containing monomers, cross-linking acrylic monomers, dual reactive acrylic monomers, epoxides/anhydrides/imides, fluorescent acrylic monomers, fluorinated acrylic monomers, high or low refractive index monomers, hydroxy containing monomers, mono and difunctional glycol oligomeric monomers, styrenic monomers, vinyl and ethenyl monomers. In some embodiments, the monomers can polymerize to yield conductive polymers such as polypyrole and polyaniline. In some embodiments, the at least one monomer is selected from dipentaerythnitol hexaacrylate (DPHA) and trimethylolpropane triacrylate (TMPTA). In some embodiments, the at least one oligomer is selected from the group consisting of acrylates and vinyl containing molecules.

In other embodiments, the monomer can be any monomeric compound having a functional group, such as an activatable photopolymerizable group (photoinduced polymerization) that can propagate, for example, carbon-carbon, carbon-oxygen, carbon-nitrogen, or carbon-sulfur bond formation. In certain embodiments, the monomer is selected from mono-functional monomers (e.g. monomers with one functional group). During polymerization, the radical of the monofunctional monomer is formed and it will react with other monomers present to form oligomers and polymers. The resultant oligomers and polymers can have different properties depending on its structure. Some monomers may be selected depending on their flexibility, viscosity, curing rate, reactivity or toxicity. In one embodiment, the monomer is polymerized to form a polyacrylate such as polymethylmethacrylate, an unsaturated polyester, a saturated polyester, a polyolefin (polyethylenes, polypropylenes, polybutylenes, and the like), an alkyl resin, an epoxy polymer, a polyamide, a polyimide, a polyetherimide, a polyamideimide, a polyesterimide, a polyesteramideimide, polyurethanes, polycarbonates, polystyrenes, polyphenols, polyvinylesters, polysilicones, polyacetals, cellulose acetates, polyvinylchlorides, polyvinylacetates, polyvinyl alcohols polysulfones, polyphenylsulfones, polyethersulfones, polyketones, polyetherketones, poyletheretherketones, polybenzimidazoles, polybenzoxazoles, polybenzthiazoles, polyfluorocarbones, polyphenylene ethers, polyarylates, cyanate ester polymers, polystyrenes, polyacrylamide, polyvinylethers, copolymers of two or more thereof, and the like. In other embodiments, polyacrylates include polyisobomylacrylate, polyisobornylmethacrylate, polyethoxyethoxyethyl acrylate, poly-2-carboxyethylacrylate, polyethylhexylacrylate, poly-2-hydroxyethylacrylate, poly-2-phenoxylethylacrylate, poly-2-phenoxyethylmethacrylate, poly-2-ethylbutylmethacrylate, poly-9-anthracenylmethylmethacrylate, poly-4-chlorophenylacrylate, polycyclohexylacrylate, polydicyclopentenyloxyethyl acrylate, poly-2-(N,N-diethylamino)ethyl methacrylate, poly-dimethylaminoeopentyl acrylate, poly-caprolactone 2-(methacryloxy)ethylester, and polyfurfurylmethacrylate, poly(ethylene glycol)methacrylate, polyacrylic acid and poly (propylene glycol)methacrylate.

Monomers that may be used, for example, include acrylic monomers such as monoacrylics, diacrylics, triacrylics, tetraacrylics, pentacrylics, etc. Examples of other monomers include ethyleneglycol methyl ether acrylate, N,N-diisobutyl-acrylamide, N-vinyl-pyrrolidone, (meth)acryloyl morpholine, 7-amino-3,7-dimethyloctyl, (meth) acrylate, isobutoxymethyl (meth) acrylamide, isobornyloxyethyl (meth)acrylate, isobornyl (meth)acrylate, 2-ethylhexyl acrylate, 2-ethylhexyl (meth)acrylate, ethyldiethylene glycol (meth)acrylate, t-octyl (meth)acrylamide, diacetone (meth) acrylamide, dimethylaminoethyl (meth)acrylate, diethylaminoethyl (meth) acrylate, lauryl (meth) acrylate, dicyclopentadiene (meth)acrylate, dicyclopentenyloxyethyl (meth) acrylate, dicyclopentenyl (meth) acrylate, N,N-dimethyl (meth) acrylamide tetrachlorophenyl (meth)acrylate, 2-tetrachlorophenoxyethyl (meth)acrylate, tetrahydrofurfuryl (meth)acrylate, tetrabromophenyl (meth)acrylate, 2-tetrabromophenoxyethyl (meth) acrylate, 2-trichlorophenoxyethyl (meth)acrylate, tribromophenyl(meth)acrylate, 2-tribromophenoxyethyl (meth) acrylate, 2-hydroxyethyl (meth) acrylate, 2-hydroxypropyl (meth)acrylate, vinyl caprolactam, phenoxyethyl (meth)acrylate, butoxyethyl (meth)acrylate, pentachlorophenyl (meth)acrylate, pentabromophenyl (meth)acrylate, polyethylene glycol mono-(meth)acrylate, methyl triethylene diglycol (meth)acrylate, alkoxylated alkyl phenol acrylate, (poly)caprolactone acrylate ester from methylol-tetrahydrofuran, (poly)caprolactone acrylate ester from alkylol-dioxane, ethylene glycol phenyl ether acrylate, and methacryloxypropyl terminated polydimethylsiloxane.

Other monomers that may be used, for example, include epoxide monomers such as 3,4-epoxyclyclohexylmethyl 3,4-epoxycylcohexanecarboxylate, and/or epoxycyclohexylethyl terminated polydimethylsiloxane.

With respect to the amount of the at least one monomer that may be used in embodiments, any suitable amount can be used depending on the desired functional and/or functional precursor product. One embodiment includes from about 1% to about 90% by weight of the at least one monomer based on the weight of the composition without the at least one first component. In some embodiments, the amount is from about 1% to about 85% by weight, from about 1% to about 80% by weight, from about 1% to about 75% by weight, from about 5% to about 90% by weight, from about 10% to about 90% by weight, from about 15% to about 90% by weight, from about 20% to about 90% by weight, from about 25% to about 90% by weight, from about 35% to about 90% by weight, from about 40% to about 90% by weight, from about 45% to about 90% by weight, from about 5% to about 80% by weight, from about 10% to about 80% by weight, from about 15% to about 80% by weight, from about 20% to about 80% by weight, or from about 50% to about 80% by weight based on the weight of the composition without the at least one first component.

With respect to the amount of the at least one monomer that may be used in embodiments based on the weight of the at least one polymerizable component itself, includes from about 1% to about 90% by weight of the at least one monomer. In some embodiments, the amount is from about 1% to about 85% by weight, from about 1% to about 80% by weight, from about 1% to about 75% by weight, from about 5% to about 90% by weight, from about 10% to about 90% by weight, from about 15% to about 90% by weight, from about 20% to about 90% by weight, from about 25% to about 90% by weight, from about 35% to about 90% by weight, from about 40% to about 90% by weight, from about 45% to about 90% by weight, from about 5% to about 80% by weight, from about 10% to about 80% by weight, from about 15% to about 80% by weight, from about 20% to about 80% by weight, or from about 50% to about 80% by weight based on the weight of the at least one polymerizable component.

In other embodiments, the at least one polymerizable component comprises or further comprises at least one ceramic precursor.

With respect to the at least one cross-linking agent, the at least one polymerizable component comprises at least one cross-linking agent or comprises at least one monomer/oligomer and at least one cross-linking agent. Cross-linking agents may have one or more functional groups and, typically, have two or more functional groups (e.g. di-, tri-, tetra-, etc. functional cross-linking agents). In certain embodiments, the functional groups may be present at both ends of the cross-linking agent, forming branched polymerization, whereby the cross-linking agent may react with two or more polymers. In certain embodiments, a 2D antenna is formed with a monofunctional cross-linking agent and a 3D antenna is formed with a multifunctional cross-linking agent.

In embodiments, the morphology of a functional and/or functional precursor product (e.g. 3D printed product) may depend on the concentration (e.g. amount) of cross-linking agent. The concentration of the cross-linking agent may control the rate at which a polymer network forms. In one embodiment, when the cross-linking agent concentration is high, the rate at which the monomers form polymer networks (e.g. branched polymerization) are high. High rates of polymer network formation may limit the diffusion of slower reacting or non-polymerizing components and provide more uniform compositions such as composites. Conversely, in other embodiments, when cross-linking agent concentrations are low and the rates of polymer network formations are low, slower polymerizing monomers or non-polymerizing components (e.g. silver salt, nanoparticles, etc.) can diffuse towards areas where their solubilities are higher. Their solubilities may be higher towards the surface of the printed product, where the polymer concentration is low and the monomer concentration is high. Therefore, formulations with low cross-linking agent concentrations may lead to printed products (e.g. objects) where the slower polymerizing monomer or non-polymerizing component forms a coating. In other embodiments, intermediate cross-linking agent concentrations can generate graded compositions in the products. In embodiments, therefore, the morphology of the functional and/or functional precursor product can be a function of cross-linking agent concentrations in compositions (e.g. substantially homogeneous compositions or substantially homogeneous mixtures) containing non-polymerizing functional and/or functional precursor components.

In embodiments, the amount of functional and/or functional precursor component at the surface of the functional and/or functional precursor antenna decreases with increased concentration of cross-linking agent. The concentration of functional and/or functional precursor component at the surface can determine the resistance value of the printed antenna. As the concentration of cross-linking agent increases, the resistance of the functional and/or functional precursor component at the surface (e.g. coating) increases in view of the lower concentration of the functional and/or functional precursor component at the surface.

With respect to the amount of the at least one cross-linking agent that may be used in embodiments, any suitable amount can be used depending on the desired functional and/or functional precursor product. For example, the amount of the at least one cross-linking agent can be used to tune the morphology of the functional and/or functional precursor product. One embodiment includes from about 10% to about 99% mol based on the mol of the composition without the at least one first component (e.g. total mol of cross-linking agent+monomer). In some embodiments, the amount is from about 80% to about 99% mol, from about 85% to about 99% mol, from about 90% to about 99% mol, from about 10% to about 80% mol, from about 10% to about 70% mol, from about 10% to about 60% mol, from about 10% to about 50% mol, from about 10% to about 40% mol, from about 10% to about 35% mol, from about 20% to about 80% mol, from about 25% to about 80% mol, from about 30% to about 80% mol, from about 35% to about 80% mol, from about 40% to about 80% mol, from about 45% to about 80% mol, from about 50% to about 80% mol, from about 55% to about 80% mol, from about 60% to about 80% mol, from about 65% to about 80% mol, from about 70% to about 80% mol, from about 35% to about 75% mol, from about 35% to about 70% mol, from about 35% to about 65% mol, from about 35% to about 60% mol, from about 35% to about 55% mol, from about 35% to about 50% mol, from about 15% to about 50% mol, from about 15% to about 45% mol, from about 15% to about 40% mol, or from about 15% to about 35% mol based on the mol of the composition without the at least one first component.

In some embodiments, the functional and/or functional precursor product is a composite. The amount of the at least one crosslinking agent used to make the product is from about 80% to about 99% mol, from about 85% to about 99% mol, or from about 90% to about 99% mol based on the mol of the composition without the at least one first component. In other embodiments, the at least one cross-linking agent comprises at least one difunctional cross-linking agent. In other embodiments, the at least one cross-linking agent comprises at least one trifunctional cross-linking agent. In other embodiments, the at least one cross-linking agent comprises at least one tetrafunctional cross-linking agent. In a typical embodiment, the at least one cross-linking agent comprises at least one difunctional cross-linking agent.

In some embodiments, the functional and/or functional precursor product is a graded and/or coated product. The amount of the at least one crosslinking agent used to make the product is from about 10% to about 80% mol, from about 10% to about 70% mol, from about 10% to about 60% mol, from about 10% to about 50% mol, from about 10% to about 40% mol, from about 10% to about 35% mol, from about 20% to about 80% mol, from about 25% to about 80% mol, from about 30% to about 80% mol, from about 35% to about 80% mol, from about 40% to about 80% mol, from about 45% to about 80% mol, from about 55% to about 80% mol, from about 60% to about 80% mol, from about 65% to about 80% mol, from about 70% to about 80% mol, from about 35% to about 75% mol, from about 35% to about 70% mol, from about 35% to about 65% mol, from about 35% to about 60% mol, from about 35% to about 55% mol, from about 35% to about 50% mol, from about 15% to about 50% mol, from about 15% to about 45% mol, from about 15% to about 40% mol, or from about 15% to about 35% mol based on the mol of the composition without the at least one first component. In other embodiments, the at least one cross-linking agent comprises at least one difunctional cross-linking agent. In other embodiments, the at least one cross-linking agent comprises at least one trifunctional cross-linking agent. In other embodiments, the at least one cross-linking agent comprises at least one tetrafunctional cross-linking agent. In a typical embodiment, the at least one cross-linking agent comprises at least one difunctional cross-linking agent.

In some embodiments, the functional and/or functional precursor product is a graded product. The amount of the at least one crosslinking agent used to make the product is from about 35% to about 80% mol, from about 35% to about 75% mol, from about 35% to about 65% mol, from about 35% to about 55% mol, from about 35% to about 50% mol, from about 40% to about 80% mol, from about 45% to about 80% mol, from about 50% to about 80% mol, from about 55% to about 80% mol, from about 60% to about 80% mol, from about 65% to about 80% mol, or from about 70% to about 80% mol based on the mol of the composition without the at least one first component. In other embodiments, the at least one cross-linking agent comprises at least one difunctional cross-linking agent. In other embodiments, the at least one cross-linking agent comprises at least one trifunctional cross-linking agent. In other embodiments, the at least one cross-linking agent comprises at least one tetrafunctional cross-linking agent.

In some embodiments, the functional and/or functional precursor product is a coated product. The amount of the at least one crosslinking agent used to make the product is less than about 35% mol, less than about 30% mol, less than about 25% mol, less than about 20% mol, less than about 15% mol, less than about 10% mol, from about 1% to about 35% mol, from about 1% to about 30% mol, from about 1% to about 25% mol, or from about 1% to about 20% mol based on the mol of the composition without the at least one first component. In other embodiments, the at least one cross-linking agent comprises at least one difunctional cross-linking agent. In other embodiments, the at least one cross-linking agent comprises at least one trifunctional cross-linking agent. In other embodiments, the at least one cross-linking agent comprises at least one tetrafunctional cross-linking agent. In a typical embodiment, the at least one cross-linking agent comprises at least one difunctional cross-linking agent.

With respect to the amount of the at least one cross-linking agent, based on the weight of the composition without the at least one first component, that may be used in embodiments, any suitable amount can be used. One embodiment includes from about 10% to about 99% by weight of the at least one cross-linking agent based on the weight of the composition without the at least one first component. In some embodiments, the amount is from about 15% to about 90% by weight, from about 15% to about 85% by weight, from about 15% to about 80% by weight, from about 15% to about 75% by weight, from about 20% to about 90% by weight, from about 30% to about 90% by weight, from about 35% to about 90% by weight, from about 45% to about 90% by weight, from about 50% to about 90% by weight, from about 55% to about 90% by weight, from about 60% to about 90% by weight, from about 30% to about 80% by weight, from about 35% to about 80% by weight, from about 40% to about 80% by weight, from about 45% to about 80% by weight, or from about 50% to about 80% by weight based on the weight of the composition without the at least one first component.

With respect to the amount of the at least one cross-linking agent that may be used in embodiments based on the weight of the at least one polymerizable component, includes from about 10% to about 99% by weight of the at least one cross-linking agent. In some embodiments, the amount is from about 15% to about 90% by weight, from about 15% to about 85% by weight, from about 15% to about 80% by weight, from about 15% to about 75% by weight, from about 20% to about 90% by weight, from about 30% to about 90% by weight, from about 35% to about 90% by weight, from about 45% to about 90% by weight, from about 50% to about 90% by weight, from about 55% to about 90% by weight, from about 60% to about 90% by weight, from about 30% to about 80% by weight, from about 35% to about 80% by weight, from about 40% to about 80% by weight, from about 45% to about 80% by weight, or from about 50% to about 80% by weight based on the weight of the at least one polymerizable component (e.g. resin).

In embodiments, the cross-linking agent is a radical reactive cross-linking agent. Examples of the radical reactive cross-linking agent include a methacrylic compound, an acrylic compound, a vinyl compound, and an allyl compound. Examples of suitable cross-linking agents which can be used to form polyacrylates include 2,2-bis(4-methacryloxyphenyl)propane, 1,2-butanediol diacrylate, 1,4-butanediol diacrylate, ethylene glycol diacrylate, di(ethylene glycol) diacrylate, tetra(ethylene glycol) diacrylate, ethylene glycol dimethacrylate, 1,4-butanediol dimethacrylate, 1,4-cyclohexanediol dimethacrylate, 1,10-decanediol dimethacrylate, diethylene glycol diacrylate, dipropylene glycol diacrylate, dimethylpropanediol dimethacrylate, triethylene glycol dimethacrylate, tetraethylene glycol diacrylate, tetraethylene glycol dimethacrylate, 1,6-hexanediol diacrylate, neopentyl glycol diacrylate, polyethylene glycol diacrylate, polyethylene glycol dimethacrylate, tripropylene glycol diacrylate, 2,2-bis[4-(2-acryloxyethoxy)phenyl]propane, 2,2-bis[4-(2-hydroxy-3-methacryloxypropoxy)phenyl]propane, bis(2-methacryloxyethyl)N,N-1,9-nonylene biscarbamate, 1,4-cyclohexanedimethanol dimethacrylate, and diacrylic urethane oligomers (reaction products of isocyanate terminate polyol and 2-hydroethylacrylate). Examples of triacrylates which can be used to form polyacrylates include tris(2-hydroxyethyl)isocyanurate trimethacrylate, tris(2-hydroxyethyl)isocyanurate triacrylate, trimethylolpropane trimethacrylate, trimethylolpropane triacrylate and pentaerythritol triacrylate. Examples of tetracrylates include pentaerythritol tetraacrylate, di(trimethylolpropane) tetraacrylate, and ethoxylated pentaerythritol tetraacrylate. Examples of pentaacrylates include dipentaerythritol pentaacrylate and pentaacrylate ester. Other examples of cross-linking agents include: ethylene glycol di(meth)acrylate, dicyclopentenyl di(meth)acrylate, triethylene glycol diacrylate, tetraethylene glycoldi(meth)acrylate, tricyclodecanediyl-dimethylene di(meth)acrylate, tris(2-hydroxyethyl) isocyanurate di(meth)acrylate, tris(2-hydroxyethyl) isocyanurate tri(meth)acrylate, caprolactone modified tris(2-hydroxyethyl)isocyanurate tri(meth)acrylate, trimethylolpropane tri(meth) acrylate, EO modified trimethylolpropane tri(meth)acrylate, PO modified trimethylolpropane tri(meth) acrylate, tripropylene glycol di(meth)acrylate, neopentyl glycol di(meth)acrylate, both terminal (meth)acrylic acid adduct of bisphenol A diglycidyl ether, 1,4-butanediol di(meth)acrylate, 1,6-hexanediol di(meth) acrylate, pentaerythritol tri(meth)acrylate, pentaerythritol tetra(meth) acrylate, polyester di(meth)acrylate, polyethylene glycol di(meth)acrylate, dipentaerythritol hexa(meth)acrylate, dipentaerythritol penta(meth)acrylate, dipentaerythritol tetra (meth)acrylate, caprolactone modified dipentaerythritol hexa(meth)acrylate, caprolactone modified dipentaerythritol penta(meth)acrylate, ditrimethylolpropane tetra(meth)acrylate, hexanediol diacrylate, 2,2-bis(4-methacryloxyphenyl) propane, 1,2-butanediol diacrylate, 1,4-butanediol diacrylate, 1,4-butanediol dimethacrylate, 1,4-cyclohexanediol dimethacrylate, 1,10-decanediol dimethacrylate, diethylene glycol diacrylate, dipropylene glycol diacrylate, dimethylpropanediol dimethacrylate, triethylene glycol dimethacrylate, tetraethylene glycol diacrylate, tetraethylene glycol dimethacrylate, 1,6-hexanediol diacrylate, neopentyl glycol diacrylate, polyethylene glycol diacrylate, polyethylene glycol dimethacrylate, tripropylene glycol diacrylate, 2,2-bis[4-(2-acryloxyethoxy)phenyl]propane, 2,2-bis[4-(2-hydroxy-3-methacryloxypropoxy)phenyl]propane, bis(2-methacryloxyethyl)N,N-1,9-nonylene biscarbamate, 1,4-cyclohexanedimethanol dimethacrylate, tris(2-hydroxyethyl)isocyanurate trimethacrylate, tris(2-hydroxyethyl)isocyanurate triacrylate, trimethylolpropane trimethacrylate, trimethylolpropane triacrylate pentaerythritol triacrylate, N,N'-methylenebisacrylamide, N,N'-methylenebisacrylamide, N,N'-(1,2-dihydroxyethylene)bisacrylamide, N-(1-hydroxy-2,2-dimethoxyethyl)acrylamide, divinylbenzene, tris(trimethylsilyl)silane, 1,4-butanediol divinyl ether, benzyl acrylate, benzyl methacrylate, vinyl benzoate, N-acryloylmorpholine, 1,10-decanediol diacrylate, triethylene glycol dithiol, and combinations thereof.

With respect to the photoinitiators, in some embodiments, the radiation source employed for initiating the polymerization is selected based on the type of photoinitiator used. Generally, the photoinitiator is a chemical compound that decomposes into free radicals when exposed to light. There are a number of photoinitiators known in the art. For example, suitable photoinitiators include, but are not limited to, ethyl (2,4,6-trimethylbenzoyl) phenylphosphinate, 7-diethylamino-2-coumarin, acetophenone, p-tert-butyltrichloro acetophenone, chloro acetophenone, 2-2-diethoxy acetophenone, hydroxy acetophenone, 2,2-dimethoxy-2'-phenyl acetophenone, 2-amino acetophenone, dialkylamino acetophenone, benzyl, benzoin, benzoin methyl ether, benzoin ethyl ether, benzoin isopropyl ether, benzoin isobutyl ether, 1-hydroxycyclohexyl phenyl ketone, 2-hydroxy-2-methyl-1-phenyl-2-methylpropane-1-one, 1-(4-isopropylphenyl)-2-hydroxy-2-methylpropane-1-one, benzyl dimethyl ketal, benzophenone, benzoylbenzoic acid, methyl benzoyl benzoate, methyl-o-benzoyl benzoate, 4-phenyl benzophenone, hydroxy benzophenone, hydroxypropyl benzophenone, acrylic benzophenone, 4-4'-bis(dimethylamino)benzophenone, perfluoro benzophenone, thioxanthone, 2-chloro thioxanthone, 2-methyl thioxanthone, diethyl thioxanthone, dimethyl thioxanthone, 2-methyl anthraquinone, 2-ethyl anthraquinone, 2-tert-butyl anthraquinone, 1-chloro anthraquinone, 2-amyl anthraquinone, acetophenone dimethyl ketal, benzyl dimethyl ketal, α-acyl oxime ester, benzyl-(o-ethoxycarbonyl)-α-monoxime, diphenyl(2,4,6-trimethylbenzoyl)phosphine oxide, phenylbis(2,4,6-trimethylbenzoyl)phosphine oxide, bis(2,6-dimethoxybenzoyl)(2,4,4-trimethylpentyl)phosphine oxide, bis(4-methoxybenzoyl) diethylgermanium, tetrabenzoylgermane, tetramesitoylgermane, glyoxy ester, 3-keto coumarin, 2-ethyl anthraquinone, camphor quinone, tetramethylthiuram sulfide, azo bis isobutyl nitrile, benzoyl peroxide, dialkyl peroxide, tert-butyl peroxy pivalate, perfluoro tert-butyl peroxide, perfluoro benzoyl peroxide, etc. Further, it is possible to use these photoinitiator alone or in combination of two or more.

A skilled person would understand a suitable amount of photoinitiator(s) that may be used to initiate a photopolymerization reaction herein. One embodiment includes less than about 0.5% by weight of the at least one photoinitiator based on the weight of the composition without the at least one first component. In some embodiments, the amount is less than about 0.4% by weight, less than about 0.3% by weight, or less than about 0.1% by weight based on the weight of the composition without the at least one first component.

With respect to the amount of the at least one photoinitiator that may be used in embodiments based on the weight of the at least one polymerizable component itself, includes less than about 2% by weight of the at least one photoinitiator. In some embodiments, the amount is less than about 1.8% by weight, less than about 1.5% by weight, or less than about 1% by weight based on the weight of based on the weight of the at least one polymerizable component (e.g. resin).

It is understood that various ratios of the components may be used in the formulations. Depending on the ratios, different functional antennas result. With respect to the ratios of the components of the at least one polymerizable component, any suitable ratios can be used depending on the desired functional and/or functional precursor antenna. With respect to the at least one polymerizable component comprising at least one monomer and at least one cross-linking agent, in embodiments, the ratio of the at least one monomer to at least one cross-linking agent includes about 9:1 to about 0:10 based on % by weight. In some embodiments, the amount is about 9:1 to about 1:9 based on % by weight, about 8:2 to about 2:8 based on % by weight, about 7:3 to about 3:7 based on % by weight, about 6:4 to about 4:6 based on % by weight, about 5:5 to about 5:5 based on % by weight, about 4:6 to about 6:4 based on % by weight, about 3:7 to about 7:3 based on % by weight, about 2:8 to about 8:2 based on % by weight, or about 1:10 to about 9:1 based on % by weight.

With respect to the at least one polymerizable component comprising at least one monomer, at least one cross-linking agent, and at least one photoinitiator, in embodiments, the ratio of the at least one monomer to at least one cross-linking agent to at least one photoinitiator includes about 8.9:1:0.1 to about 0:9.9:0.1 based on % by weight.

To design functional antennas, and tune the chemical and/or physical properties, the attractive and repulsive forces (hydrophobic/hydrophilic interactions) between components may be leveraged to control the placement of functional components. When components have similar hydrophilic or hydrophobic properties, the components will have less of a driving force to phase separate upon polymerization. If the components differ in their hydrophobicity or hydrophilicity, the functional component will have a larger driving force to separate from the composition (e.g. polymerizing monomer/cross-linking agent mixture). The resulting antenna may be used as a scaffold for receiving metallic functional components (e.g. through electroplating) and as barrier type coatings (e.g. hydrophobic), dielectrics or insulating material, and may be selected for the desired flexibility and strength needed in the final antenna.

With respect to the at least one first component, in embodiments, are selected from suitable high dielectric and/or low dielectric loss tangent materials. With respect to the at least one first component, in embodiments, the at least one first component is substantially soluble in the at least one polymerizable component and is substantially insoluble when the at least one polymerizable component polymerizes. The at least one first component may be selected from the group consisting of metal precursors, ceramic precursors, piezoelectric materials, carbon nanotubes (CNT), graphene, metal alloy precursors, metalloid precursors, and combinations thereof. The first component(s) may be selected from ceramic(s). Exemplary ceramics include, but are not limited to, oxides, nitrides, and carbides of metals such as, barium titanate, strontium titanate, barium strontium titanate, bismuth strontium calcium copper oxide, copper oxide, boron oxide, boron nitride, ferrite, lead zirconate titanate, manganese oxide, magnesium diboride, silicon nitride, steatite, titanium oxide, titanium carbide, yttrium barium copper oxide, zinc oxide, zirconium dioxide, and partially stabilized zirconia. Ceramics may be oxides (alumina, beryllia, ceria, zirconia), nonoxides (carbide, boride, nitride, silicide) or composite materials. Examples include functional ceramics such as $BaTiO_3$ (BT), $Pb(Mg_{1/3}Nb_{2/3})O_3$ (PMN), $Pb(Zr_{0.52}Ti_{0.48})O_3$ (PZT), piezoelectric crystals (PMN-PT), Barium Strontium Titanate (BST), $BaTi_4O_9$—ZnO, $ZnFe_2O_4$, $ZnAl_2O_4$—$TiO_2$-, $Mg_2SiO_4$-, $Mg_4Ta_2O_3$- and $Al_2O_3$-based materials, $CaCu_3TiO_4O_{12}$, other metal oxides. Others include, for example, ferroelectric, ferromagnetic, and metal oxide nanoparticles, porous polymer interior, polymer foam, ceramic, piezoelectric nanoparticles, carbon based materials such as graphene, CNTs, BNNTs, metal oxides, quantum dots, conducting polymers etc.

In embodiments, the at least one first component is selected from the group consisting of metal salts, metal coordination compounds, organometallic compounds, organometalloid compounds, and combinations thereof. In typical embodiments, the at least one first component is selected from the group consisting of metal salts, metalloid salts, and combinations thereof. In certain embodiments, the at least one first component is selected from the group consisting of metal carboxylates, metalloid carboxylates, and combinations thereof. The metal carboxylates may comprise from 1 to 20 carbon atoms, from 6 to 15 carbon atoms, or from 8 to 12 carbon atoms. The carboxylate group of the metal carboxylates may be an alkanoate. Examples of the at least one first component is selected from the group consisting of metal formate, metal acetate, metal propionate, metal butyrate, metal pentanoate, metal hexanoate, metal heptanoate, metal ethylhexanoate, metal behenate, metal benzoate, metal oleate, metal octanoate, metal nonanoate, metal decanoate, metal neodecanoate, metal hexafluoroacetylacetonate, metal phenylacetate, metal isobutyrylacetate, metal benzoyl acetate, metal pivalate metal oxalate and combinations thereof.

With respect to the metal precursors: the metal ion may be selected from the group consisting of $Li^+$, $Na^+$, $K^+$, $Rb^+$, $Cs^+$, $Be^{2+}$, $Mg^{2+}$, $Ca^{2+}$, $Sr^{2+}$, $Ba^{2+}$, $Sc^{3+}$, $Sc^{2+}$, $Sc^+$, $Y^{3+}$, $Y^{2+}$, $Y^+$, $Ti^{4+}$, $Ti^{3+}$, $Ti^{2+}$, $Zr^{4+}$, $Zr^{3+}$, $Zr^{2+}$, $Hf^{4+}$, $Hf^{3+}$, $V^{5+}$, $V^{4+}$, $V^{3+}$, $V^{2+}$, $Nb^{5+}$, $Nb^{4+}$, $Nb^{3+}$, $Nb^{2+}$, $Ta^{5+}$, $Ta^{4+}$, $Ta^{3+}$, $Ta^{2+}$, $Cr^{6+}$, $Cr^{5+}$, $Cr^{4+}$, $Cr^{3+}$, $Cr^{2+}$, $Cr^+$, $Cr$, $Mo^{6+}$, $Mo^{5+}$, $Mo^{4+}$, $Mo^{3+}$, $Mo^{2+}$, $Mo^+$, $Mo$, $W^{6+}$, $W^{5+}$, $W^{4+}$, $W^{3+}$, $W^{2+}$, $W^+$, $W$, $Mn^{7+}$, $Mn^{6+}$, $Mn^{5+}$, $Mn^{4+}$, $Mn^{3+}$, $Mn^{2+}$, $Mn^+$, $Re^{7+}$, $Re^{6+}$, $Re^{5+}$, $Re^{4+}$, $Re^{3+}$, $Re^{2+}$, $Re^+$, $Re$, $Fe^{6+}$, $Fe^{4+}$, $Fe^{3+}$, $Fe^{2+}$, $Fe^+$, $Fe$, $Ru^{8+}$, $Ru^{7+}$, $Ru^{6+}$, $Ru^{4+}$, $Ru^{3+}$, $Ru^{2+}$, $Os^{8+}$, $Os^{7+}$, $Os^{6+}$, $Os^{5+}$, $Os^{4+}$, $Os^{3+}$, $Os^{2+}$, $Os^+$, $Os$, $Co^{5+}$, $Co^{4+}$, $Co^{3+}$, $Co^{2+}$, $Co^+$, $Rh^{6+}$, $Rh^{5+}$, $Rh^{4+}$, $Rh^{3+}$, $Rh^{2+}$, $Rh^+$, $Ir^{6+}$, $Ir^{5+}$, $Ir^{4+}$, $Ir^{3+}$, $Ir^{2+}$, $Ir^+$, $Ir$, $Ni^{3+}$, $Ni^{2+}$, $Ni^+$, $Ni$, $Pd^{6+}$, $Pd^{4+}$, $Pd^{2+}$, $Pd^+$, $Pd$, $Pt^{6+}$, $Pt^{5+}$, $Pt^{4+}$, $Pt^{3+}$, $Pt^{2+}$, $Pt^+$, $Cu^{4+}$, $Cu^{3+}$, $Cu^{2+}$, $Cu^+$, $Ag^{3+}$, $Ag^{2+}$, $Ag^+$, $Au^{5+}$, $Au^{4+}$, $Au^{3+}$, $Au^{2+}$, $Au^+$, $Zn^{2+}$, $Zn^+$, $Zn$, $Cd^{2+}$, $Cd^+$, $Hg^{4+}$, $Hg^{2+}$, $Hg^+$, $B^{3+}$, $B^{2+}$, $B^+$, $Al^+$, $Al^{2+}$, $Al^+$, $Ga^{3+}$, $Ga^{2+}$, $Ga^+$, $In^{3+}$, $In^{2+}$, $In^{1+}$, $Tl^{3+}$, $Tl^+$, $Si^{4+}$, $Si^{3+}$, $Si^{2+}$, $Si^+$, $Ge^{4+}$, $Ge^{3+}$, $Ge^{2+}$, $Ge^+$, $Ge$, $Sn^{4+}$, $Sn^{2+}$, $Pb^{4+}$, $Pb^{2+}$, $As^{5+}$, $As^{3+}$, $As^{2+}$, $As^+$, $Sb^{5+}$, $Sb^{3+}$, $Bi^{5+}$, $Bi^{3+}$, $Te^{6+}$, $Te^{5+}$, $Te^{4+}$, $Te^{2+}$, $La^{3+}$, $La^{2+}$, $Ce^{4+}$, $Ce^{3+}$, $Ce^{2+}$, $Pr^{4+}$, $Pr^{3+}$, $Pr^{2+}$, $Nd^{3+}$, $Nd^{2+}$, $Sm^{3+}$, $Sm^{2+}$, $Eu^{3+}$, $Eu^{2+}$, $Gd^{3+}$, $Gd^{2+}$, $Gd^+$, $Tb^{4+}$, $Tb^{3+}$, $Tb^{2+}$, $Tb^+$, $db^{3+}$, $db^{2+}$, $Ho^{3+}$, $Er^{3+}$, $Tm^{4+}$, $Tm^{3+}$, $Tm^{2+}$, $Yb^{3+}$, $Yb^{2+}$, $Lu^{3+}$ and alloys of any of the foregoing.

The at least one first component used in the method may be selected amongst nanoparticles and/or microparticles of at least one first component described herein. In certain embodiments, the nanoparticles and/or microparticles may be metal precursors such as metal ions, metal salts, metal oxides, and/or metal complexes which may be convertible to metal. More broadly, the at least one first component may be any suitable inorganic particle that can separate into at least two phases from the at least one polymer, including nanoparticles and/or microparticles.

In some embodiments, the nanoparticles or microparticles are composed of a metal or combinations of metals selected from metals of Groups IIA, IIIA, IIIB, IVB, VB, VIB, VIIB, VIIIB, IB or IIB of block d of the Periodic Table of Elements. In other embodiments, said metallic nanoparticles or microparticles are selected from Ba, Al, Sc, Ti, V, Cr, Mn, Fe, Ni, Cu, Zn, Y, Zr, Nb, Tc, Ru, Mo, Rh, W, Au, Pt, Pd, Ag, Mn, Co, Cd, Hf, Ta, Re, Os, Al, Sn, In, Ga, Ir, and combinations thereof. In some other embodiments, said metallic nanoparticles or microparticles are selected from Ba, Al, Cu, Ni, Ag, Au, Pt, Pd, Al, Fe, Co, Ti, Zn, In, Sn, Ga and combinations thereof. In yet other embodiments, said metallic nanoparticles or microparticles are selected from Al, Cu, Ni, Ti, Zn, Ag, and combinations thereof.

In some embodiments, said metallic nanoparticles or microparticles are selected from Ag, Cu, and Ag and Cu nanoparticles. In other embodiments, the metallic nanoparticles or microparticles are Ag nanoparticles. In some embodiments, the at least one first component is a metal precursor selected to be convertible in-situ into a metal by a chemical or electrochemical process. The metal precursor may also be reduced into corresponding metal by reduction of the metal precursor in the presence of, for example, a suitable photoinitiator and a radiation source, a reducing agent (e.g. oxazolines such as 2-methyl-2-oxazoline, 2-ethyl-2-oxazoline, etc.), etc. Thus, in some embodiments, the metal precursor is selected to be convertible into any one of the metals recited hereinabove. In some embodiments, the metal precursor is a salt form of any one metal recited hereinabove.

In some embodiments, the metal salt is comprised of an inorganic or organic anion and an inorganic or organic cation. In some embodiments, the anion is inorganic. Non-limiting examples of inorganic anions include $HO^-$, $F^-$, $Cl^-$, $Br^-$, $I^-$, $NO^{2-}$, $NO^{3-}$, $ClO_4^-$, $SO_4^{2-}$, $SO_3^-$, $PO_4^-$ and $CO_3^{2-}$. In some embodiments, the anion is organic. Non-limiting examples of organic anions include acetate ($CH_3COO^-$), formate ($HCOO^-$), citrate ($C_3H_5O(COO)_3^{-3}$). acetylacetonate, lactate ($CH_3CH(OH)COO^-$), oxalate ($(COO)_2^{-2}$) and any derivative of the aforementioned. In some embodiments, the metal salt is not a metal oxide. In some embodiments, the metal salt is a metal oxide. In some embodiments, the metal salt is a salt of copper. Non-limiting examples of copper metal salts include copper formate, copper citrate, copper acetate, copper nitrate, copper acetylacetonate, copper perchlorate, copper chloride, copper sulfate, copper carbonate, copper hydroxide, copper sulfide or any other copper salt and the combinations thereof.

In some embodiments, the metal salt is a salt of nickel. Non-limiting examples of nickel metal salts include nickel formate, nickel citrate, nickel acetate, nickel nitrate, nickel acetylacetonate, nickel perchlorate, nickel chloride, nickel sulfate, nickel carbonate, nickel hydroxide or any other nickel salts and the combinations thereof.

In some embodiments, the metal salt is a salt of silver. Non-limiting examples of silver metal salts include silver carboxylates, silver lactate, silver nitrate, silver formate or any other silver salt and their mixtures. Typically, silver carboxylates may be used and comprise a silver ion and an organic group containing a carboxylate group. The carboxylate group may comprise from 1 to 20 carbon atoms, typically from 6 to 15 carbon atoms, more typically from 8 to 12 carbon atoms, for example 10 carbon atoms. The carboxylate group is typically an alkanoate. Some non-limiting examples of preferred silver carboxylates are silver ethylhexanoate, silver neodecanoate, silver benzoate, silver phenylacetate, silver isobutyrylacetate, silver benzoylacetate, silver oxalate, silver pivalate and any combinations thereof. In a typical embodiment, silver neodecanoate is used.

In other embodiments, the metal salt is selected from indium(III) acetate, indium(III) chloride, indium(III) nitrate; iron(II) chloride, iron(III) chloride, iron(II) acetate, gallium (III) acetylacetonate, gallium(II) chloride, gallium(III) chloride, gallium(III) nitrate; aluminum(III) chloride, aluminum (III) stearate; silver nitrate, silver chloride; dimethylzinc, diethylzinc, zinc chloride, tin(II) chloride, tin(IV) chloride, tin(II) acetylacetonate, tin(II) acetate; lead(II) acetate, lead (II) acetylacetonate, lead(II) chloride, lead(II) nitrate and PbS.

In other embodiments, the at least one first component is selected from metal oxides such as those mentioned above, including nanoparticles and/or microparticles. In certain embodiments, the metal oxides are selected from alumina, silica, barium titanate, transition metal oxides (e.g. zinc oxide, titanium oxide), and combinations thereof.

In other embodiments, the at least one first component is selected from nanowires, microparticles, nanoparticles, or combinations thereof, including any of the suitable at least one first component mentioned herein. In still other embodiments, the at least one first component comprises graphene.

With respect to the amount of the at least one first component, the amount of the at least one first component may be any suitable amount. For example, the amount may be from about 0.1% to about 90% by weight based on the weight of the composition. In some embodiments, the amount of the at least one first component in the composition may be from about 0.1% to about 80% by weight, from about 0.1% to about 70% by weight, from about 0.1% to about 60% by weight, from about 0.1% to about 50% by weight, from about 0.1% to about 40% by weight, from about 0.1% to about 30% by weight, or from about 0.1% to about 20% by weight based on the weight of the composition.

In other embodiments, various additives may be added. Additives can be included, for example, to increase the solubility of the at least one first component in the at least one polymer component. Various additives include, without being limited thereto, fillers, inhibitors, adhesion promoters, absorbers, dyes, pigments, anti-oxidants, carrier vehicles, heat stabilizers, flame retardants, thixotropic agents, flow control additives, dispersants, or combinations thereof. In typical embodiments, extending fillers, reinforcing fillers, dispersants, or combinations thereof are added. The additives can be microparticles or nanoparticles.

Examples of absorbers include 2-(2-hydroxyphenyl)-benzotriazole, 2-tert-Butyl-6-(5-chloro-2H-benzotriazol-2-yl)-4-methylphenol, 2-hydroxyphenyl benzophenone, 5-Chloro-2-hydroxybenzophenone, 2-(4,6-Diphenyl-1,3,5-triazin-2-yl)-5-[(hexyl)oxy]-phenol, 2,2'-(2,5-thiophenediyl)bis(5-tert-butylbenzoxazole), 4,4'-bis(2-benzoxazolyl)stilbene, 1,4-bis(5-phenyl-2-oxazolyl)benzene, 2-nitrophenyl phenyl sulfide, β-carotene, Sudan Orange G, avobenzone, cinoxate, homosalate, octocrylene, octyl salicylate, and phenylbenzimidazole sulfonic acid.

Examples of inhibitors include hydroquinone, monomethyl ether hydroquinone, tert-butyl hydroquinone, butylated hydroxytoluene, 4-tert-butyl catechol, pyrogallol, 2,3-dimethylhydroquinone, 2-methoxyhydroquinone, methylhydroquinone, cupferron, aluminum cupferrate, triphenylphosphite, triisodecyl phosphite, triallylphosphite, and vinylphosphonic acid.

In embodiments, the formulation may be used to make the antenna described herein.

In certain embodiments, the at least one polymer may be selected from acrylate, methacrylates, fluorinated methacrylates, PEG functionalized methacrylates, epoxies, vinyl ether, urethane acrylate, acrylamides, styrene, crosslinkers (di, tri and tetra functional PEG functionalized acrylates or epoxies) (e.g. 15-35% mol), and the at least one first component may be selected from ferroelectric, ferromagnetic, piezoelectric and carbon material graphene, and/or CNT, for use in vat polymerization 3D printing.

Without further description, it is believed that one of ordinary skill in the art can, using the preceding description and the following illustrative examples, make and utilize and practice the claimed antennas, formulations and methods. A more complete understanding can be obtained by reference to the following specific examples. These examples are provided for purposes of illustration only, and are not intended to be limiting. Thus, the invention should in no way be construed as being limited to the following examples, but rather, should be construed to encompass any and all variations which become evident as a result of the teaching provided in the disclosure. The following working examples therefore, specifically point out aspects, and are not to be construed as limiting in any way.

EXAMPLES

Below is a list of abbreviations used to denote various chemical components of the formulations.

| Abbreviations | |
|---|---|
| Ethylene glycol diacrylate | EGDA |
| 2-Ethylhexyl acrylate | EHA |
| Ethyl (2,4,6-trimethylbenzoyl) phenylphosphinate | TPO-L |
| Silver neodecanoate | AgND |
| 2-Ethyl-2-oxazoline | EtOxa |
| Polyethyleneglycol diacrylate Mn 250* | PEGDA250 |
| Tetraethyleneglycol diacrylate | TEGDA |
| Polyethyleneglycol diacrylate Mn 575* | PEGDA575 |
| Polyethyleneglycol diacrylate Mn 700* | PEGDA700 |
| 1,4-Butanediol diacrylate | BDDA |

| Abbreviations | |
|---|---|
| 1,6-Hexanediol diacrylate | HDDA |
| Ethylene glycol methyl ether acrylate | EGMEA |
| Di(trimethylolpropane) tetraacrylate | DTMPTA |
| 2-Methoxy (polyethyleneoxy)propyl trimethoxysilane | MPPTMS |
| Poly(3,4-ethylenedioxythiophene) polystyrene sulfonate | PEDOT:PSS |

*Mn is the number average molecular mass in g/mol

Printing, Sintering and Characterization for the Formulation Examples Outlined Below:

Ink Characterization:

TGA analysis of resin and functional material resins were performed via a TGA A588 TGA-IR module.

SLA printing of 3D antennas: 3D antennas using functional material (silver salt, silver and graphene) were printed using Peopoly Moai Laser SLA 3D Printer (Technical Specifications: Build Volume: 130×130×180 mm, Laser spot size: about 70 microns, Laser wave length: about 405 nm, Laser power: about 150 mW, Machine size: 330×340×660 mm, Layer Height: about 10 to about 200 microns, Z resolution: Layer Height: about 10 to about 200 μm). Antennas were printed using non-stick liner coated vat with laser power 58 and XY speed set 4.

Sintering of printed 3D antennas: 3D antennas were thermally sintered at about 200 to about 250° C. temperature (program) ranges by varying time using reflow oven under nitrogen with about 500 ppm oxygen. Intense pulsed light sintering (photonic curing) was also performed on thermally sintered samples with a Novacentrix PulseForge® 1300 system with sintering energies ranging from about 2.4 to about 3.1 J/cm2 for about 3000 μs under ambient conditions.

Characterization of 3D antennas: A two-point probe method was used to measure the resistance of the 3D printed antennas using a multimeter after thermal and photonic sintering. Scanning electron microscopy (SEM) images were acquired with a Hitachi SU3500.

Formulation Examples 1-8

Examples 1-8 provide embodiments of formulations which resulted in formulations useful for making 3D printed antennas.

FIGS. 1 and 2 show the dielectric constant or permittivity of Examples 1-8 relative to frequency.

With respect to the Formlab clear used in the examples outlined below, clear resin "RS-F2-GPCL-04" purchased from Formlabs, USA was used.

Example 1: 0.1% Graphene+0.1% Barium Strontium Titanate (BST) Functionalized with 2-Methoxy (Polyethyleneoxy)Propyl Trimethoxysilane (BST-MPPTMS) in Formlab Clear Resin SLA printed Graphene+BST-MPPTMS+Acrylate-based resin (Formlab clear) formulation was prepared by mixing about 0.1 g graphene (N006-P Angstron Materials)+about 0.1 g of BST-MPPTMS in about 99.8 g commercial acrylate-based resin (Formlab clear) to make a final formulation with about 0.1 wt. % graphene and about 0.1 wt. % BST content. The mixture was then sonicated overnight in the dark. The formulation was SLA printed and 3D printed tiles were rinsed with ethanol.

FIGS. 5 and 6 show the Vivaldi antenna, which was 3D printed using the formulation of Example 1, and the results are shown in FIGS. 7 and 8.

Example 1A: 7.88% Ag+0.5% Barium Strontium Titanate (BST) Functionalized with 2-Methoxy (Polyethyleneoxy)Propyl Trimethoxysilane (BST-MPPTMS) in Mixed Resin (7.5 ml (50% PEGDA575, 49% EHA)+2.5 ml (35% PEGDA250, 64% EHA))

SLA printed about 25 g of silver neodecanoate were dissolved in about 5.52 mL of 2-ethyl-2-oxazoline using a planetary mixer at about 2000 rpm for about 30 min followed by about 2200 rpm for about 30 seconds. To the yellow, viscous silver solution was added about 0.613 g of functionalised barium strontium titanate (BST) and about 91.2 g of the acrylate mixed resin (about 7.5 ml (50% PEGDA575, 49% EHA)+about 2.5 ml (35% PEGDA250, 64% EHA)). The combined mixture was then vortex mixed for 2 minutes at 3200 rpm and sonicated for 15 mins. The formulation was SLA printed and sintered at about 250° C. for 1 h in a reflow oven under nitrogen.

Figure 4:
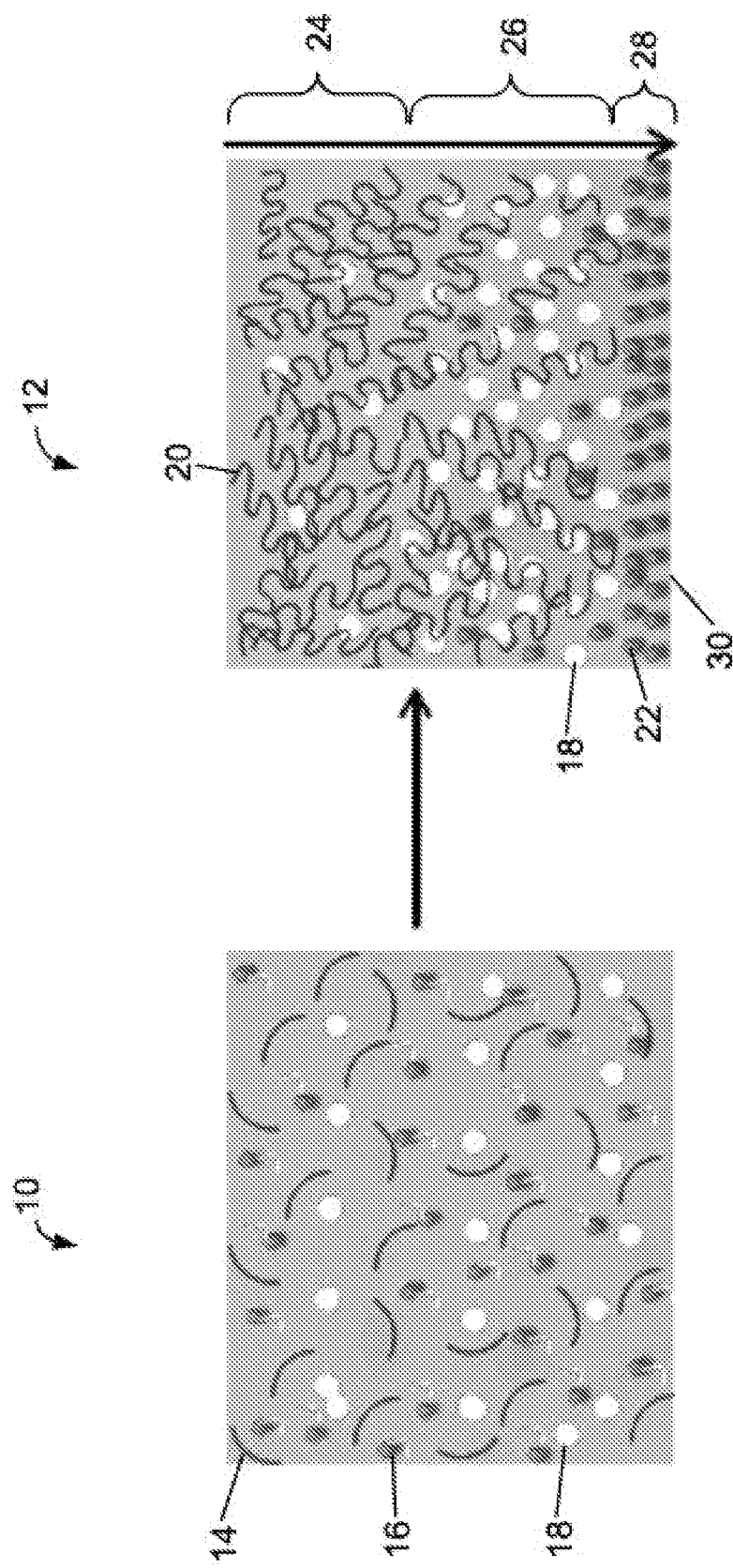
FIG. 4 shows a phase separation of a resin for an exemplary Ag/BST/polymer antenna.

FIG. 4 shows the formulation of Example 1A prior to and after 3D-printing. FIG. 4 shows the formulation 10 before processing and the product 12 after processing. The formulation 10 shows acrylate-based resin (monomer units) 14, Barium Strontium Titanate (BST) nanoparticles 16, and silver precursor nanoparticles 18. The multi-material resin 10 undergoes 3D printing, which can include thermal processing and/or photopolymerization, which allows the formulation to separate into phases. The first phase 24 comprises a polymer 20 (formed from the Acrylate-based resin). The second phase 26 is a concentration gradient of the polymer 20 and BST nanoparticles 16 with the concentration of BST 16 increasing toward the conductive surface 30 of the product 12. The third phase 28 is a coating of silver nanoparticles 22 establishing a conductive surface 30. BST 16 is a ferroelectric material whose dielectric constant (or relative permittivity) changes under an applied electric field. By adding BST 16 as the functional component, the resulting 3D printed antenna becomes tunable using an electric field, using a DC bias voltage to tune the antenna's frequency of operation. To exploit the ferroelectric effect of the BST in an antenna, the BST nanoparticles 16 align adjacent to the conductive silver layer 30. After processing, the product (i.e. antenna) 12 has an increasing concentration of BST 16 near its coated surface of a conductive silver layer 30. Thus, by removing the lossy substrate under the typical antenna, higher efficiencies may be achieved.

Example 2: 0.1% Copper Nanoparticles (CuNP) in Formlab Clear Resin

SLA printed CuNP+Acrylate-based resin (Formlab clear) formulation was prepared by mixing about 0.1 g CuNP in about 99.9 g commercial acrylate-based resin (Formlab clear) to make a final formulation with about 0.1 wt. % CuNP content. The mixture was then sonicated overnight in the dark. The formulation was SLA printed and 3D printed tiles were rinsed with ethanol.

Example 3: 0.1% Graphene in Formlab Clear Resin

SLA printed Graphene+Acrylate-based resin (Formlab clear) formulation was prepared by mixing about 0.1 g graphene (N006-P Angstron Materials) in about 99.9 g commercial acrylate-based resin (Formlab clear) to make a final formulation with about 0.1 wt. % graphene content. The mixture was then sonicated overnight in the dark. The formulation was SLA printed and 3D printed tiles were rinsed with ethanol.

Example 3A: 0.5% Graphene in Formlab Clear Resin

SLA printed Graphene+Acrylate-based resin (Formlab clear) formulation was prepared by mixing about 0.5 g graphene (N006-P Angstron Materials) in about 99.5 g commercial acrylate-based resin (Formlab clear) to make a final formulation with about 0.5 wt. % graphene content. The mixture was then sonicated overnight in the dark. The formulation was SLA printed and 3D printed tiles were rinsed with ethanol.

Example 4: 0.2% PEDOT:PSS in Formlab Clear Resin

SLA printed PEDOT:PSS+Acrylate-based resin (Formlab clear) formulation prepared by mixing about 0.2 g PEDOT:PSS in about 99.8 g commercial acrylate-based resin (Formlab clear) to make a final formulation with about 0.2 wt. % PEDOT:PSS content. The mixture was then sonicated overnight in the dark. The formulation was SLA printed and 3D printed tiles were rinsed with ethanol.

Figure 3:
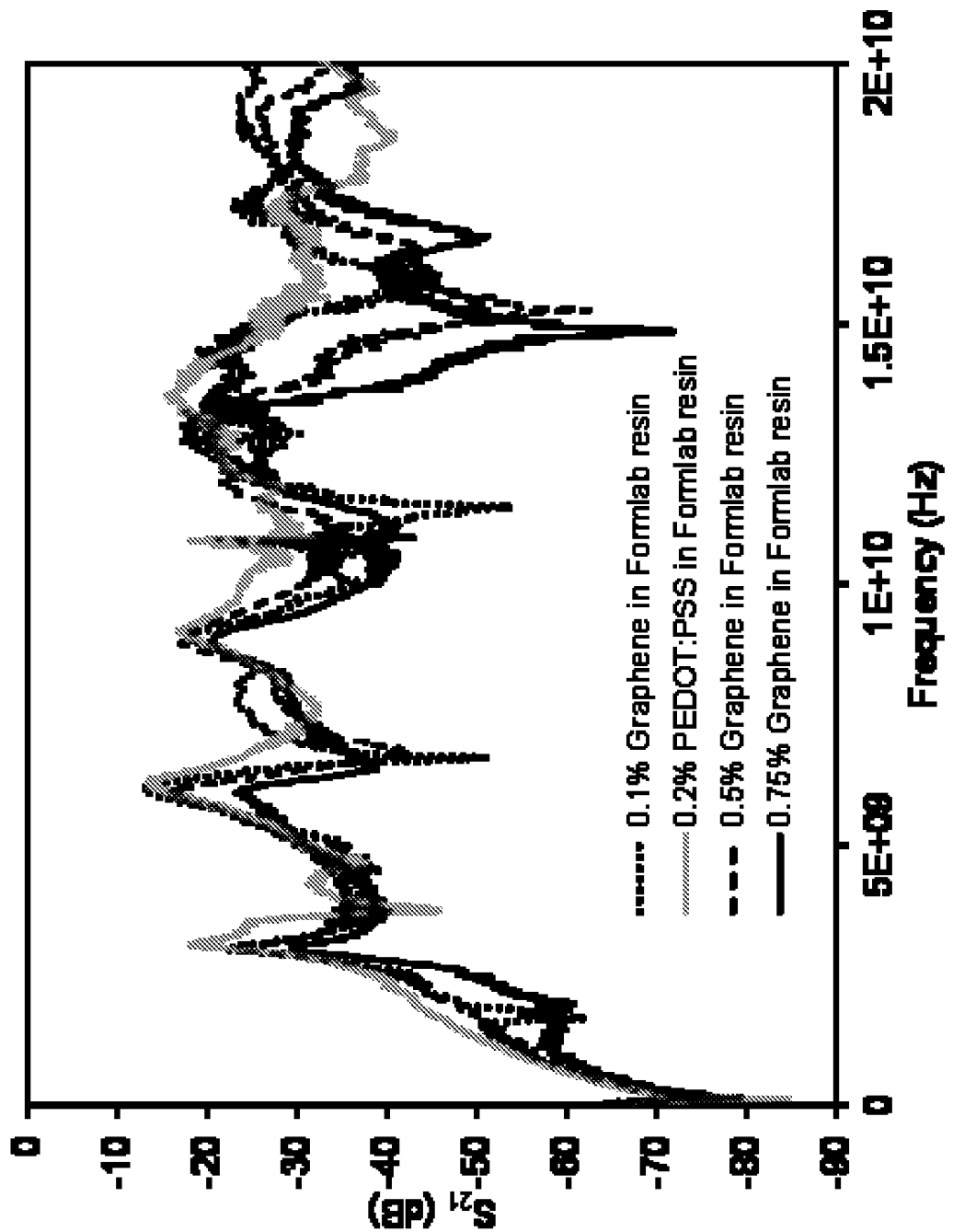
FIG. 3 shows a graph depicting transmission ($S_{21}$) vs. frequency for the formulations of Examples 3, 3A and 4: BD-graphene-T-P114_4: Example 3; LY-0.5% graphene-P1-37: Example 3A; BD-CP-T-P114-31: Example 4.

FIG. 3 shows a graph depicting transmission ($S_{21}$) for Examples 3, 3A and 4: BD-graphene-T-P114_4: Example 3; LY-0.5% graphene-P1-37: Example 3A; BD-CP-T-P114-31: Example 4.

S-parameters describe the input-output relationship between ports (or terminals) in an electrical system. For instance, if in an example having 2 ports (Port 1 and Port 2), then $S_{21}$ is forward transmission from Port 1 to Port 2 and 812 is reverse transmission to port 1. Based on the characterization of different dielectric materials shown in FIGS. 1 and 2, graphene has a low loss tangent and conducting polymer dispersed 3D printed polymer composite has a high loss tangent, respectively.

FIG. 3 shows $S_{21}$ measurement of 3D printed tiles using vat-polymerized resin with different amount of graphene about 0.1 to about 0.75%. These results when compared with high-dielectric loss material conducting polymer show the $S_{21}$ transmission of conducting polymer tile is noisy and low gain due to high loss. However, with increasing amount of graphene, lower values of $S_{21}$ indicates higher received power or high gain. Graphene seems to be promising low-loss dielectric material and suitable for antenna fabrication.

Example 5: 0.2% Iron Oxide in Formlab Clear Resin

SLA printed Iron oxide+Acrylate-based resin (Formlab clear) formulation was prepared by mixing about 0.2 g iron oxide in about 99.8 g commercial acrylate-based resin (Formlab clear) to make a final formulation with about 0.2 wt. % iron oxide content. The mixture was then sonicated overnight in the dark. The formulation was SLA printed and 3D printed tiles were rinsed with ethanol.

Example 6: 0.2% Piezoelectric Material in Formlab Clear Resin

SLA printed piezoelectric material+Acrylate-based resin (Formlab clear) formulation was prepared by mixing about 0.2 g piezoelectric material (APC 850, lead zirconate titanate) in about 99.8 g commercial acrylate-based resin (Formlab clear) to make a final formulation with about 0.2 wt. % piezoelectric material content. The mixture was then sonicated overnight in the dark. The formulation was SLA printed and 3D printed tiles were rinsed with ethanol.

Example 7: 0.03% AgSe Quantum Dots in Formlab Clear Resin

SLA printed AgSe quantum dots+Acrylate-based resin (Formlab clear) formulation prepared by mixing about 0.03 g AgSe quantum dots in about 99.97 g commercial acrylate-based resin (Formlab clear) to make a final formulation with about 0.03 wt. % AgSe quantum dots content. The mixture was then sonicated overnight in the dark. The formulation was SLA printed and 3D printed tiles were rinsed with ethanol.

Example 8: 0.2% TiO$_2$ Functionalized with 2-Methoxy (Polyethyleneoxy)Propyl Trimethoxysilane (TiO$_2$-MPPTMS) in Formlab Clear Resin SLA printed TiO$_2$+Acrylate-based resin (Formlab clear) formulation was prepared by mixing about 0.2 g TiO$_2$-MPPTMS in about 99.8 g commercial acrylate-based resin (Formlab clear) to make a final formulation with about 0.2% TiO$_2$-MPPTMS content. The mixture was then sonicated overnight in the dark. The formulation was SLA printed and 3D printed tiles were rinsed with ethanol.

The results of testing the formulations described above in 3D printed substrates are summarized below in Table 1.

TABLE 1

Summary of Examples of 3D printed substrates that generate functional coatings and their Permittivity (εr) and dielectric loss tangents.

| Frequency (GHz) | ε$_r$ | Tanδ |
|---|---|---|
| 0.1% Graphene + 0.1% BST in formlab | | |
| 3.1 | 3.25 | 0.048 |
| 6.15 | 3.16 | 0.050 |
| 9.1 | 3.26 | 0.046 |
| Control formlab resin | | |
| 3.1 | 3.15 | 0.036 |
| 5.1 | 3.17 | 0.039 |
| 9.1 | 2.98 | 0.046 |
| 0.2% Piezoelectric M in formlab | | |
| 3.1 | 3.31 | 0.070 |
| 6.1 | 3.36 | 0.053 |
| 9.1 | 3.31 | 0.058 |
| 0.1% CuNP in formlab | | |
| 3.1 | 3.14 | 0.061 |
| 6.2 | 3.16 | 0.054 |
| 9.2 | 3.12 | 0.055 |
| 0.2% PEDOT:PSS in formlab | | |
| 3.1 | 3.15 | 0.077 |
| 6.2 | 3.14 | 0.078 |
| 9.1 | 3.11 | 0.085 |
| AgSe quantom dots in formlab | | |
| 6.1 | 3.21 | 0.056 |
| 9.1 | 3.12 | 0.067 |

TABLE 1-continued

Summary of Examples of 3D printed substrates that generate functional coatings and their Permittivity (εr) and dielectric loss tangents.

| Frequency (GHz) | ε$_r$ | Tanδ |
|---|---|---|
| 0.1% Graphene in formlab | | |
| 3 | 3.33 | 0.068 |
| 6.1 | 3.37 | 0.053 |
| 9 | 3.37 | 0.035 |
| 0.2% Iron oxide in formlab | | |
| 3.1 | 3.21 | 0.063 |
| 6.2 | 3.22 | 0.044 |
| 9.2 | 3.11 | 0.065 |
| 0.2% TiO$_2$ in formlab | | |
| 3.1 | 3.24 | 0.071 |
| 6.1 | 3.30 | 0.048 |
| 9.1 | 3.15 | 0.066 |

Formulation Examples 16-53

Examples 16-53 provide embodiments of formulations and printing conditions which resulted in formulations useful for making 3D printed antennas.

Example 16: Ag Precursor+(15% EGDA, 84% EHA) Resin

About 1.5 g of ethyleneglycol diacrylate, about 8.4 g of 2-ethylhexylacrylate, and about 0.1 g of Ethyl (2,4,6-trimethylbenzoyl) phenylphosphinate were added into a 20 mL scintillation vial. The mixture was mixed using a vortex mixer at about 3200 rpm for about 30 seconds. In a separate vial, about 2.5 g of silver neodecanoate were dissolved in about 0.552 mL of 2-ethyl-2-oxazoline using a planetary mixer at about 2000 rpm for about 4 min followed by about 2200 rpm for about 30 seconds. To the yellow, viscous silver solution was added about 9.21 g of the acrylate mixture from the first vial. The combined mixture was then vortex mixed for about 2 minutes at about 3200 rpm. The resin was SLA printed into cylinders about 1 cm in length and about 1 mm in diameter and then thermally sintered at about 250° C. temperature (program) for about 1 hour using reflow oven under nitrogen with about 500 ppm oxygen.

Example 17: Ag Precursor+(20% EGDA, 79% EHA) Resin

About 2.0 g of ethyleneglycol diacrylate, about 7.9 g of 2-ethylhexylacrylate, and about 0.1 g of Ethyl (2,4,6-trimethylbenzoyl) phenylphosphinate were added into a 20 mL scintillation vial. The mixture was mixed using a vortex mixer at about 3200 rpm for about 30 seconds. In a separate vial, about 2.5 g of silver neodecanoate were dissolved in about 0.552 mL of 2-ethyl-2-oxazoline using a planetary mixer at about 2000 rpm for about 4 min followed by about 2200 rpm for about 30 seconds. To the yellow, viscous silver solution was added about 9.21 g of the acrylate mixture from the first vial. The combined mixture was then vortex mixed for about 2 minutes at about 3200 rpm. The resin was SLA printed into cylinders about 1 cm in length and about 1 mm in diameter and then thermally sintered at about 250° C. temperature (program) for about 1 hour using reflow oven under nitrogen with about 500 ppm oxygen.

Example 18: Ag Precursor+(25% EGDA, 74% EHA) Resin

About 2.5 g of ethyleneglycol diacrylate, about 7.4 g of 2-ethylhexylacrylate, and about 0.1 g of Ethyl (2,4,6-trimethylbenzoyl) phenylphosphinate were added into a 20 mL scintillation vial. The mixture was mixed using a vortex mixer at about 3200 rpm for about 30 seconds. In a separate vial, about 2.5 g of silver neodecanoate were dissolved in about 0.552 mL of 2-ethyl-2-oxazoline using a planetary mixer at about 2000 rpm for about 4 min followed by about 2200 rpm for about 30 seconds. To the yellow, viscous silver solution was added about 9.21 g of the acrylate mixture from the first vial. The combined mixture was then vortex mixed for about 2 minutes at about 3200 rpm. The resin was SLA printed into cylinders about 1 cm in length and about 1 mm in diameter and then thermally sintered at about 250° C. temperature (program) for about 1 hour using reflow oven under nitrogen with about 500 ppm oxygen.

Example 19: Ag Precursor+(35% EGDA, 64% EHA) Resin

About 3.5 g of ethyleneglycol diacrylate, about 6.4 g of 2-ethylhexylacrylate, and about 0.1 g of Ethyl (2,4,6-trimethylbenzoyl) phenylphosphinate were added into a 20 mL scintillation vial. The mixture was mixed using a vortex mixer at about 3200 rpm for about 30 seconds. In a separate vial, about 2.5 g of silver neodecanoate were dissolved in about 0.552 mL of 2-ethyl-2-oxazoline using a planetary mixer at about 2000 rpm for about 4 min followed by about 2200 rpm for about 30 seconds. To the yellow, viscous silver solution was added about 9.21 g of the acrylate mixture from the first vial. The combined mixture was then vortex mixed for about 2 minutes at about 3200 rpm. The resin was SLA printed into cylinders about 1 cm in length and about 1 mm in diameter and then thermally sintered at about 250° C. temperature (program) for about 1 hour using reflow oven under nitrogen with about 500 ppm oxygen.

Example 20: Ag Precursor+(50% EGDA, 49% EHA) Resin

About 5.0 g of ethyleneglycol diacrylate, about 4.9 g of 2-ethylhexylacrylate, and about 0.1 g of Ethyl (2,4,6-trimethylbenzoyl) phenylphosphinate were added into a 20 mL scintillation vial. The mixture was mixed using a vortex mixer at about 3200 rpm for about 30 seconds. In a separate vial, about 2.5 g of silver neodecanoate were dissolved in about 0.552 mL of 2-ethyl-2-oxazoline using a planetary mixer at about 2000 rpm for about 4 min followed by about 2200 rpm for about 30 seconds. To the yellow, viscous silver solution was added about 9.21 g of the acrylate mixture from the first vial. The combined mixture was then vortex mixed for about 2 minutes at about 3200 rpm. The resin was SLA printed into cylinders about 1 cm in length and about 1 mm in diameter and then thermally sintered at about 250° C. temperature (program) for about 1 hour using reflow oven under nitrogen with about 500 ppm oxygen.

Example 21: Ag Precursor+(15% PEGDA250, 84% EHA) Resin

About 1.5 g of polyethyleneglycol diacrylate Mn 250, about 8.4 g of 2-ethylhexylacrylate, and about 0.1 g of Ethyl (2,4,6-trimethylbenzoyl) phenylphosphinate were added into a 20 mL scintillation vial. The mixture was mixed using a vortex mixer at about 3200 rpm for about 30 seconds. In a separate vial, about 2.5 g of silver neodecanoate were dissolved in about 0.552 mL of 2-ethyl-2-oxazoline using a planetary mixer at about 2000 rpm for about 4 min followed by about 2200 rpm for about 30 seconds. To the yellow, viscous silver solution was added about 9.21 g of the acrylate mixture from the first vial. The combined mixture was then vortex mixed for about 2 minutes at about 3200 rpm. The resin was SLA printed into cylinders about 1 cm in length and about 1 mm in diameter and then thermally sintered at about 250° C. temperature (program) for about 1 hour using reflow oven under nitrogen with about 500 ppm oxygen.

Example 22: Ag Precursor+(20% PEGDA250, 79% EHA) Resin

About 2.0 g of polyethyleneglycol diacrylate Mn 250, about 7.9 g of 2-ethylhexylacrylate, and about 0.1 g of Ethyl (2,4,6-trimethylbenzoyl) phenylphosphinate were added into a 20 mL scintillation vial. The mixture was mixed using a vortex mixer at about 3200 rpm for about 30 seconds. In a separate vial, about 2.5 g of silver neodecanoate were dissolved in about 0.552 mL of 2-ethyl-2-oxazoline using a planetary mixer at about 2000 rpm for about 4 min followed by about 2200 rpm for about 30 seconds. To the yellow, viscous silver solution was added about 9.21 g of the acrylate mixture from the first vial. The combined mixture was then vortex mixed for about 2 minutes at about 3200 rpm. The resin was SLA printed into cylinders about 1 cm in length and about 1 mm in diameter and then thermally sintered at about 250° C. temperature (program) for about 1 hour using reflow oven under nitrogen with about 500 ppm oxygen.

Example 23: Ag Precursor+(25% PEGDA250, 74% EHA) Resin

About 2.5 g of polyethyleneglycol diacrylate Mn 250, about 7.4 g of 2-ethylhexylacrylate, and about 0.1 g of Ethyl (2,4,6-trimethylbenzoyl) phenylphosphinate were added into a 20 mL scintillation vial. The mixture was mixed using a vortex mixer at about 3200 rpm for about 30 seconds. In a separate vial, about 2.5 g of silver neodecanoate were dissolved in about 0.552 mL of 2-ethyl-2-oxazoline using a planetary mixer at about 2000 rpm for about 4 min followed by about 2200 rpm for about 30 seconds. To the yellow, viscous silver solution was added about 9.21 g of the acrylate mixture from the first vial. The combined mixture was then vortex mixed for about 2 minutes at about 3200 rpm. The resin was SLA printed into cylinders about 1 cm in length and about 1 mm in diameter and then thermally sintered at about 250° C. temperature (program) for about 1 hour using reflow oven under nitrogen with about 500 ppm oxygen.

Example 24: Ag Precursor+(35% PEGDA250, 64% EHA) Resin

About 3.5 g of polyethyleneglycol diacrylate Mn 250, about 6.4 g of 2-ethylhexylacrylate, and about 0.1 g of Ethyl (2,4,6-trimethylbenzoyl) phenylphosphinate were added into a 20 mL scintillation vial. The mixture was mixed using a vortex mixer at about 3200 rpm for about 30 seconds. In a separate vial, about 2.5 g of silver neodecanoate were dissolved in about 0.552 mL of 2-ethyl-2-oxazoline using a planetary mixer at about 2000 rpm for about 4 min followed by about 2200 rpm for about 30 seconds. To the yellow, viscous silver solution was added about 9.21 g of the acrylate mixture from the first vial. The combined mixture was then vortex mixed for about 2 minutes at about 3200 rpm. The resin was SLA printed into cylinders about 1 cm in length and about 1 mm in diameter and then thermally sintered at about 250° C. temperature (program) for about 1 hour using reflow oven under nitrogen with about 500 ppm oxygen.

Example 25: Ag Precursor+(50% PEGDA250, 49% EHA) Resin

About 5.0 g of polyethyleneglycol diacrylate Mn 250, about 4.9 g of 2-ethylhexylacrylate, and about 0.1 g of Ethyl (2,4,6-trimethylbenzoyl) phenylphosphinate were added into a 20 mL scintillation vial. The mixture was mixed using a vortex mixer at about 3200 rpm for about 30 seconds. In a separate vial, about 2.5 g of silver neodecanoate were dissolved in about 0.552 mL of 2-ethyl-2-oxazoline using a planetary mixer at about 2000 rpm for about 4 min followed by about 2200 rpm for about 30 seconds. To the yellow, viscous silver solution was added about 9.21 g of the acrylate mixture from the first vial. The combined mixture was then vortex mixed for about 2 minutes at about 3200 rpm. The resin was SLA printed into cylinders about 1 cm in length and about 1 mm in diameter and then thermally sintered at about 250° C. temperature (program) for about 1 hour using reflow oven under nitrogen with about 500 ppm oxygen.

Example 26: Ag Precursor+(99% PEGDA250) Resin

About 9.9 g of polyethyleneglycol diacrylate Mn 250 and about 0.1 g of Ethyl (2,4,6-trimethylbenzoyl) phenylphosphinate were added into a 20 mL scintillation vial. The mixture was mixed using a vortex mixer at about 3200 rpm for about 1 minute. In a separate vial, about 2.5 g of silver neodecanoate were dissolved in about 0.552 mL of 2-ethyl-2-oxazoline using a planetary mixer at about 2000 rpm for about 4 min followed by about 2200 rpm for about 30 seconds. To the yellow, viscous silver solution was added about 9.21 g of the acrylate mixture from the first vial. The combined mixture was then vortex mixed for about 2 minutes at about 3200 rpm. The resin was SLA printed into cylinders about 1 cm in length and about 1 mm in diameter and then thermally sintered at about 250° C. (program) for about 1 hour using reflow oven under nitrogen with about 500 ppm oxygen.

Example 27: Ag Precursor+(25% TEGDA, 74% EHA) Resin

About 2.5 g of tetraethyleneglycol diacrylate, about 7.4 g of 2-ethylhexylacrylate, and about 0.1 g of Ethyl (2,4,6-trimethylbenzoyl) phenylphosphinate were added into a 20 mL scintillation vial. The mixture was mixed using a vortex mixer at about 3200 rpm for about 30 seconds. In a separate vial, about 2.5 g of silver neodecanoate were dissolved in about 0.552 mL of 2-ethyl-2-oxazoline using a planetary mixer at about 2000 rpm for about 4 min followed by about 2200 rpm for about 30 seconds. To the yellow, viscous silver solution was added about 9.21 g of the acrylate mixture from the first vial. The combined mixture was then vortex mixed for about 2 minutes at about 3200 rpm. The resin was SLA printed into cylinders about 1 cm in length and about 1 mm in diameter and then thermally sintered at about 250° C. temperature (program) for 1 hour using reflow oven under nitrogen with about 500 ppm oxygen.

Example 28: Ag Precursor+(35% TEGDA, 64% EHA) Resin

About 3.5 g of tetraethyleneglycol diacrylate, about 6.4 g of 2-ethylhexylacrylate, and about 0.1 g of Ethyl (2,4,6-trimethylbenzoyl) phenylphosphinate were added into a 20 mL scintillation vial. The mixture was mixed using a vortex mixer at about 3200 rpm for about 30 seconds. In a separate vial, about 2.5 g of silver neodecanoate were dissolved in about 0.552 mL of 2-ethyl-2-oxazoline using a planetary mixer at about 2000 rpm for about 4 min followed by about 2200 rpm for about 30 seconds. To the yellow, viscous silver solution was added about 9.21 g of the acrylate mixture from the first vial. The combined mixture was then vortex mixed for about 2 minutes at about 3200 rpm. The resin was SLA printed into cylinders about 1 cm in length and about 1 mm in diameter and then thermally sintered at about 250° C. temperature (program) for about 1 hour using reflow oven under nitrogen with about 500 ppm oxygen.

Example 29: Ag Precursor+(50% TEGDA, 49% EHA) Resin

About 5.0 g of tetraethyleneglycol diacrylate, about 4.9 g of 2-ethylhexylacrylate, and about 0.1 g of Ethyl (2,4,6-trimethylbenzoyl) phenylphosphinate were added into a 20 mL scintillation vial. The mixture was mixed using a vortex mixer at about 3200 rpm for about 30 seconds. In a separate vial, about 2.5 g of silver neodecanoate were dissolved in about 0.552 mL of 2-ethyl-2-oxazoline using a planetary mixer at about 2000 rpm for about 4 min followed by about 2200 rpm for about 30 seconds. To the yellow, viscous silver solution was added about 9.21 g of the acrylate mixture from the first vial. The combined mixture was then vortex mixed for about 2 minutes at about 3200 rpm. The resin was SLA printed into cylinders about 1 cm in length and about 1 mm in diameter and then thermally sintered at about 250° C. temperature (program) for about 1 hour using reflow oven under nitrogen with about 500 ppm oxygen.

Example 30: Ag Precursor+(99% TEGDA) Resin

About 9.9 g of tetraethyleneglycol diacrylate and about 0.1 g of Ethyl (2,4,6-trimethylbenzoyl) phenylphosphinate were added into a 20 mL scintillation vial. The mixture was mixed using a vortex mixer at about 3200 rpm for about 1 minute. In a separate vial, about 2.5 g of silver neodecanoate were dissolved in about 0.552 mL of 2-ethyl-2-oxazoline using a planetary mixer at about 2000 rpm for about 4 min followed by about 2200 rpm for about 30 seconds. To the yellow, viscous silver solution was added about 9.21 g of the acrylate mixture from the first vial. The combined mixture was then vortex mixed for about 2 minutes at about 3200 rpm. The resin was SLA printed into cylinders about 1 cm in length and about 1 mm in diameter and then thermally sintered at about 250° C. (program) for about 1 hour using reflow oven under nitrogen with about 500 ppm oxygen.

Example 31: Ag Precursor+(25% PEGDA575, 74% EHA) Resin

About 2.5 g of polyethyleneglycol diacrylate Mn 575, about 7.4 g of 2-ethylhexylacrylate, and about 0.1 g of Ethyl (2,4,6-trimethylbenzoyl) phenylphosphinate were added into a 20 mL scintillation vial. The mixture was mixed using a vortex mixer at about 3200 rpm for about 30 seconds. In a separate vial, about 2.5 g of silver neodecanoate were dissolved in about 0.552 mL of 2-ethyl-2-oxazoline using a planetary mixer at about 2000 rpm for about 4 min followed by about 2200 rpm for about 30 seconds. To the yellow, viscous silver solution was added about 9.21 g of the acrylate mixture from the first vial. The combined mixture was then vortex mixed for about 2 minutes at about 3200 rpm. The resin was SLA printed into cylinders about 1 cm in length and about 1 mm in diameter and then thermally sintered at about 250° C. temperature (program) for about 1 hour using reflow oven under nitrogen with about 500 ppm oxygen.

Example 32: Ag Precursor+(35% PEGDA575, 64% EHA) Resin

About 3.5 g of polyethyleneglycol diacrylate Mn 575, about 6.4 g of 2-ethylhexylacrylate, and about 0.1 g of Ethyl (2,4,6-trimethylbenzoyl) phenylphosphinate were added into a 20 mL scintillation vial. The mixture was mixed using a vortex mixer at about 3200 rpm for about 30 seconds. In a separate vial, about 2.5 g of silver neodecanoate were dissolved in about 0.552 mL of 2-ethyl-2-oxazoline using a planetary mixer at about 2000 rpm for about 4 min followed by about 2200 rpm for about 30 seconds. To the yellow, viscous silver solution was added about 9.21 g of the acrylate mixture from the first vial. The combined mixture was then vortex mixed for about 2 minutes at about 3200 rpm. The resin was SLA printed into cylinders about 1 cm in length and about 1 mm in diameter and then thermally sintered at about 250° C. temperature (program) for about 1 hour using reflow oven under nitrogen with about 500 ppm oxygen.

Example 33: Ag Precursor+(45% PEGDA575, 54% EHA) Resin

About 4.5 g of polyethyleneglycol diacrylate Mn 575, about 5.4 g of 2-ethylhexylacrylate, and about 0.1 g of Ethyl (2,4,6-trimethylbenzoyl) phenylphosphinate were added into a 20 mL scintillation vial. The mixture was mixed using a vortex mixer at about 3200 rpm for about 30 seconds. In a separate vial, about 2.5 g of silver neodecanoate were dissolved in about 0.552 mL of 2-ethyl-2-oxazoline using a planetary mixer at about 2000 rpm for about 4 min followed by about 2200 rpm for about 30 seconds. To the yellow, viscous silver solution was added about 9.21 g of the acrylate mixture from the first vial. The combined mixture was then vortex mixed for about 2 minutes at about 3200 rpm. The resin was SLA printed into cylinders about 1 cm in length and about 1 mm in diameter and then thermally sintered at about 250° C. temperature (program) for about 1 hour using reflow oven under nitrogen with about 500 ppm oxygen.

Example 34: Ag Precursor+(50% PEGDA575, 49% EHA) Resin

About 5.0 g of polyethyleneglycol diacrylate Mn 575, about 4.9 g of 2-ethylhexylacrylate, and about 0.1 g of Ethyl (2,4,6-trimethylbenzoyl) phenylphosphinate were added into a 20 mL scintillation vial. The mixture was mixed using a vortex mixer at about 3200 rpm for about 30 seconds. In a separate vial, about 2.5 g of silver neodecanoate were dissolved in about 0.552 mL of 2-ethyl-2-oxazoline using a planetary mixer at about 2000 rpm for about 4 min followed by about 2200 rpm for about 30 seconds. To the yellow, viscous silver solution was added about 9.21 g of the acrylate mixture from the first vial. The combined mixture was then vortex mixed for about 2 minutes at about 3200 rpm. The resin was SLA printed into cylinders about 1 cm in length and about 1 mm in diameter and then thermally sintered at about 250° C. temperature (program) for about 1 hour using reflow oven under nitrogen with about 500 ppm oxygen.

Example 35: Ag Precursor+(65% PEGDA575, 34% EHA) Resin

About 6.5 g of polyethyleneglycol diacrylate Mn 575, about 3.4 g of 2-ethylhexylacrylate, and about 0.1 g of Ethyl (2,4,6-trimethylbenzoyl) phenylphosphinate were added into a 20 mL scintillation vial. The mixture was mixed using a vortex mixer at about 3200 rpm for about 30 seconds. In a separate vial, about 2.5 g of silver neodecanoate were dissolved in about 0.552 mL of 2-ethyl-2-oxazoline using a planetary mixer at about 2000 rpm for about 4 min followed by about 2200 rpm for about 30 seconds. To the yellow, viscous silver solution was added about 9.21 g of the acrylate mixture from the first vial. The combined mixture was then vortex mixed for about 2 minutes at about 3200 rpm. The resin was SLA printed into cylinders about 1 cm in length and about 1 mm in diameter and then thermally sintered at about 250° C. temperature (program) for about 1 hour using reflow oven under nitrogen with about 500 ppm oxygen.

Example 36: Ag Precursor+(25% PEGDA700, 74% EHA) Resin

About 2.5 g of polyethyleneglycol diacrylate Mn 700, about 7.4 g of 2-ethylhexylacrylate, and about 0.1 g of Ethyl (2,4,6-trimethylbenzoyl) phenylphosphinate were added into a 20 mL scintillation vial. The mixture was mixed using a vortex mixer at about 3200 rpm for about 30 seconds. In a separate vial, about 2.5 g of silver neodecanoate were dissolved in about 0.552 mL of 2-ethyl-2-oxazoline using a planetary mixer at about 2000 rpm for about 4 min followed by about 2200 rpm for about 30 seconds. To the yellow, viscous silver solution was added about 9.21 g of the acrylate mixture from the first vial. The combined mixture was then vortex mixed for about 2 minutes at about 3200 rpm. The resin was SLA printed into cylinders about 1 cm in length and about 1 mm in diameter and then thermally sintered at about 250° C. temperature (program) for about 1 hour using reflow oven under nitrogen with about 500 ppm oxygen.

Example 37: Ag Precursor+(35% PEGDA700, 64% EHA) Resin

About 3.5 g of polyethyleneglycol diacrylate Mn 700, about 6.4 g of 2-ethylhexylacrylate, and about 0.1 g of Ethyl (2,4,6-trimethylbenzoyl) phenylphosphinate were added into a 20 mL scintillation vial. The mixture was mixed using a vortex mixer at about 3200 rpm for about 30 seconds. In a separate vial, about 2.5 g of silver neodecanoate were dissolved in about 0.552 mL of 2-ethyl-2-oxazoline using a planetary mixer at about 2000 rpm for about 4 min followed by about 2200 rpm for about 30 seconds. To the yellow, viscous silver solution was added about 9.21 g of the acrylate mixture from the first vial. The combined mixture was then vortex mixed for about 2 minutes at about 3200 rpm. The resin was SLA printed into cylinders about 1 cm in length and about 1 mm in diameter and then thermally sintered at about 250° C. temperature (program) for about 1 hour using reflow oven under nitrogen with about 500 ppm oxygen.

Example 38: Ag Precursor+(50% PEGDA700, 49% EHA) Resin

About 5.0 g of polyethyleneglycol diacrylate Mn 700, about 4.9 g of 2-ethylhexylacrylate, and about 0.1 g of Ethyl (2,4,6-trimethylbenzoyl) phenylphosphinate were added into a 20 mL scintillation vial. The mixture was mixed using a vortex mixer at about 3200 rpm for about 30 seconds. In a separate vial, about 2.5 g of silver neodecanoate were dissolved in about 0.552 mL of 2-ethyl-2-oxazoline using a planetary mixer at about 2000 rpm for about 4 min followed by about 2200 rpm for about 30 seconds. To the yellow, viscous silver solution was added about 9.21 g of the acrylate mixture from the first vial. The combined mixture was then vortex mixed for about 2 minutes at about 3200 rpm. The resin was SLA printed into cylinders about 1 cm in length and about 1 mm in diameter and then thermally sintered at about 250° C. temperature (program) for about 1 hour using reflow oven under nitrogen with about 500 ppm oxygen.

Example 39: Ag Precursor+(60% PEGDA700, 39% EHA) Resin

About 6.0 g of polyethyleneglycol diacrylate Mn 700, about 3.9 g of 2-ethylhexylacrylate, and about 0.1 g of Ethyl (2,4,6-trimethylbenzoyl) phenylphosphinate were added into a 20 mL scintillation vial. The mixture was mixed using a vortex mixer at about 3200 rpm for about 30 seconds. In a separate vial, about 2.5 g of silver neodecanoate were dissolved in about 0.552 mL of 2-ethyl-2-oxazoline using a planetary mixer at about 2000 rpm for about 4 min followed by about 2200 rpm for about 30 seconds. To the yellow, viscous silver solution was added about 9.21 g of the acrylate mixture from the first vial. The combined mixture was then vortex mixed for about 2 minutes at about 3200 rpm. The resin was SLA printed into cylinders about 1 cm in length and about 1 mm in diameter and then thermally sintered at about 250° C. temperature (program) for about 1 hour using reflow oven under nitrogen with about 500 ppm oxygen.

Example 40: Ag Precursor+(80% PEGDA700, 19% EHA) Resin

About 8.0 g of polyethyleneglycol diacrylate Mn 700, about 1.9 g of 2-ethylhexylacrylate, and about 0.1 g of Ethyl (2,4,6-trimethylbenzoyl) phenylphosphinate were added into a 20 mL scintillation vial. The mixture was mixed using a vortex mixer at about 3200 rpm for about 30 seconds. In a separate vial, about 2.5 g of silver neodecanoate were dissolved in about 0.552 mL of 2-ethyl-2-oxazoline using a planetary mixer at about 2000 rpm for about 4 min followed by about 2200 rpm for about 30 seconds. To the yellow, viscous silver solution was added about 9.21 g of the acrylate mixture from the first vial. The combined mixture was then vortex mixed for 2 minutes at 3200 rpm. The resin was SLA printed into cylinders about 1 cm in length and about 1 mm in diameter and then thermally sintered at about 250° C. temperature (program) for about 1 hour using reflow oven under nitrogen with about 500 ppm oxygen.

Example 41: Ag Precursor+(99% PEGDA700) Resin

About 9.9 g of polyethyleneglycol diacrylate Mn 700 and about 0.1 g of Ethyl (2,4,6-trimethylbenzoyl) phenylphosphinate were added into a 20 mL scintillation vial. The mixture was mixed using a vortex mixer at about 3200 rpm for about 30 seconds. In a separate vial, about 2.5 g of silver neodecanoate were dissolved in about 0.552 mL of 2-ethyl-2-oxazoline using a planetary mixer at about 2000 rpm for about 4 min followed by about 2200 rpm for about 30 seconds. To the yellow, viscous silver solution was added about 9.21 g of the acrylate mixture from the first vial. The combined mixture was then vortex mixed for about 2 minutes at about 3200 rpm. The resin was SLA printed into cylinders about 1 cm in length and about 1 mm in diameter and then thermally sintered at about 250° C. temperature (program) for about 1 hour using reflow oven under nitrogen with about 500 ppm oxygen.

Example 42: Ag Precursor+(35% 1,4-Butanediol Diacrylate, 64% EHA) Resin

About 3.5 g of 1,4-butanediol diacrylate, about 6.4 g of 2-ethylhexylacrylate, and about 0.1 g of Ethyl (2,4,6-trimethylbenzoyl) phenylphosphinate were added into a 20 mL scintillation vial. The mixture was mixed using a vortex mixer at about 3200 rpm for about 30 seconds. In a separate vial, about 2.5 g of silver neodecanoate were dissolved in about 0.552 mL of 2-ethyl-2-oxazoline using a planetary mixer at about 2000 rpm for about 4 min followed by about 2200 rpm for about 30 seconds. To the yellow, viscous silver solution was added about 9.21 g of the acrylate mixture from the first vial. The combined mixture was then vortex mixed for about 2 minutes at about 3200 rpm. The resin was SLA printed into cylinders about 1 cm in length and about 1 mm in diameter and then thermally sintered at about 250° C. temperature (program) for about 1 hour using reflow oven under nitrogen with about 500 ppm oxygen.

Example 43: Ag Precursor+(50% 1,4-Butanediol Diacrylate, 4.9% EHA) Resin

About 5.0 g of 1,4-butanediol diacrylate, about 4.9 g of 2-ethylhexylacrylate, and about 0.1 g of Ethyl (2,4,6-trimethylbenzoyl) phenylphosphinate were added into a 20 mL scintillation vial. The mixture was mixed using a vortex mixer at about 3200 rpm for about 30 seconds. In a separate vial, about 2.5 g of silver neodecanoate were dissolved in about 0.552 mL of 2-ethyl-2-oxazoline using a planetary mixer at about 2000 rpm for about 4 min followed by about 2200 rpm for about 30 seconds. To the yellow, viscous silver solution was added about 9.21 g of the acrylate mixture from the first vial. The combined mixture was then vortex mixed for about 2 minutes at about 3200 rpm. The resin was SLA printed into cylinders about 1 cm in length and about 1 mm in diameter and then thermally sintered at about 250° C. temperature (program) for about 1 hour using reflow oven under nitrogen with about 500 ppm oxygen.

Example 44: Ag Precursor+(65% 1,4-Butanediol Diacrylate, 34% EHA) Resin

About 6.5 g of 1,4-butanediol diacrylate, about 3.4 g of 2-ethylhexylacrylate, and about 0.1 g of Ethyl (2,4,6-trimethylbenzoyl) phenylphosphinate were added into a 20 mL scintillation vial. The mixture was mixed using a vortex mixer at about 3200 rpm for about 30 seconds. In a separate vial, about 2.5 g of silver neodecanoate were dissolved in about 0.552 mL of 2-ethyl-2-oxazoline using a planetary mixer at about 2000 rpm for about 4 min followed by about 2200 rpm for about 30 seconds. To the yellow, viscous silver solution was added about 9.21 g of the acrylate mixture from the first vial. The combined mixture was then vortex mixed for about 2 minutes at about 3200 rpm. The resin was SLA printed into cylinders about 1 cm in length and about 1 mm in diameter and then thermally sintered at about 250° C. temperature (program) for about 1 hour using reflow oven under nitrogen with about 500 ppm oxygen.

Example 45: Ag Precursor+(35% 1,6-Hexanediol Diacrylate, 64% EHA) Resin

About 3.5 g of 1,6-hexanediol diacrylate, about 6.4 g of 2-ethylhexylacrylate, and about 0.1 g of Ethyl (2,4,6-trimethylbenzoyl) phenylphosphinate were added into a 20 mL scintillation vial. The mixture was mixed using a vortex mixer at about 3200 rpm for about 30 seconds. In a separate vial, about 2.5 g of silver neodecanoate were dissolved in about 0.552 mL of 2-ethyl-2-oxazoline using a planetary mixer at about 2000 rpm for about 4 min followed by about 2200 rpm for about 30 seconds. To the yellow, viscous silver solution was added about 9.21 g of the acrylate mixture from the first vial. The combined mixture was then vortex mixed for about 2 minutes at about 3200 rpm. The resin was SLA printed into cylinders about 1 cm in length and about 1 mm in diameter and then thermally sintered at about 250° C. temperature (program) for about 1 hour using reflow oven under nitrogen with about 500 ppm oxygen.

Example 46: Ag Precursor+(50% 1,6-Hexanediol Diacrylate, 4.9% EHA) Resin

About 5.0 g of 1,6-hexanediol diacrylate, about 4.9 g of 2-ethylhexylacrylate, and about 0.1 g of Ethyl (2,4,6-trimethylbenzoyl) phenylphosphinate were added into a 20 mL scintillation vial. The mixture was mixed using a vortex mixer at about 3200 rpm for about 30 seconds. In a separate vial, about 2.5 g of silver neodecanoate were dissolved in about 0.552 mL of 2-ethyl-2-oxazoline using a planetary mixer at about 2000 rpm for about 4 min followed by about 2200 rpm for about 30 seconds. To the yellow, viscous silver solution was added about 9.21 g of the acrylate mixture from the first vial. The combined mixture was then vortex mixed for about 2 minutes at about 3200 rpm. The resin was SLA printed into cylinders about 1 cm in length and about 1 mm in diameter and then thermally sintered at about 250° C. temperature (program) for about 1 hour using reflow oven under nitrogen with about 500 ppm oxygen.

Example 47: Ag Precursor+(65% 1,6-Hexanediol Diacrylate, 34% EHA) Resin

About 6.5 g of 1,6-hexanediol diacrylate, about 3.4 g of 2-ethylhexylacrylate, and about 0.1 g of Ethyl (2,4,6-trimethylbenzoyl) phenylphosphinate were added into a 20 mL scintillation vial. The mixture was mixed using a vortex mixer at about 3200 rpm for about 30 seconds. In a separate vial, about 2.5 g of silver neodecanoate were dissolved in about 0.552 mL of 2-ethyl-2-oxazoline using a planetary mixer at about 2000 rpm for about 4 min followed by about 2200 rpm for about 30 seconds. To the yellow, viscous silver solution was added about 9.21 g of the acrylate mixture from the first vial. The combined mixture was then vortex mixed for about 2 minutes at about 3200 rpm. The resin was SLA printed into cylinders about 1 cm in length and about 1 mm in diameter and then thermally sintered at about 250° C. temperature (program) for 1 hour using reflow oven under nitrogen with about 500 ppm oxygen.

Example 48: Ag Precursor+(50% 1,6-Hexanediol Diacrylate, 49% EGMEA) Resin

About 5.0 g of 1,6-hexanediol diacrylate, about 4.9 g of ethyleneglycol methyl ether acrylate, and about 0.1 g of Ethyl (2,4,6-trimethylbenzoyl) phenylphosphinate were added into a 20 mL scintillation vial. The mixture was mixed using a vortex mixer at about 3200 rpm for about 30 seconds. In a separate vial, about 2.5 g of silver neodecanoate were dissolved in about 0.552 mL of 2-ethyl-2-oxazoline using a planetary mixer at about 2000 rpm for about 4 min followed by about 2200 rpm for about 30 seconds. To the yellow, viscous silver solution was added about 9.21 g of the acrylate mixture from the first vial. The combined mixture was then vortex mixed for about 2 minutes at about 3200 rpm. The resin was SLA printed into cylinders about 1 cm in length and about 1 mm in diameter and then thermally sintered at about 250° C. temperature (program) for about 1 hour using reflow oven under nitrogen with about 500 ppm oxygen.

Example 49: Ag Precursor+(25% DTMPTA, 74% EHA) Resin

About 2.5 g of di(trimethylolpropane) tetraacrylate, about 7.4 g of 2-ethylhexylacrylate, and about 0.1 g of Ethyl (2,4,6-trimethylbenzoyl) phenylphosphinate were added into a 20 mL scintillation vial. The mixture was mixed using a vortex mixer at about 3200 rpm for about 30 seconds. In a separate vial, about 2.5 g of silver neodecanoate were dissolved in about 0.552 mL of 2-ethyl-2-oxazoline using a planetary mixer at about 2000 rpm for about 4 min followed by about 2200 rpm for about 30 seconds. To the yellow, viscous silver solution was added about 9.21 g of the acrylate mixture from the first vial. The combined mixture was then vortex mixed for about 2 minutes at about 3200 rpm. The resin was SLA printed into cylinders about 1 cm in length and about 1 mm in diameter and then thermally sintered at about 250° C. temperature (program) for about 1 hour using reflow oven under nitrogen with about 500 ppm oxygen.

Example 50: $TiO_2$+(35% PEGDA250, 64% EHA) Resin

About 3.5 g of polyethyleneglycol diacrylate Mn 250, about 6.4 g of 2-ethylhexylacrylate, and about 0.1 g of Ethyl (2,4,6-trimethylbenzoyl) phenylphosphinate were added into a 20 mL scintillation vial. The mixture was mixed using a vortex mixer at about 3200 rpm for about 30 seconds. To this vial, about 0.25 g of $TiO_2$ functionalized with 2-methoxy(polyethyleneoxy)propyl trimethoxysilane were added and the combined mixture was then sonicated overnight in the dark. The resin was SLA printed into cylinders about 1 cm in length and about 1 mm in diameter and then thermally sintered at about 250° C. temperature (program) for about 1 hour using reflow oven under nitrogen with about 500 ppm oxygen.

Example 51: TiO₂+(35% PEGDA250, 64% EHA and Toluene) Resin

About 3.5 g of polyethyleneglycol diacrylate Mn 250, about 6.17 g of 2-ethylhexylacrylate, about 2.3 ml toluene and about 0.1 g of Ethyl (2,4,6-trimethylbenzoyl) phenylphosphinate were added into a 20 mL scintillation vial. The mixture was mixed using a vortex mixer at about 3200 rpm for about 30 seconds. To this vial, about 0.25 g of TiO₂ functionalized with 2-methoxy(polyethyleneoxy)propyl trimethoxysilane were added and the combined mixture was then sonicated overnight in the dark. The resin was SLA printed into cylinders about 1 cm in length and about 1 mm in diameter and then thermally sintered at about 250° C. temperature (program) for about 1 hour using reflow oven under nitrogen with about 500 ppm oxygen.

Figure 13:
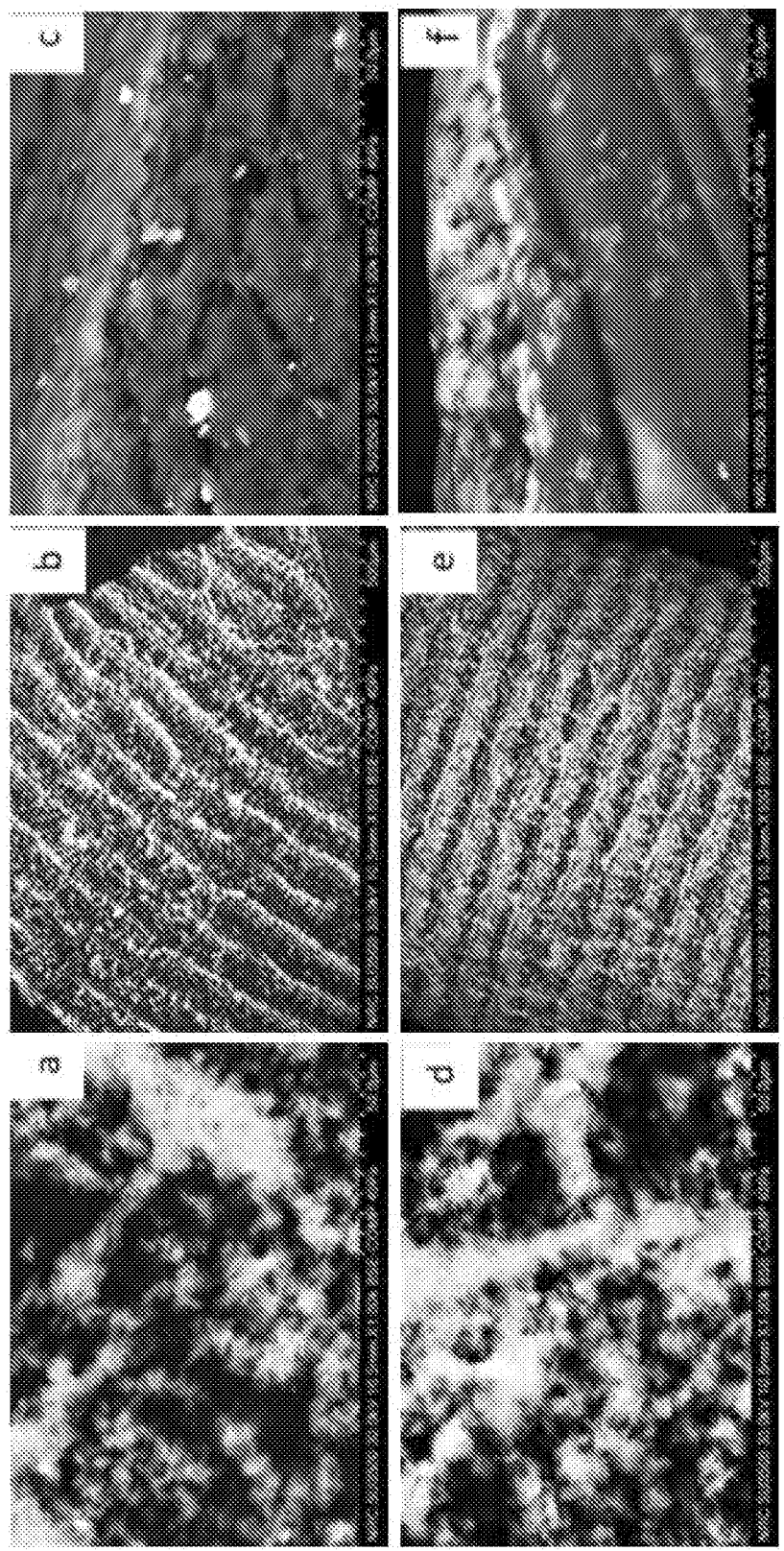
FIG. 13 shows SEM images of 3D $TiO_2$ antennas printed without toluene (a, b and c) and with toluene (d, e and f). The 3D $TiO_2$ antennas were prepared using the formulations described in Examples 50 and 51.
Figure 14:
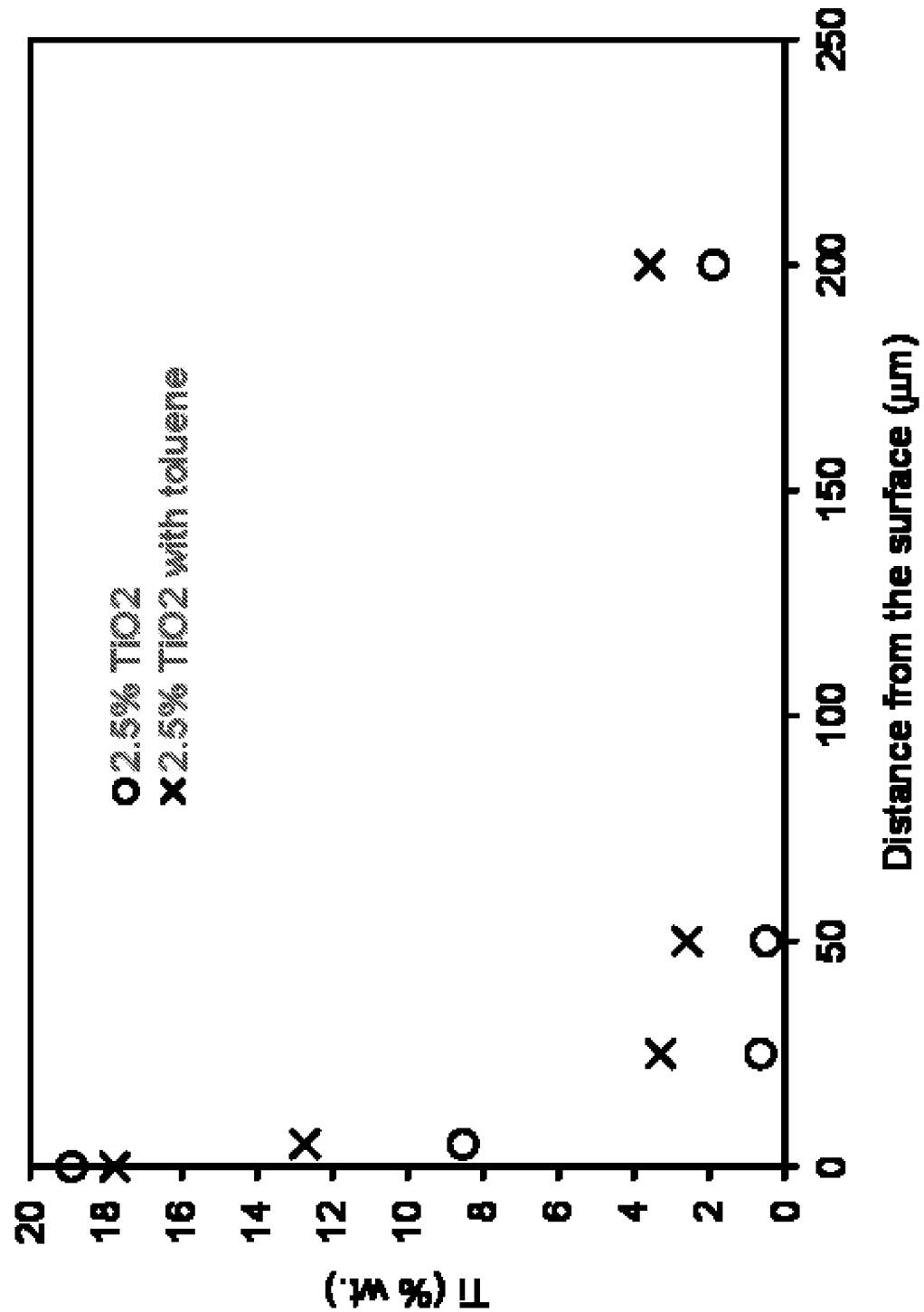
FIG. 14 shows wt % of $TiO_2$ as a function of distance from the surface of the 3D $TiO_2$ antennas. The 3D $TiO_2$ antennas were prepared using the formulations described in Examples 50 and 51.

FIG. 13 shows SEM images of 3D TiO₂ antennas printed without toluene (a, b and c) and with toluene (d, e and f) and FIG. 14 shows wt % of TiO₂ as a function of distance from the surface of the 3D TiO₂ antennas.

Example 52: Barium Strontium Titanate (BST)+(35% PEGDA250, 64% EHA) Resin

About 3.5 g of polyethyleneglycol diacrylate Mn 250, about 6.4 g of 2-ethylhexylacrylate, and about 0.1 g of Ethyl (2,4,6-trimethylbenzoyl) phenylphosphinate were added into a 20 mL scintillation vial. The mixture was mixed using a vortex mixer at about 3200 rpm for about 30 seconds. To this vial, about 0.25 g of Barium Strontium Titanate (BST) functionalized with 2-methoxy(polyethyleneoxy)propyl trimethoxysilane were added and the combined mixture was then sonicated overnight in the dark. The resin was SLA printed into cylinders about 1 cm in length and about 1 mm in diameter and then thermally sintered at about 250° C. temperature (program) for about 1 hour using reflow oven under nitrogen with about 500 ppm oxygen.

Figure 15:
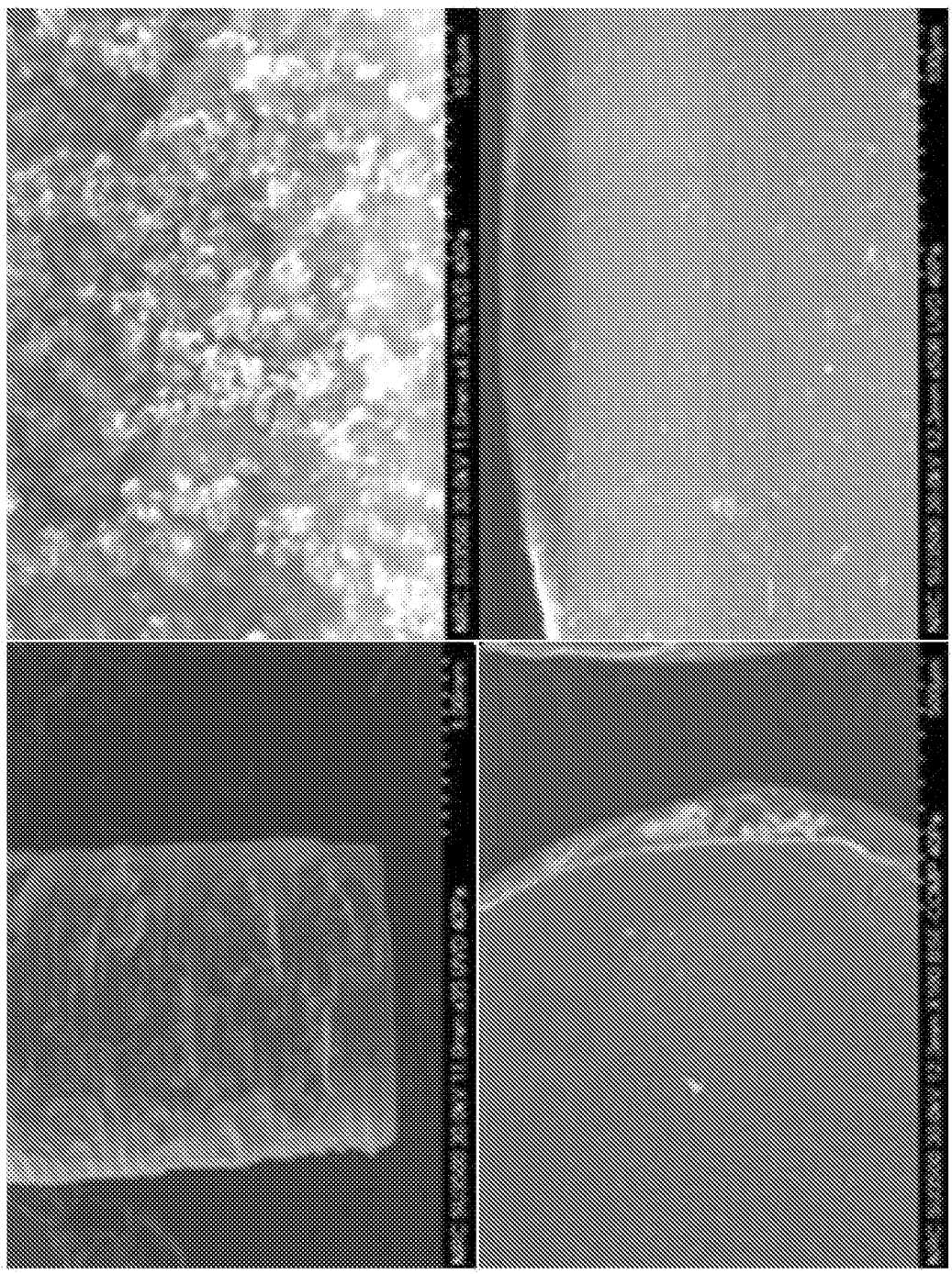
FIG. 15 shows SEM images of 3D Barium Strontium Titanate (BST) antenna. The 3D BST antenna was prepared using the formulation described in Example 52.

FIG. 15 shows SEM images of 3D Barium Strontium Titanate (BST) antenna.

Example 53: Iron Oxide+(35% PEGDA250, 64% EHA) Resin

About 3.5 g of polyethyleneglycol diacrylate Mn 250, about 6.4 g of 2-ethylhexylacrylate, and about 0.1 g of Ethyl (2,4,6-trimethylbenzoyl) phenylphosphinate were added into a 20 mL scintillation vial. The mixture was mixed using a vortex mixer at about 3200 rpm for about 30 seconds. To this vial, about 0.25 g of iron oxide were added and the combined mixture was then sonicated overnight in the dark. The resin was SLA printed into cylinders about 1 cm in length and about 1 mm in diameter and then thermally sintered at about 250° C. temperature (program) for about 1 hour using reflow oven under nitrogen with about 500 ppm oxygen.

Figure 16:
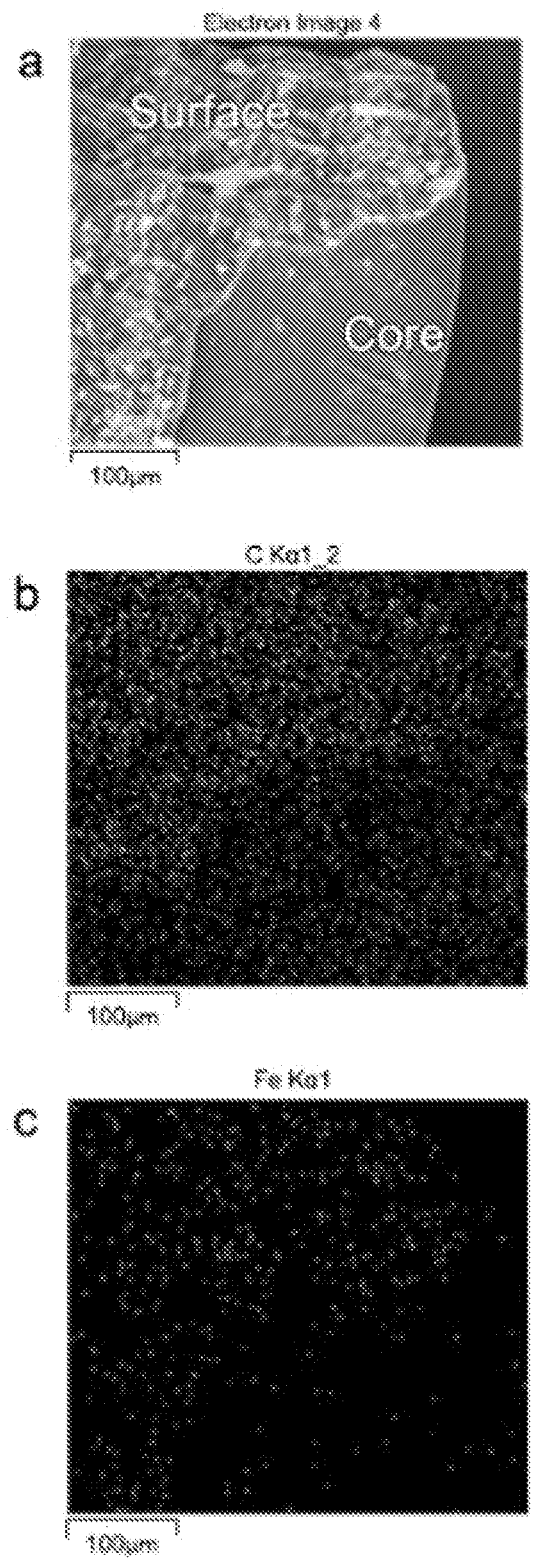
FIG. 16 shows a) SEM images of the cross-section of a printed cylinder with iron oxide nanoparticles. The nanoparticles appear as bright areas in the SEM; energy dispersion spectroscopy (EDS) analysis of the SEM mapping out b) carbon and c) iron in the sample. The 3D iron antenna was prepared using the formulation described in Example 53.

FIG. 16 shows a) SEM images of the cross-section of a printed cylinder with iron oxide nanoparticles. The nanoparticles appear as bright areas in the SEM; energy dispersion spectroscopy (EDS) analysis of the SEM mapping out b) carbon and c) iron in the sample.

The results of testing the formulations described above in 3D printing processes are summarized below in Table 2.

TABLE 2

Summary of Examples of 3D printing antennas that generate functional coatings defined by the concentrations of about 15% to about 35% mol difunctional cross-linking agent of the resin mixture.

| Example No. | Functional component | Resin | % mol cross-linking agent | Processing | Comment |
|---|---|---|---|---|---|
| 16 | AgND + EtOxa (7.9% Ag metal) | 15% wt. EG DA, 84% wt. EHA, 1% wt. TPO-L | 16 | 1) SLA printing 2) thermal sintering | Conducting antennas 0.64 Ω/cm |
| 17 | AgND + EtOxa (7.9% Ag metal) | 20% wt. EGDA, 79% wt. EHA, 1% wt. TPO-L | 21 | 1) SLA printing 2) thermal sintering | Conducting antennas 0.88 Ω/cm |
| 18 | AgND + EtOxa (7.9% Ag metal) | 25% wt. EGDA, 74% wt. EHA, 1% wt. TPO-L | 27 | 1) SLA printing 2) thermal sintering | Conducting antennas 1 Ω/cm |
| 21 | AgND + EtOxa (7.9% Ag metal) | 15% wt. PEGDA250, 84% wt. EHA, 1% wt. TPO-L | 11 | 1) SLA printing 2) thermal sintering | Conducting antennas 4.3 Ω/cm |
| 22 | AgND + EtOxa (7.9% Ag metal) | 20% wt. PEGDA250, 79% wt. EHA, 1% wt. TPO-L | 14 | 1) SLA printing 2) thermal sintering | Conducting antennas 1.36 Ω/cm |
| 23 | AgND + EtOxa (7.9% Ag metal) | 25% wt. PEGDA250, 74% wt. EHA, 1% wt. TPO-L | 20 | 1) SLA printing 2) thermal sintering | Conducting antennas 2 Ω/cm |
| 24 | AgND + EtOxa (7.9% Ag metal) | 35% wt. PEGDA250, 64% wt. EHA, 1% wt TPO-L | 29 | 1) SLA printing 2) thermal sintering | Conducting antennas 1.4 Ω/cm |

TABLE 2-continued

Summary of Examples of 3D printing antennas that generate functional coatings defined by the concentrations of about 15% to about 35% mol difunctional cross-linking agent of the resin mixture.

| Example No. | Functional component | Resin | % mol cross-linking agent | Processing | Comment |
|---|---|---|---|---|---|
| 27 | AgND + EtOxa (7.9% Ag metal) | 25% wt. TEGDA, 74% wt. EHA, 1% wt. TPO-L | 18 | 1) SLA printing 2) thermal sintering | Conducting antennas 1.85 Ω/cm |
| 28 | AgND + EtOxa (7.9% Ag metal) | 35% wt. TEGDA, 64% wt. EHA, 1% wt. TPO-L | 26 | 1) SLA printing 2) thermal sintering | Conducting antennas 1.28 Ω/cm |
| 31 | AgND + EtOxa (7.9% Ag metal) | 25% wt. PEGDA575, 74% wt. EHA, 1% wt. TPO-L | 12 | 1) SLA printing 2) thermal sintering | Conducting antennas 4.96 Ω/cm |
| 32 | AgND + EtOxa (7.9% Ag metal) | 35% wt. PEGDA575, 64% wt. EHA, 1% wt. TPO-L | 20 | 1) SLA printing 2) thermal sintering | Conducting antennas 2.16 Ω/cm |
| 33 | AgND + EtOxa (7.9% Ag metal) | 45% wt. PEGDA575, 54% wt. EHA, 1% wt. TPO-L | 28 | 1) SLA printing 2) thermal sintering | Conducting antennas 4.24 Ω/cm |
| 34 | AgND + EtOxa (7.9% Ag metal) | 50% wt. PEGDA575, 49% wt. EHA, 1% wt. TPO-L | 33 | 1) SLA printing 2) thermal sintering | Conducting antennas 7.42 Ω/cm |
| 36 | AgND + EtOxa (7.9% Ag metal) | 25% wt. PEG700, 74% wt. EHA, 1% wt. TPO-L | 11 | 1) SLA printing 2) thermal sintering | Conducting antennas 2.23 Ω/cm |
| 37 | AgND + EtOxa (7.9% Ag metal) | 35% wt. PEGDA700, 64% wt. EHA, 1% wt. TPO-L | 18 | 1) SLA printing 2) thermal sintering | Conducting antennas 2.64 Ω/cm |
| 42 | AgND + EtOxa (7.9% Ag metal) | 35% wt. BDDA, 64% wt. EHA, 1% TPO-L | 33 | 1) SLA printing 2) thermal sintering | Conducting antennas 1.32 Ω/cm |
| 45 | AgND + EtOxa (7.9% Agmetal) | 35% wt. HDDA, 64% wt. EHA, 1% wt. TPO-L | 31 | 1) SLA printing 2) thermal sintering | Conducting antennas 0.94 Ω/cm |
| 50 | 2.5% TiO$_2$ functionalized with 2-methoxy (polyethyleneoxy) propyl trimethoxysilane | 35% wt. PEGDA250, 64% wt. EHA, 1% wt. TPO-L | 29 | 1) SLA printing 2) thermal sintering | Functional antennas with phase separation (e.g. coated) |
| 51 | 2.5% TiO$_2$ functionalized with 2-methoxy (polyethyleneoxy) propyl trimethoxysilane | 35% wt. PEGDA250, 61.7% wt. EHA, 1% wt. TPO-L, toluene | 29 | 1) SLA printing 2) thermal sintering | Functional antennas with phase separation |
| 52 | 2.5% Barium Strontium Titanate (BST) functionalized with 2-methoxy (polyethyleneoxy)propyl trimethoxysilane | 35% wt. PEGDA250, 64% wt. EHA, 1% wt. TPO-L | 29 | 1) SLA printing 2) thermal sintering | Functional antennas with phase separation |
| 53 | 2.5% Iron oxide | 35% wt. PEGDA250, 64% wt. EHA, 1% wt. TPO-L | 29 | 1) SLA printing 2) thermal sintering | Functional antennas with phase separation |
| 54 | AgND + EtOxa (7.9% Ag metal) + 0.2% Graphene | 50% PEGDA575, 49% EHA + 35% PEGDA250, 64% EHA, 1% wt. TPO-L | 29 | 1) SLA printing 2) thermal sintering | Functional dipole antennas with phase separation |

TABLE 2-continued

Summary of Examples of 3D printing antennas that generate functional coatings defined by the concentrations of about 15% to about 35% mol difunctional cross-linking agent of the resin mixture.

| Example No. | Functional component | Resin | % mol cross-linking agent | Processing | Comment |
|---|---|---|---|---|---|
| 55 | AgND + EtOxa (7.9% Ag metal) + 0.2% Graphene + 0.5% BST | 50% PEGDA575, 49% EHA + 35% PEGDA250, 64% EHA, 1% wt. TPO-L | 29 | 1) SLA printing 2) thermal sintering | Functional dipole antennas with phase separation |
| 56 | AgND + EtOxa (7.9% Ag metal) | 50% PEGDA575, 49% EHA + 35% PEGDA250, 64% EHA, 1% wt. TPO-L | 29 | 1) SLA printing 2) thermal sintering | Functional dipole antennas with phase separation |
| 57 | — | 50% PEGDA575, 49% EHA + 35% PEGDA250, 64% EHA, 1% wt. TPO-L | | 1) SLA printing | Functional dipole antennas with Electroless plating |

With reference to the Examples 16-53, changes in morphology as a function of cross-linking agent concentrations for resins containing non-polymerizing functional and/or functional precursor components were observed. Where the non-polymerizing functional precursor component was silver neodecanoate, it may be converted to silver post printing by heating to elevated temperatures. Other examples include non-polymerizing functional nanoparticles, such as $TiO_2$, $F_2O_3$ and ZnO.

3D Printing of Polymer-Silver Structures.

Figure 10:
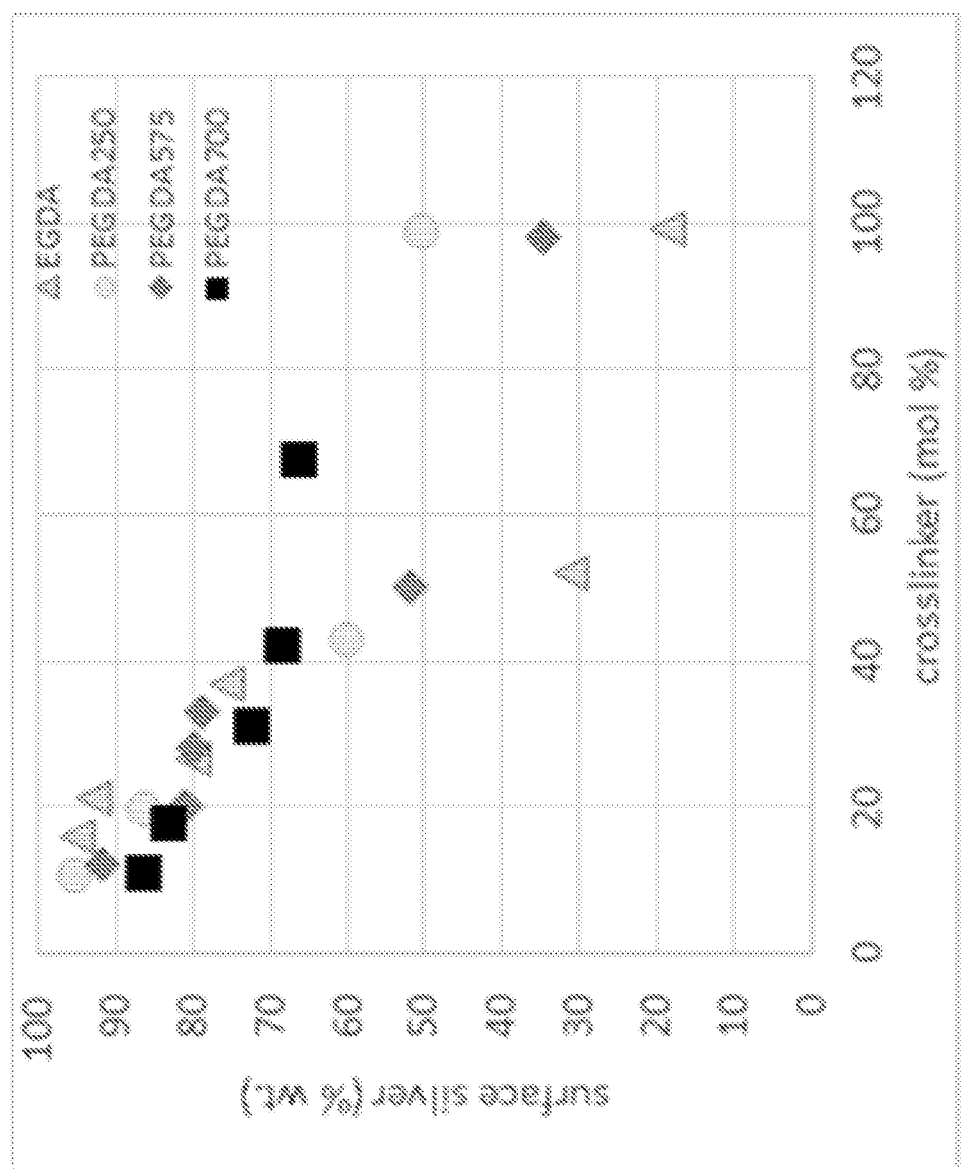
FIG. 10 shows the surface concentration of silver of 3D printed antennas made from resins with varying amounts of cross-linking agents. The formulations used to make these antennas are described in Examples 16-26 and 31-41.
Figure 11:
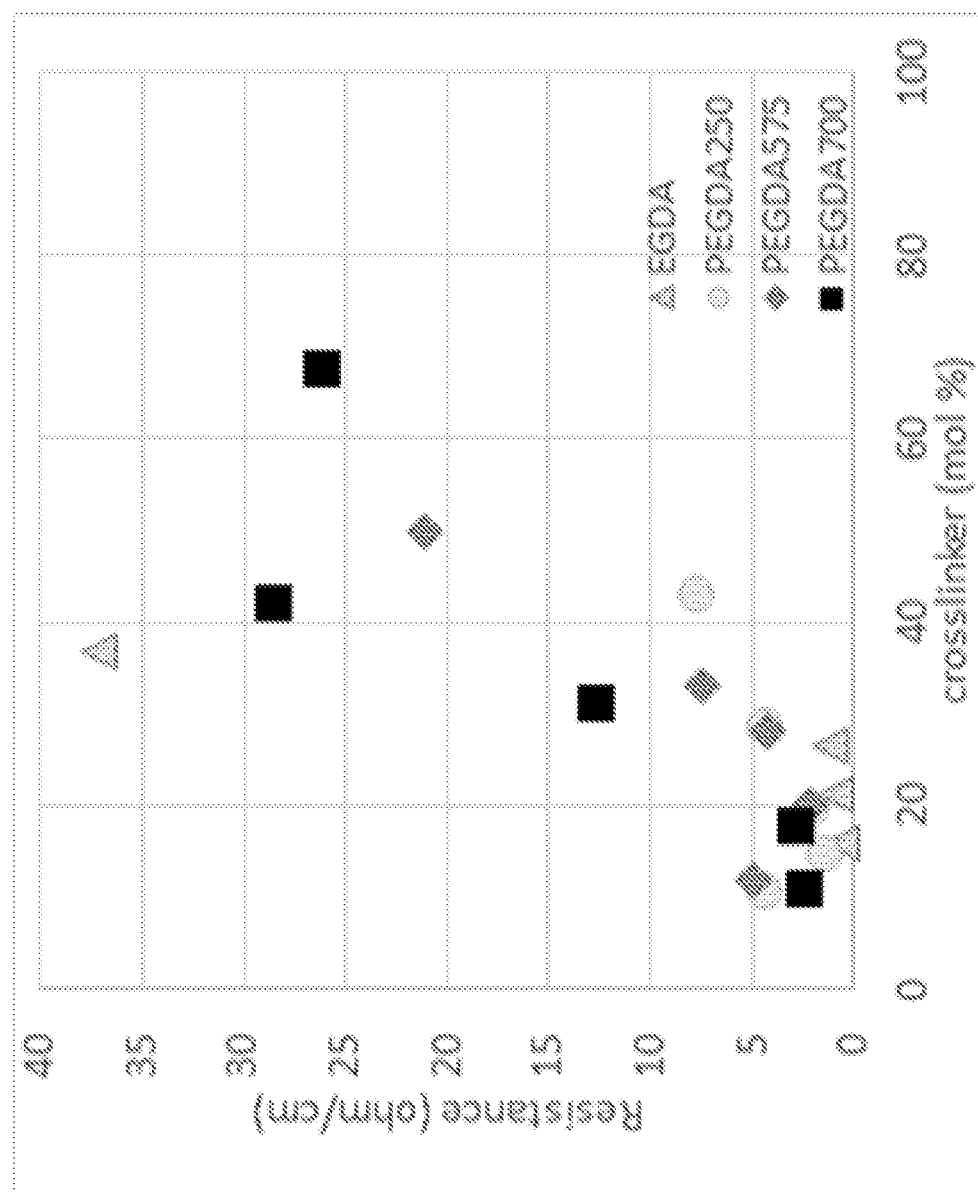
FIG. 11 shows the resistance of the silver coating on 3D printed antennas made from resins with varying amounts of cross-linking agents. The formulations used to make these antennas are described in Examples 16-26 and 31-41.
Figure 12:
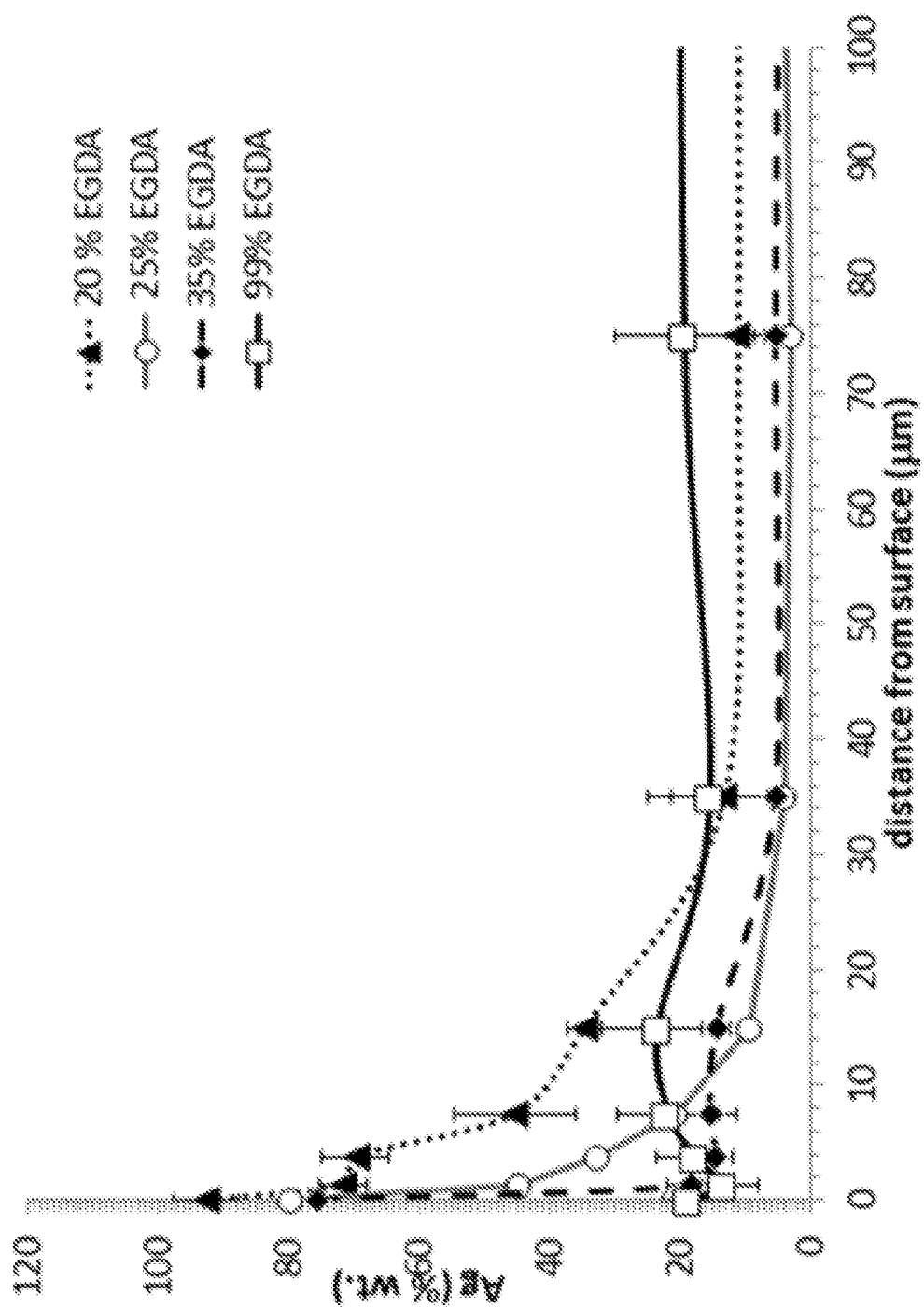
FIG. 12 shows the concentration of silver within a 3D printed cylinder. For samples made with 20-35% EGDA, a silver coating can form where the concentration of silver decreases with increased distance from the surface of the cylinder. For the sample made with 99% EDGA, the silver concentrations are substantially uniform across the cross-section of the antenna.

Using a difunctional cross-linking agent (e.g. EGDA, PEGDA250, PEGDA575 and PEGDA700), various morphologies in the printed antenna may be formed depending on the concentration of cross-linking agent. FIG. 10 shows the amount of silver (% wt) at the surface decreased with increased concentration of cross-linking agent. The concentration of silver at the surface can determine the resistance value of the printed antenna. As the concentration of cross-linking agent increases, the resistance of the silver coating increases due to the lower concentration of silver at the surface (FIG. 11). FIG. 12 illustrates the change in the concentration of silver in a 3D printed cylinder depending on the amount of EGDA cross-linking agent.

Example 54: 3D Printed Antennas with Multimaterial Resin of Silver Precursor, Graphene and Acrylate Resin (7.9% Ag+0.2% Graphene Antennas Using Mixed Resin (7.5 ml (50% PEGDA575, 49% EHA)+2.5 ml (35% PEGDA250, 64% EHA))

About 2.5 g of silver neodecanoate were dissolved in about 0.552 mL of 2-ethyl-2-oxazoline using a planetary mixer at about 2000 rpm for about 4 min followed by about 2200 rpm for about 30 seconds. To the yellow, viscous silver solution was added about 0.245 g of graphene and about 9.18 g of the acrylate mixed resin (about 7.5 ml (about 50% PEGDA575, about 49% EHA)+about 2.5 ml (about 35% PEGDA250, about 64% EHA)). The combined mixture was then vortex mixed for about 2 minutes at about 3200 rpm and sonicated for about 15 mins. The resin was SLA printed into 3D truss antennas and then thermally sintered at about 250° C. temperature (program) for about 1 hour using reflow oven under nitrogen with about 500 ppm oxygen.

Conducting structures: ~5-10 Ω/cm resistance, silver is phase separated (e.g. coated)

Example 55: 3D Printed Antennas with Multimaterial Resin of Silver Precursor, Graphene, Barium Strontium Titanate and Acrylate Resin (7.9% Ag+0.2% Graphene+0.5% BST Antennas Using Mixed Resin (7.5 ml (50% PEGDA575, 49% EHA)+2.5 ml (35% PEGDA250, 64% EHA))

About 2.5 g of silver neodecanoate were dissolved in about 0.552 mL of 2-ethyl-2-oxazoline using a planetary mixer at about 2000 rpm for about 4 min followed by about 2200 rpm for about 30 seconds. To the yellow, viscous silver solution was added about 0.245 g of graphene, about 0.0613 g of functionalised barium strontium titanate (BST) and about 9.12 g of the acrylate mixed resin (about 7.5 ml (about 50% PEGDA575, about 49% EHA)+about 2.5 ml (about 35% PEGDA250, about 64% EHA)). The combined mixture was then vortex mixed for about 2 minutes at about 3200 rpm and sonicated for about 15 mins. The resin was SLA printed into 3D truss antennas and then thermally sintered at about 250° C. temperature (program) for about 1 hour using reflow oven under nitrogen with about 500 ppm oxygen.

Conducting structures: ~5-10 Ω/cm resistance, silver is phase separated

3D Printing of Polymer-Silver Structures to Form Dipole Antennas 3D printing may be used to fabricate millimeter wave antennas for 5G, as 5G will function on small networking cells that use arrays of antennas in small geographical areas requiring a large number of integrated low loss devices.

Figure 17:
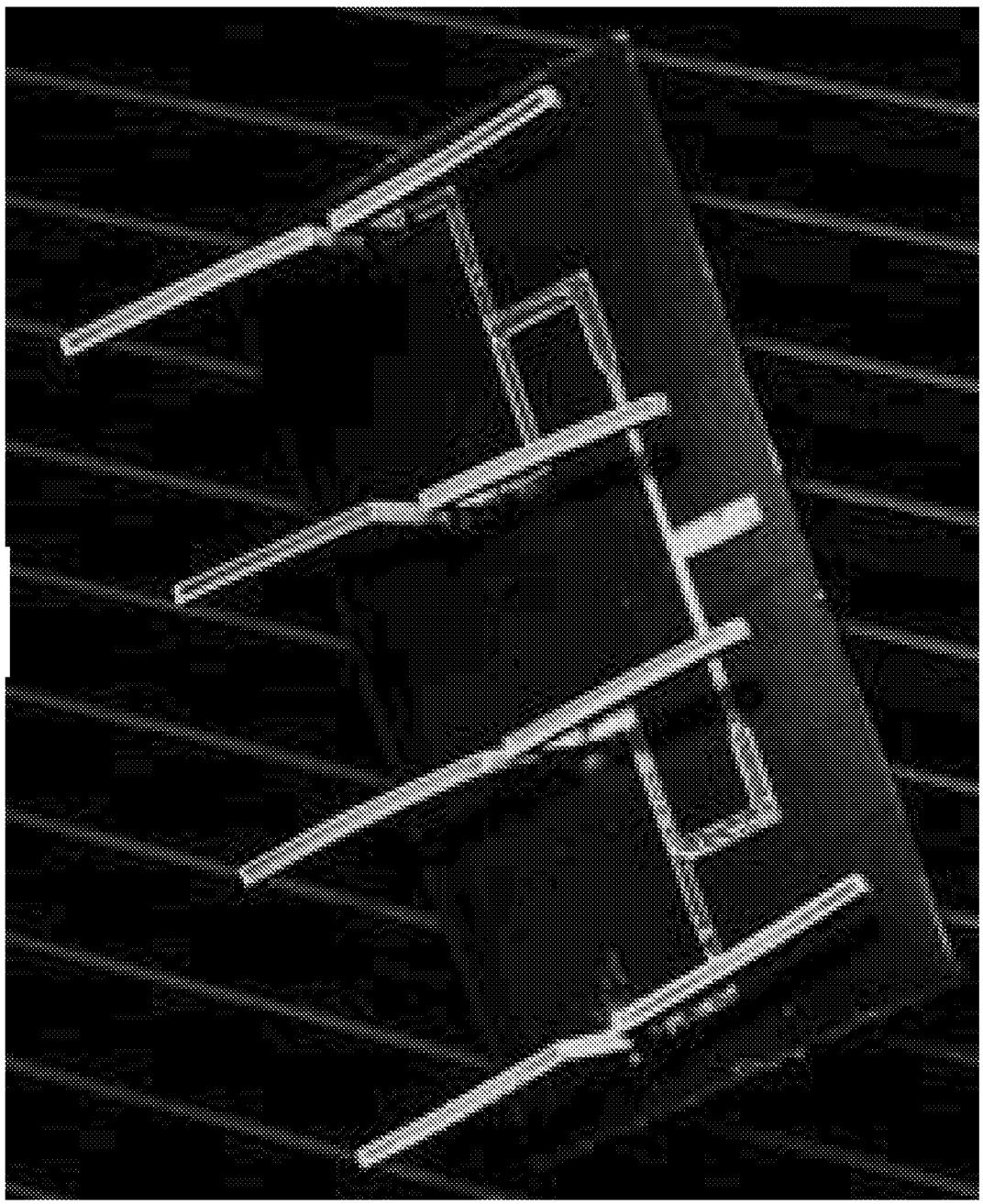
FIG. 17 shows an example dipole antenna array.
Figure 18:
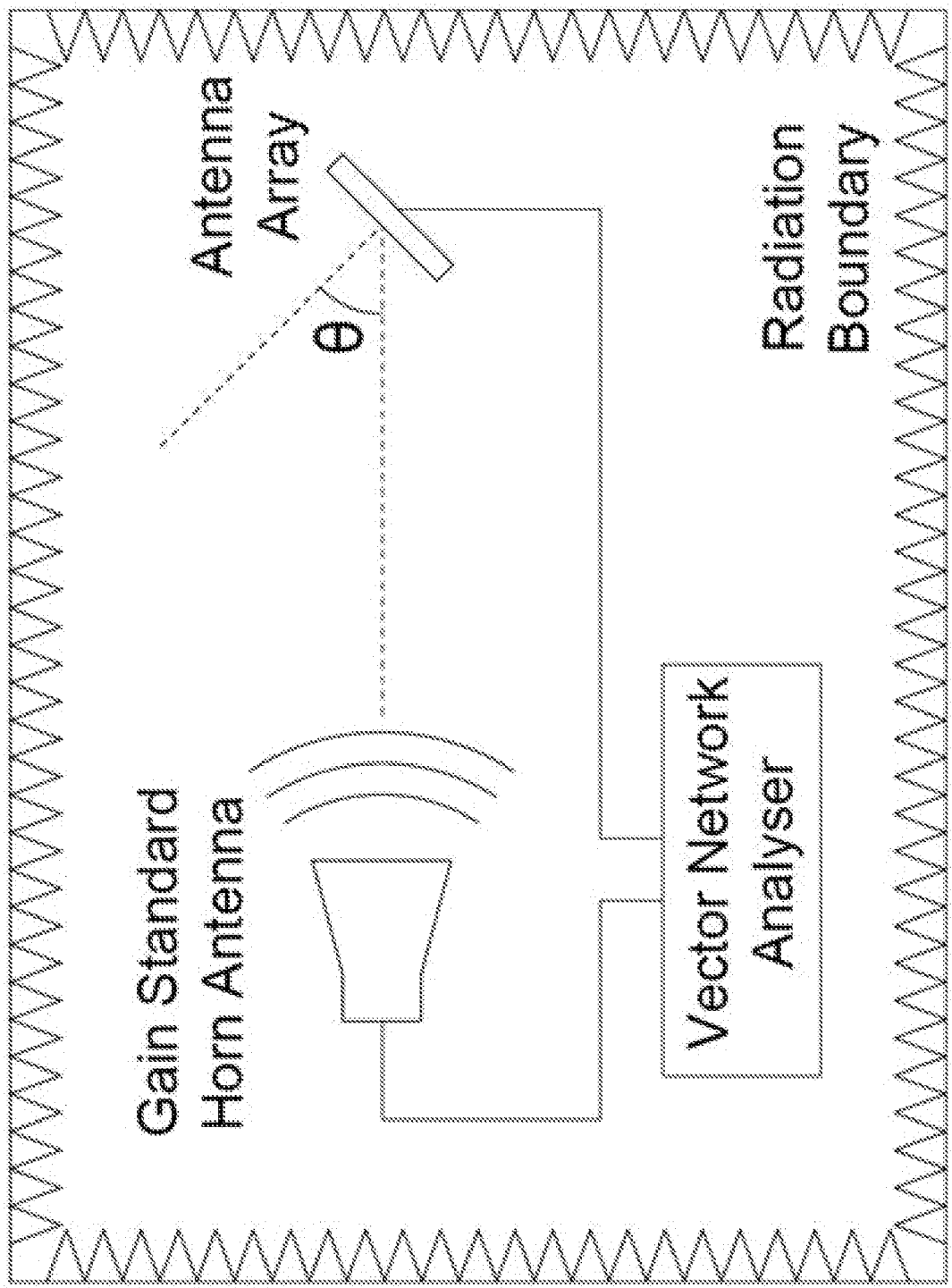
FIG. 18 shows an example functional scheme for an example anechoic chamber.
Figure 19:
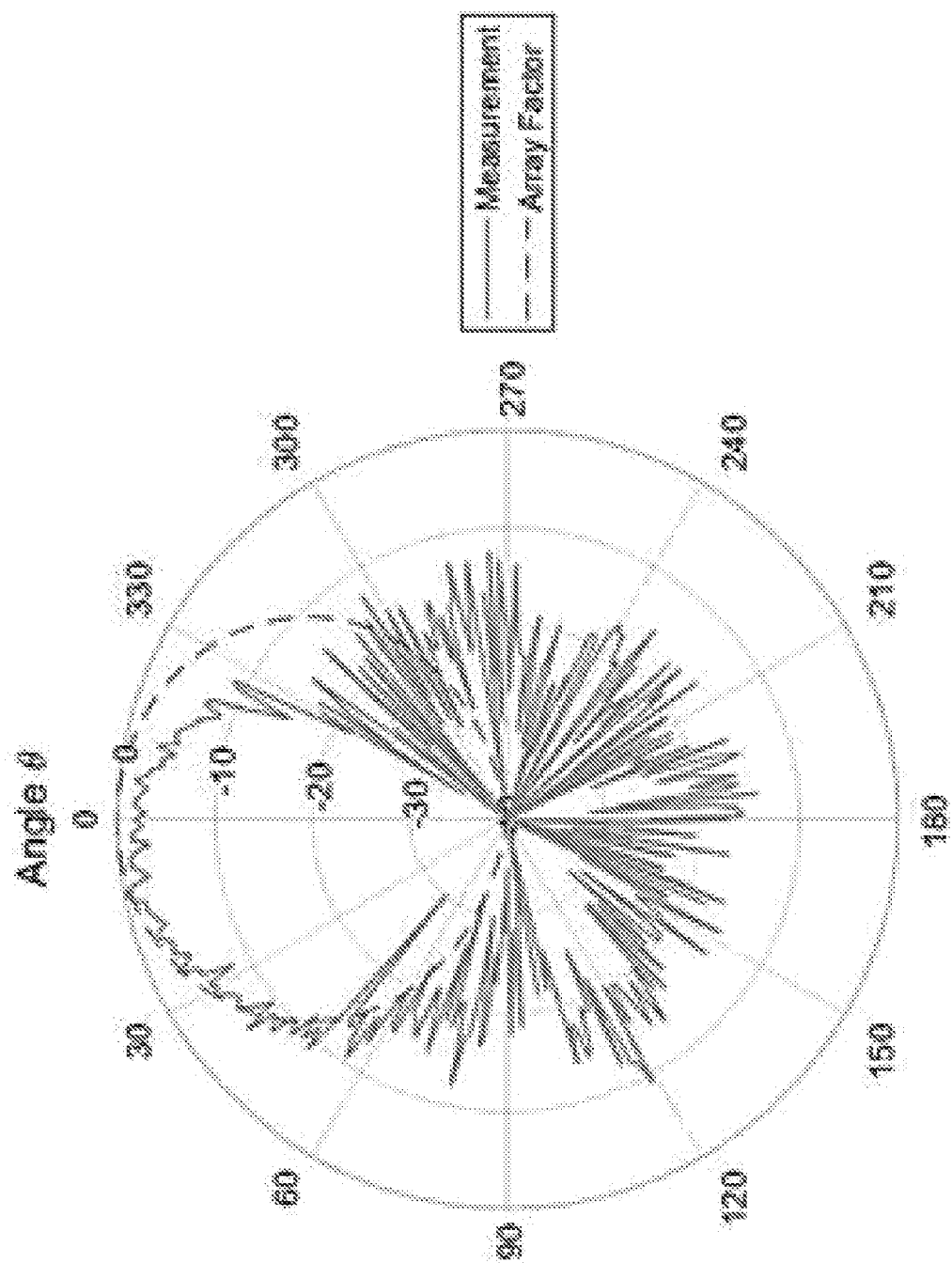
FIG. 19 shows a normalized measured radiation pattern compared to theoretical array factor associated with the dipole antenna array of FIG. 17.

These requirements may be achieved by using 3D printing to make antennas low cost, in arrays, and embedded in objects. Moreover, by suspending the antenna in air using a 3D design, signal loss can be minimized with air becoming the effective dielectric. Using the 3D PIPS approach, an array of 3D printed dipole antennas may be fabricated and transmission of 2.4 GHz waves may be demonstrated. An example of such a dipole antenna array is shown in FIG. 17. FIG. 17 shows an example dipole antenna array 1700. Dipole antenna array 1700 was 3D printed. The photograph shown in FIG. 17 has dimensions 10 cm×10 cm. An anechoic chamber may be used to measure the radiation pattern associated with an antenna array. FIG. 18 shows an example of such an anechoic chamber, which chamber was used to measure, in association with antenna array 1700, the radiation pattern shown in FIG. 19. FIG. 18 shows transmission between a gain standard horn antenna and antenna array under test. FIG. 19 shows, in association with antenna array 1700, a normalized radiation pattern at 2.4 GHz compared with ideal array factor. In other words, FIG. 19 shows this measured radiation pattern in comparison with the theoretical response for a dipole array on a ground plane.

Figure 20:
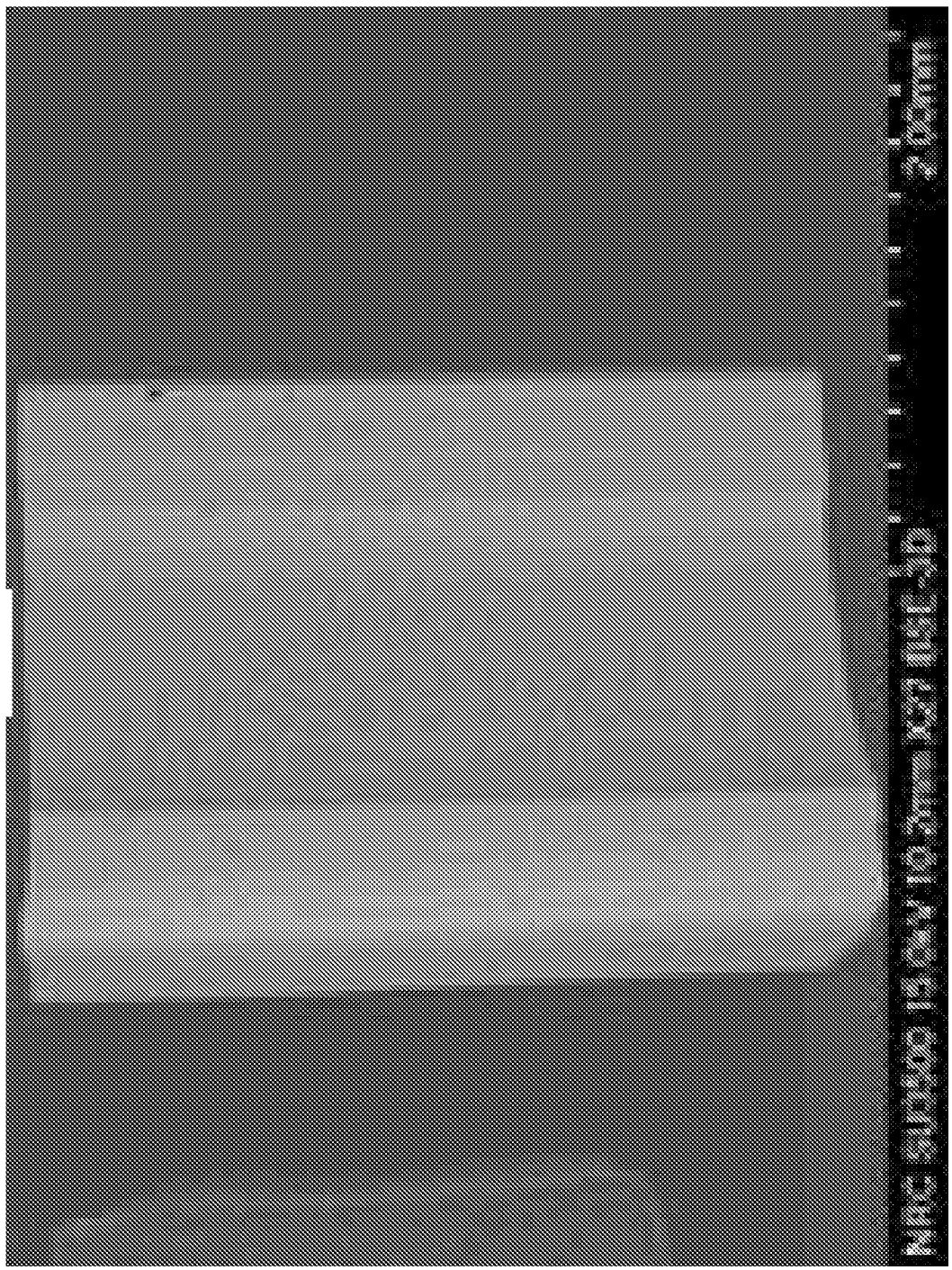
FIGS. 20 and 21 show scanning electron microscope (SEM) images, at lower and higher magnifications respectively, of the surface of an example dipole antenna.
Figure 21:
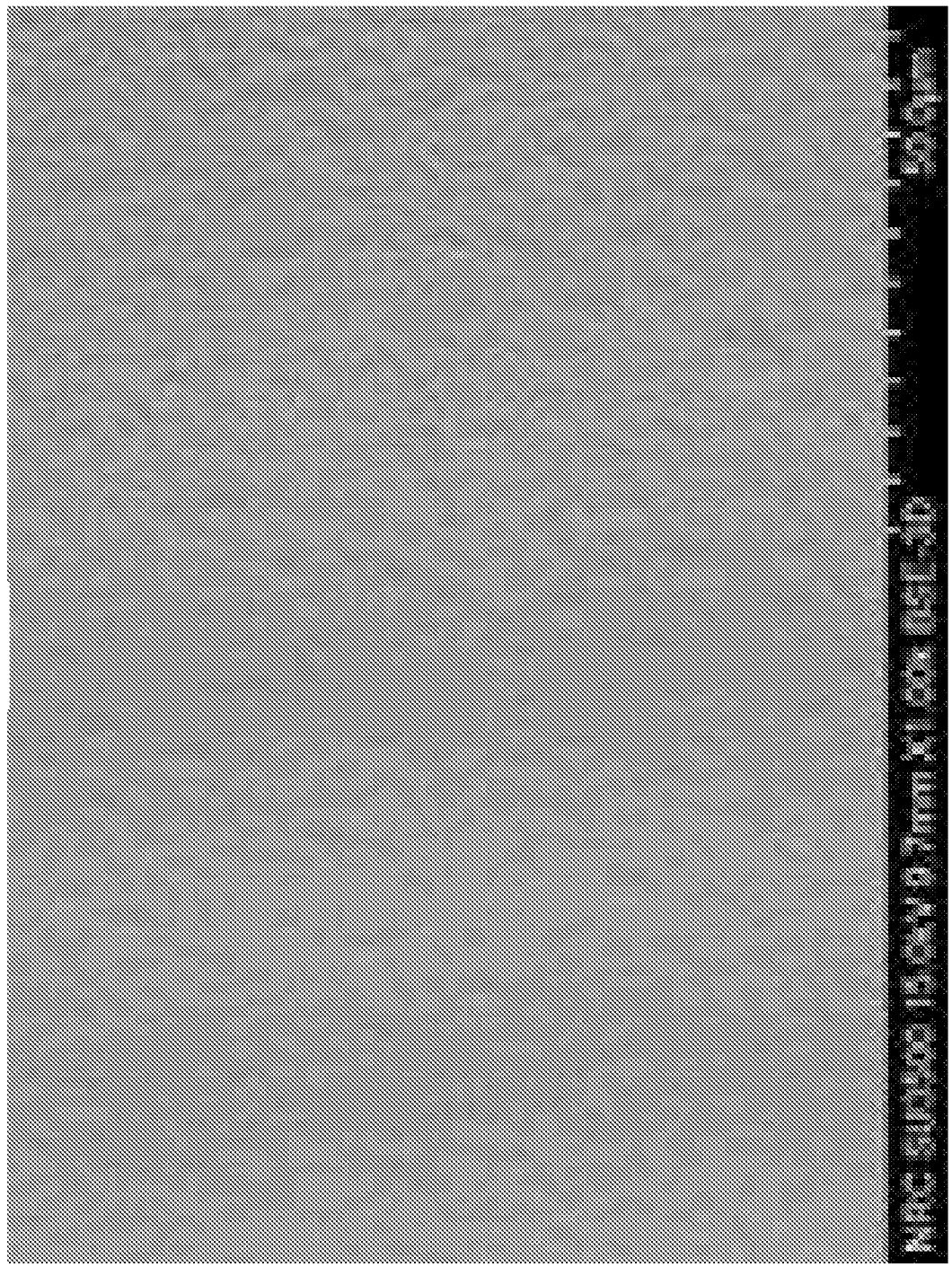
Figure 22:
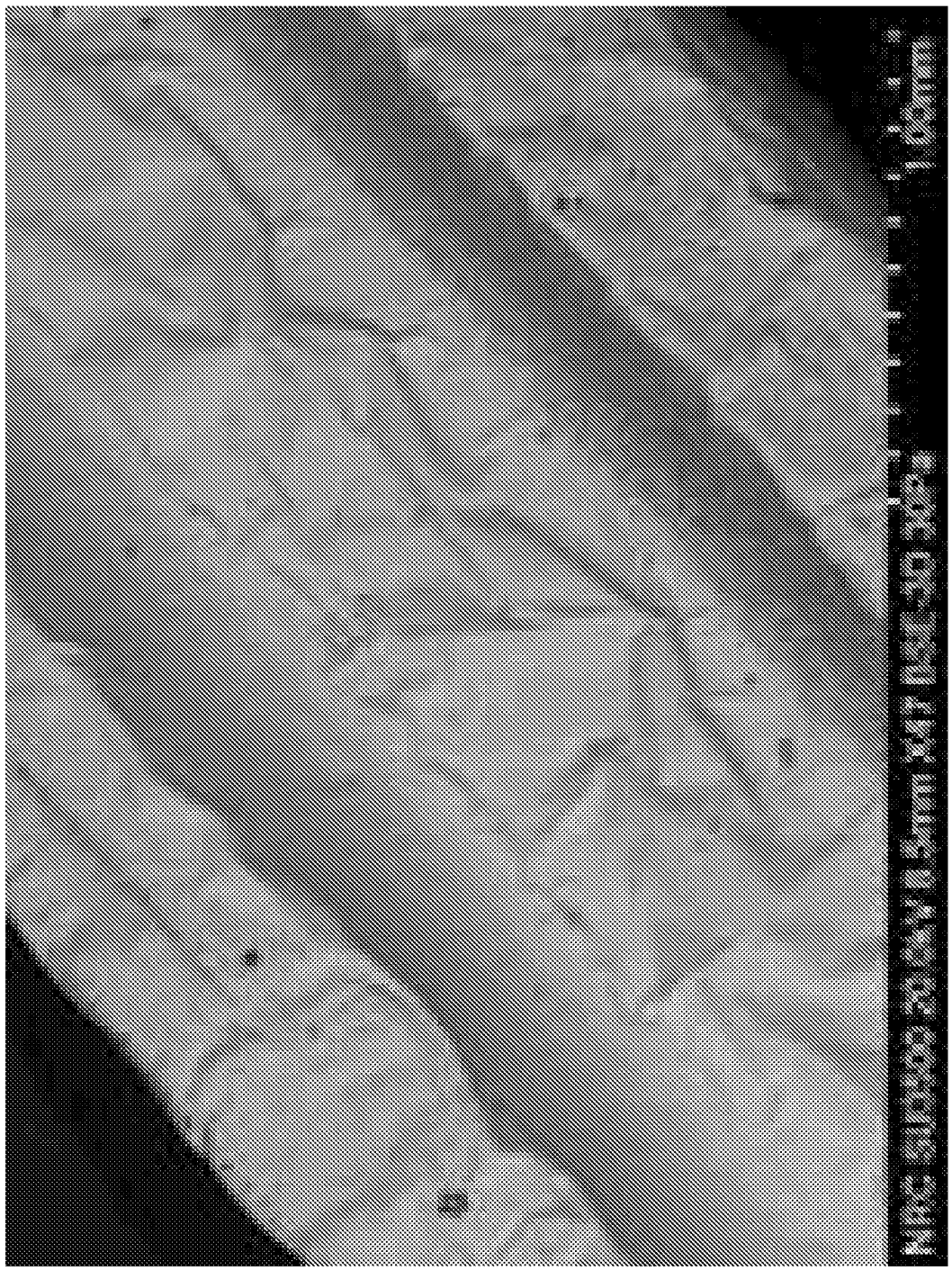
FIGS. 22 and 23 show SEM images, at lower and higher magnifications respectively, of the surface of another example dipole antenna.
Figure 23:
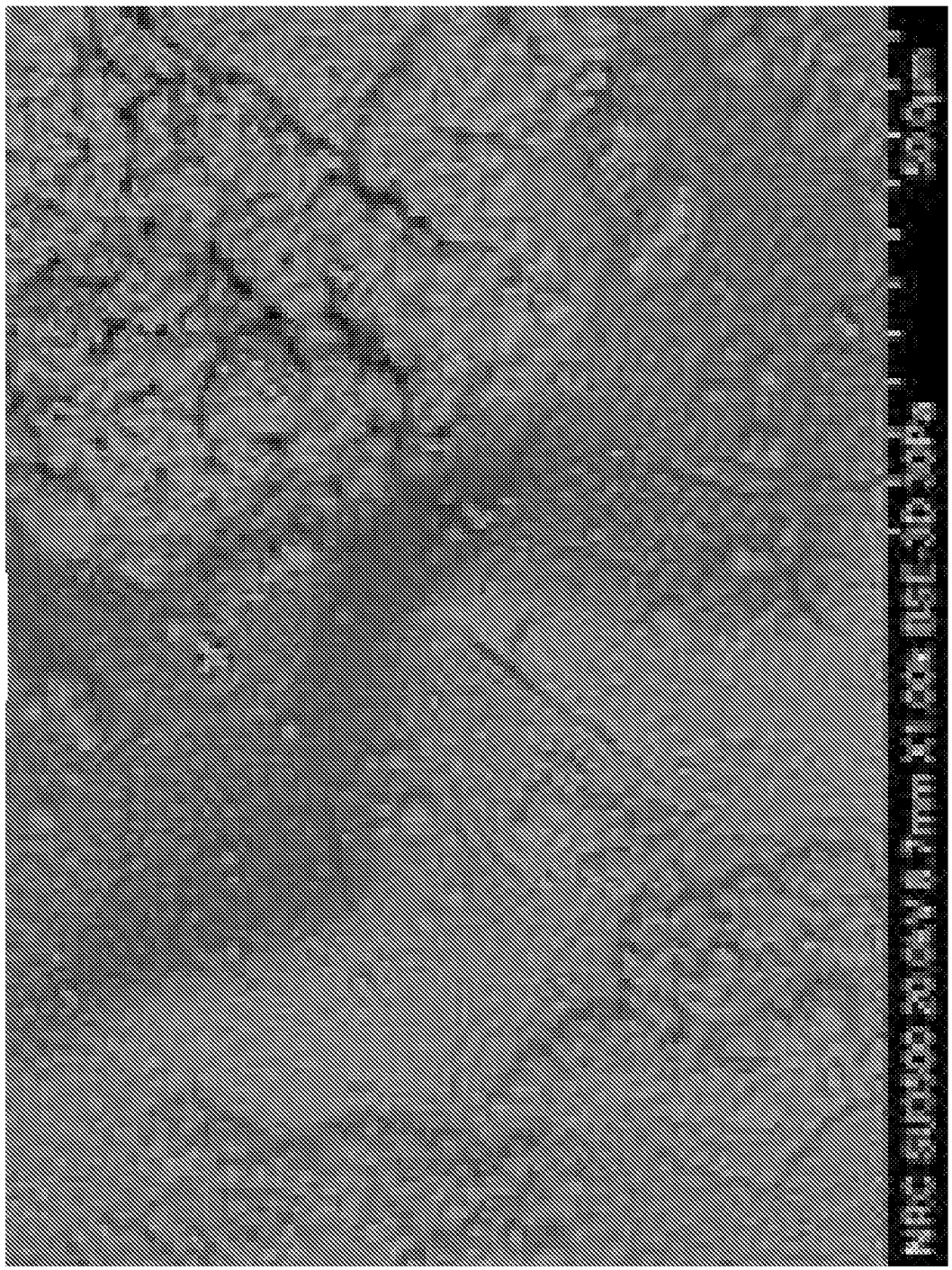

The focusing of the radiation pattern into a main lobe is the result of radiation interference between antenna elements. The half power beam width of the theoretical pattern is 48° compared to 45° for the measured pattern, resulting in a remarkably small difference of 3° and, thus, providing evidence supporting the suitability of the printing processes described herein for antenna applications. Antennas prepared with 3D vat polymerization-induced phase separation (PIPS) in a single-step were similar in terms of conductivity (resistance~1Ω per cm) to antennas prepared with two-step coating methodology, i.e. 3D printed with same resin without Ag precursor and then coated with silver using electroless-plating. However, antennas prepared with 3D vat polymerization-induced phase separation (PIPS) in a single-step circumvents the disadvantages of two-step coating methodologies such as poor film adhesion and uniformity. FIGS. 20 and 21 show SEM images, at lower and higher magnifications respectively, of the surface of an example dipole antenna prepared using a phase-separated method, for example as described in PCT Patent Application PCT/IB2019/058923, filed on Oct. 18, 2019, and published as WO 2020/079669, which is incorporated herein by reference in its entirety. This antenna has a measured roughness of 0.24 μm. FIGS. 22 and 23 show SEM images, at lower and higher magnifications respectively, of the surface of another example dipole antenna prepared using an electroless plating method. The antenna shown in FIGS. 23 and 23 has a measured roughness of 4.53 μm. As shown in FIGS. 20-23, the antenna prepared using the phase-separated method (shown in FIGS. 20-21) has reduced roughness and improved film adhesion compared to the antenna prepared using electroless plating (shown in FIGS. 22-23).

Example 56: 3D Printed Dipole Antenna Arrays with Resin of Silver Precursor and Acrylate Resin (7.9% Ag Using Mixed Resin (7.5 ml (50% PEGDA575, 49% EHA)+2.5 ml (35% PEGDA250, 64% EHA))

About 2.5 g of silver neodecanoate were dissolved in about 0.552 mL of 2-ethyl-2-oxazoline using a planetary mixer at about 2000 rpm for about 4 min followed by about 2200 rpm for about 30 seconds. To the yellow, viscous silver solution was added about 9.2 g of the acrylate mixed resin (about 7.5 ml (about 50% PEGDA575, about 49% EHA)+ about 2.5 ml (about 35% PEGDA250, about 64% EHA)). The combined mixture was then vortex mixed for about 2 minutes at about 3200 rpm and sonicated for about 15 mins. The resin was SLA printed into 3D dipole antennas and then thermally sintered at about 250° C. temperature (program) for about 1 hour using reflow oven under nitrogen with about 500 ppm oxygen. FIG. 17 shows an example 3D printed dipole antenna array fabricated using in situ vat polymerization polymerization-induced phase separation (PIPS) method.

Example 57: 3D Printed Dipole Antenna with Mixed Acrylate Resin without Ag Precursor (7.5 ml (50% PEGDA575, 49% EHA)+2.5 ml (35% PEGDA250, 64% EHA)) and then Coated with Silver Using Electroless Silver Plating Method The mixed DA-resins were prepared by mixing different volumes of two separately prepared DA-resins (about 7.5 ml (about 50% PEGDA575, about 49% EHA)+about 2.5 ml (about 35% PEGDA250, about 64% EHA)). The combined mixture was then vortex mixed for about 2 minutes at about 3200 rpm and sonicated for about 15 mins. The dipole antennas were then SLA printed without a silver precursor and then coated with silver by modifying an electroless-plating method as described in Tai, Y., Xu, C. & Chen, H. Silver-coated glass fabric composites prepared by electroless plating. Mater. Lett. 180, 144-147 (2016), which is incorporated herein by reference in its entirety. The electroless silver plating bath was composed of solution A (0.2 g of glucose, 0.02 g of tartaric acid and 0.5 mL of ethanol in 20 mL of deionized water) and solution B, a $Ag(NH_3)^{2+}$ solution (0.2 g of $AgNO_3$, 0.075 g of NaOH and 0.5 mL of ammonia in 20 mL of deionized water). These two solutions were mixed by dropwise addition of $Ag(NH_3)^{2+}$ solution B into solution A bath containing dipole antennas at room temperature with constant stirring over a period of 60 minutes. After reacting for 60 min, the antennas were collected, rinsed with water and dried at 140° C. for 5 minutes.

The mixed DA-resins were prepared by mixing different volumes of two separately prepared DA-resins such as 75 mL of 50 wt % DA-575 and 25 mL of 35 wt % DA-250. The dipole antennas were printed using the silver-free resin and subsequently seeded with silver particles to yield an adherent and uniform silver coating on the antenna substrate. For a seeding pre-treatment procedure, antennas were dip coated with 100× dilute solution of commercial nanoparticle ink (SunTronic™ NANOSILVER) in toluene. The thin layer of seeds did not result in any measurable conductivity, however, this step contributed to and/or made possible obtaining a uniform and adherent silver coating through electroless-plating.

Furthermore, the electroless-plating procedure was optimized by varying the rate of addition and concentration of the silver plating bath solutions in order to get the coatings with low surface roughness, as described in Tai, Y., Xu, C. & Chen, H. Silver-coated glass fabric composites prepared by electroless plating. Mater. Lett. 180, 144-147 (2016). The electroless silver plating bath was composed of solution A (0.2 g of glucose, 0.02 g of tartaric acid and 0.5 mL of ethanol in 20 mL of deionized water) and solution B, a $Ag(NH_3)^{2+}$ solution (0.2 g of $AgNO_3$, 0.075 g of NaOH and 0.5 mL of ammonia in 20 mL of deionized water). These two solutions were mixed by dropwise addition of $Ag(NH_3)^{2+}$ solution B into solution A bath, over the period of 60 minutes, containing dipole antennas at room temperature with constant stirring. After reacting for 60 min, the antennas were collected, rinsed with water and dried at 140° C. for 5 minutes. FIGS. 20 and 21 show SEM images of the surface of a dipole antenna prepared using phase-separated, and FIGS. 22 and 23 show SEM images of the surface of a dipole antenna prepared using an electroless plating method.

Characterization of 3D Dipole Antennas: Scanning electron microscopy (SEM) imaging and Electron Dispersive X-ray Spectroscopy (EDS) surface and cross-section analysis were performed with a Hitachi™ SU3500 using acceleration voltage of 15 kV (SEM) and 30 kV (EDS) and spot size of 30. Dipole Antenna Measurements: Dipole antennas were 3D printed using functional resin with Ag precursor adjusted so that the amount of Ag metal in the resin was 8.0 wt %. A microstrip array was used to feed four dipole antennas. The photograph of the antenna array is shown in FIG. 17. The dipole antenna measurements were performed in an anechoic chamber (FIG. 18). The antennas were designed to be centered at 2.4 GHz with a physical length of 6.25 cm. A gain standard horn antenna was positioned at one end of the chamber and connected to one port of a Vector Network Analyser (VNA) through an amplifier. The device under test (antenna array) was placed at the opposite end of the chamber on a rotating mount and connected to the other port of the VNA. While rotating the antenna array, s-parameter measurements were taken to determine the radiation of the antenna as a function of angle. Only the positive going half of the radiation pattern was used to determine the half power beam width. A signal present at angles between 90° and 270° were due to the finite limitation of the ground plane and the noise naturally present in the system.

Example 58: Antenna Enhancement Through Integration with Metal Structures Including Metamaterials Such as Split Ring Resonators and Composite Left-Hand-Right-Hand Transmission Line Structure Metallic structures known as metamaterials may be used to enhance the gain and return loss of patch antennas. Antennas may be integrated with planar layers of metamaterials along the ground plane and within the substrate. An example of such an integration is described in Yoonjae Lee and Yang Hao, CHARACTERIZATION OF MICROSTRIP PATCH ANTENNAS ON METAMATERIAL SUBSTRATES LOADED WITH COMPLEMENTARY SPLIT-RING RESONATORS Antenna and Electromagnetics Group, Department of Electronic Engineering, Queen Mary, University of London, Mile End Road, London, E1 4NS, United Kingdom, which is incorporated herein by reference in its entirety.

Figure 24:
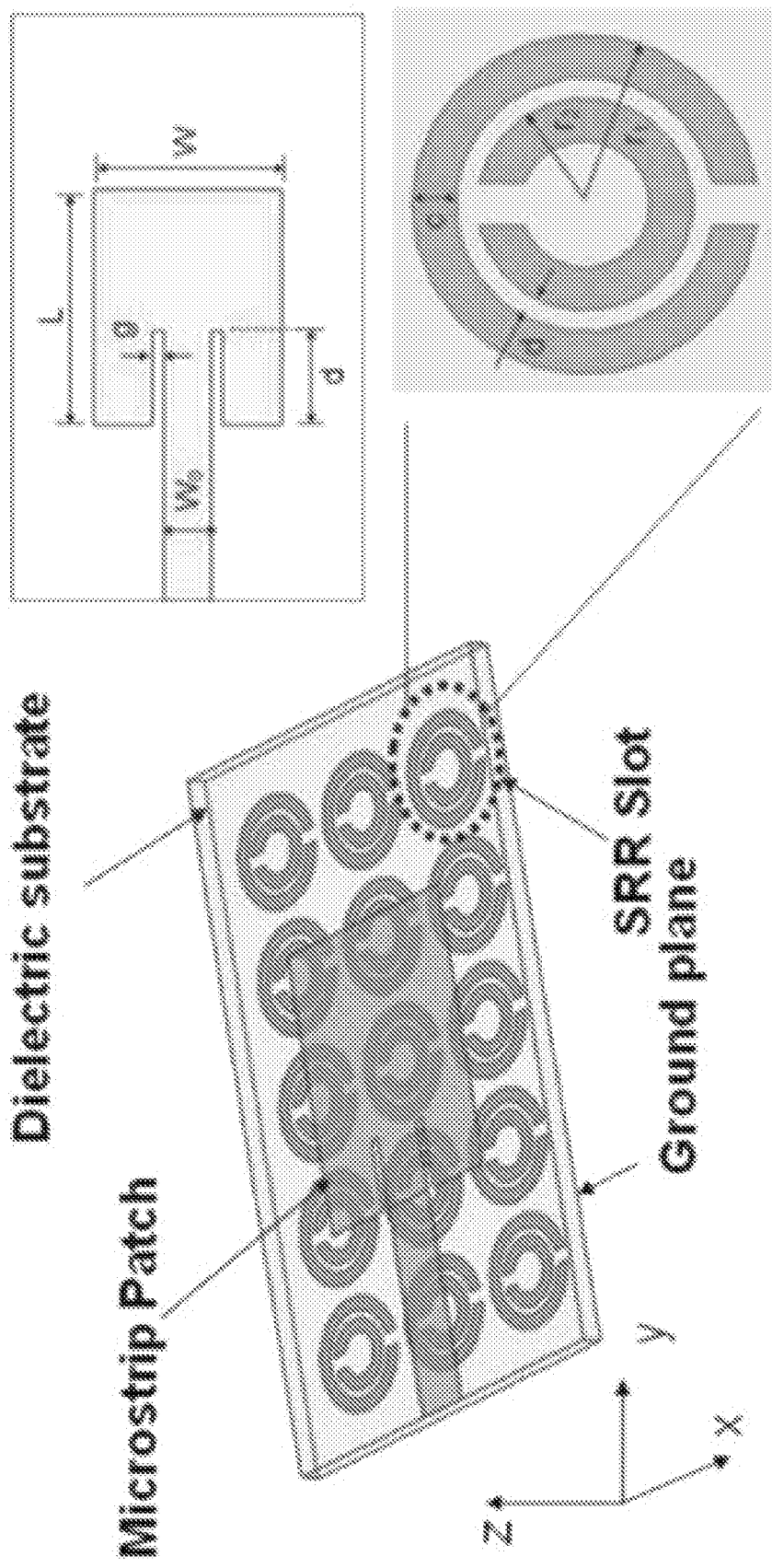
FIG. 24 shows an example of split ring resonators used as the ground plane for a substrate.
Figure 25:
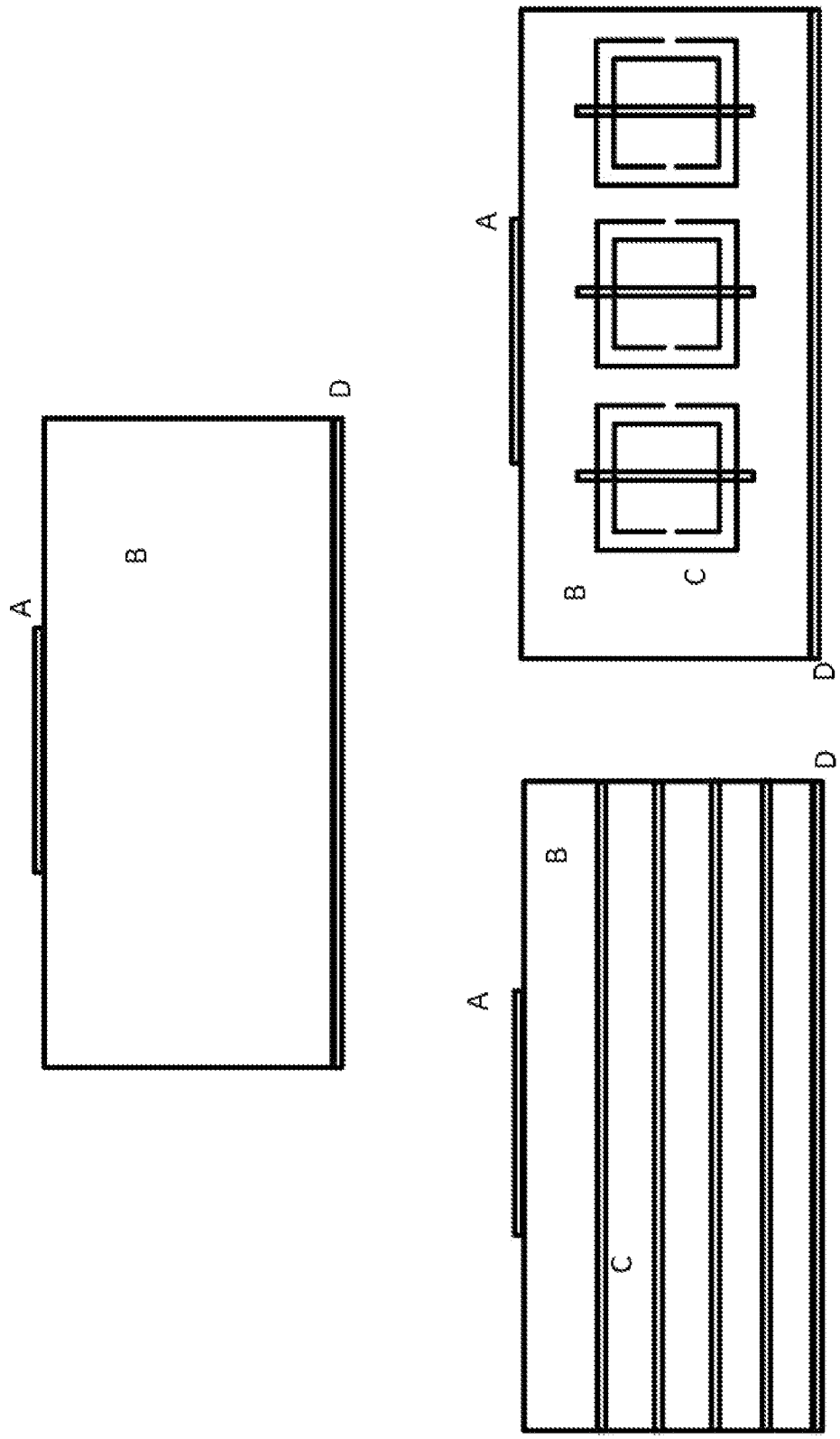
FIG. 25 shows example incorporation of split ring resonators in an example substrate.

An example of split ring resonators used as the ground plane for a substrate is shown in FIG. 24, which demonstrates a metamaterial being used to enhance the gain of a microstrip patch antenna as described in greater detail in Yoonjae Lee and Yang Hao, CHARACTERIZATION OF MICROSTRIP PATCH ANTENNAS ON METAMATERIAL SUBSTRATES LOADED WITH COMPLEMENTARY SPLIT-RING RESONATORS Antenna and Electromagnetics Group, Department of Electronic Engineering, Queen Mary, University of London, Mile End Road, London, E1 4NS, United Kingdom, which is incorporated herein by reference in its entirety. The metamaterial used in this example is located on one plane below the antenna. An example of how metamaterials may be extended into the substrate is shown in FIG. 25.

As discussed above, FIG. 24 shows a split ring resonator ground plane below a microstrip patch antenna, as described in greater detail in Yoonjae Lee and Yang Hao, CHARACTERIZATION OF MICROSTRIP PATCH ANTENNAS ON METAMATERIAL SUBSTRATES LOADED WITH COMPLEMENTARY SPLIT-RING RESONATORS Antenna and Electromagnetics Group, Department of Electronic Engineering, Queen Mary, University of London, Mile End Road, London, E1 4NS, United Kingdom, which is incorporated herein by reference in its entirety. FIG. 25 shows an example of a possible metamaterial extension from planar ground plane into the substrate. The microstrip patch antenna layer is labeled as (A) and this layer is the primary source of radiation. The substrate is labeled as (B) and is a physical structure used to support the antenna. It may be comprised of dielectric material which can store electrical energy and determine the impedance of the antenna. Metamaterial layers within the substrate are labeled as (C), and can store either electric or magnetic energy to enhance the radiation of the antenna. The ground plane is labeled as (D), and can act as a return path for current from the antenna. Through 3D printing the metamaterials can be extended into the substrate to increase the order of the coupling and improve the quality factor and reduce the loss. Examples of metamaterials that can be used are split ring resonators to produce a negative refractive index, cylindrical metallic pins to increase the permittivity of the substrate, and capacitive input coupling to create a composite left-hand-right-hand feedline, for example as described in Wu Lei, Zhu Qi, Zhu Jianfang and Xu Shanjia, "Design of dual-linearly-polarized microstrip array with composite right/left-handed transmission line as feed line," 2006 IEEE Antennas and Propagation Society International Symposium, Albuquerque, N. Mex., 2006, pp. 1511-1514, doi: 10.1109/APS.2006.1710840, which is incorporated herein by reference in its entirety.

Figure 26:
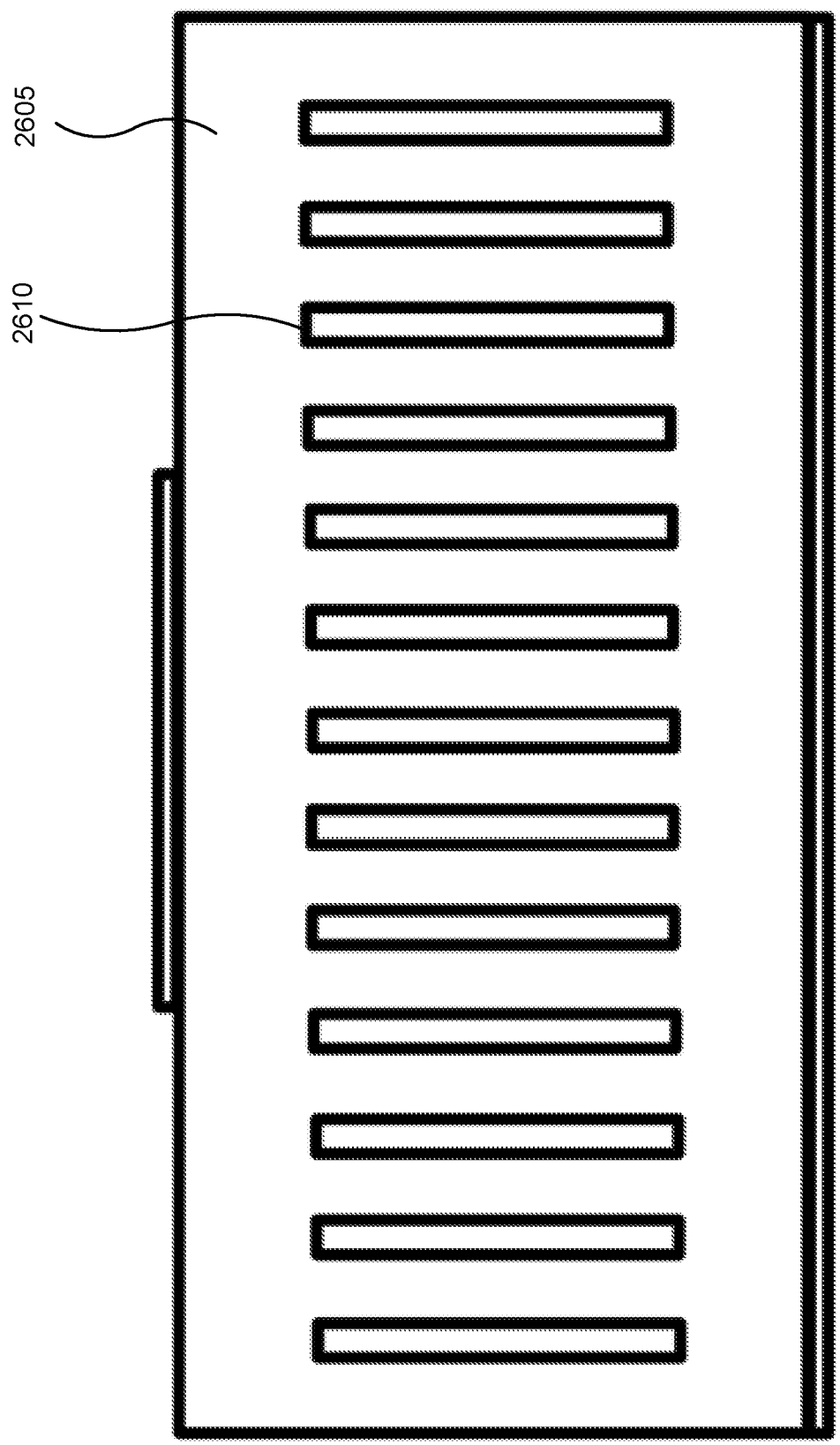
FIG. 26 shows an illustration of example metal pins embedded in an example substrate.
Figure 27:
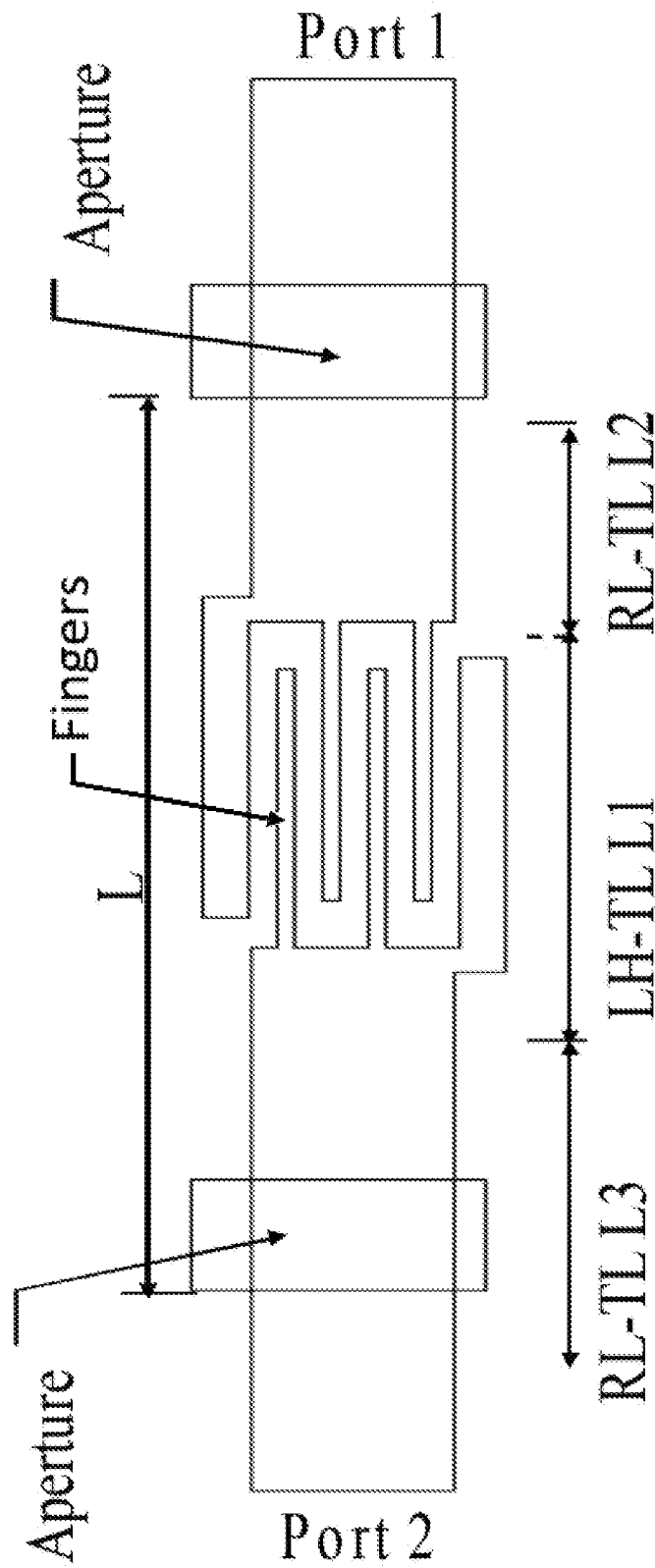
FIG. 27 shows an example planar interdigitated capacitor.
Figure 28:
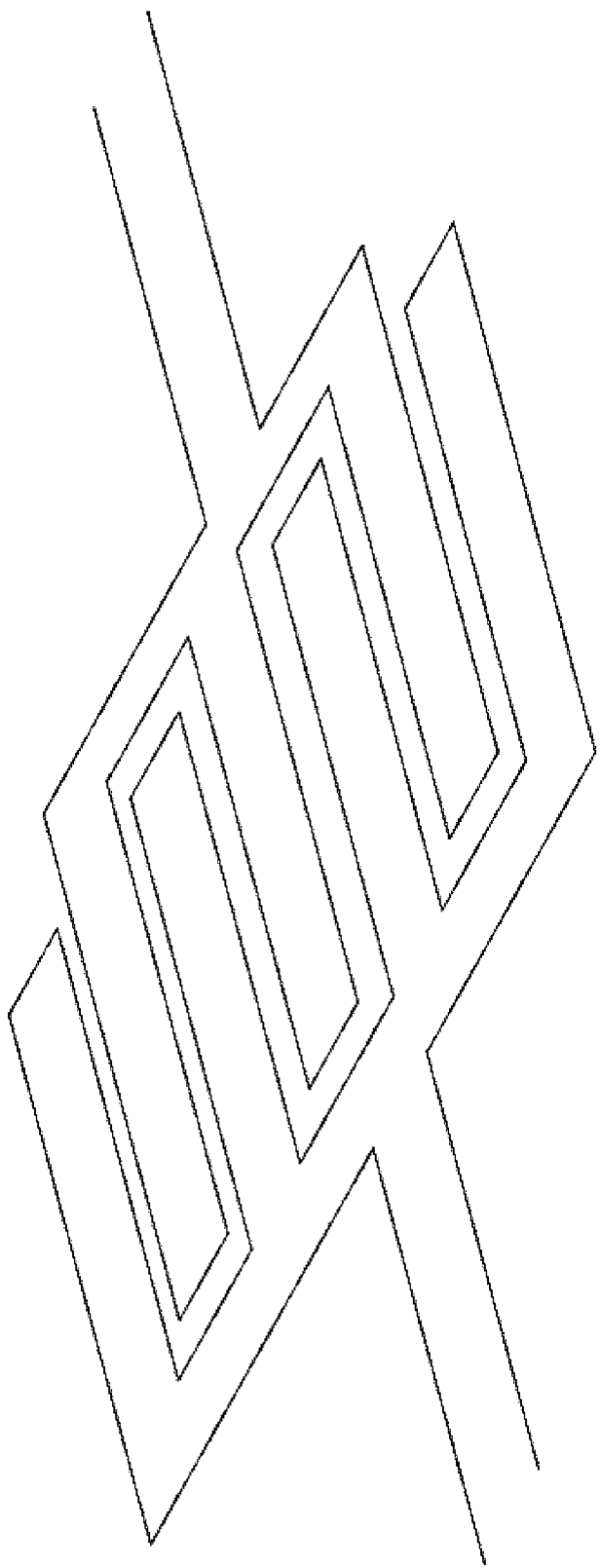
FIGS. 28, 29, and 30 show example interdigitated capacitors extended to three dimensions.
Figure 29:
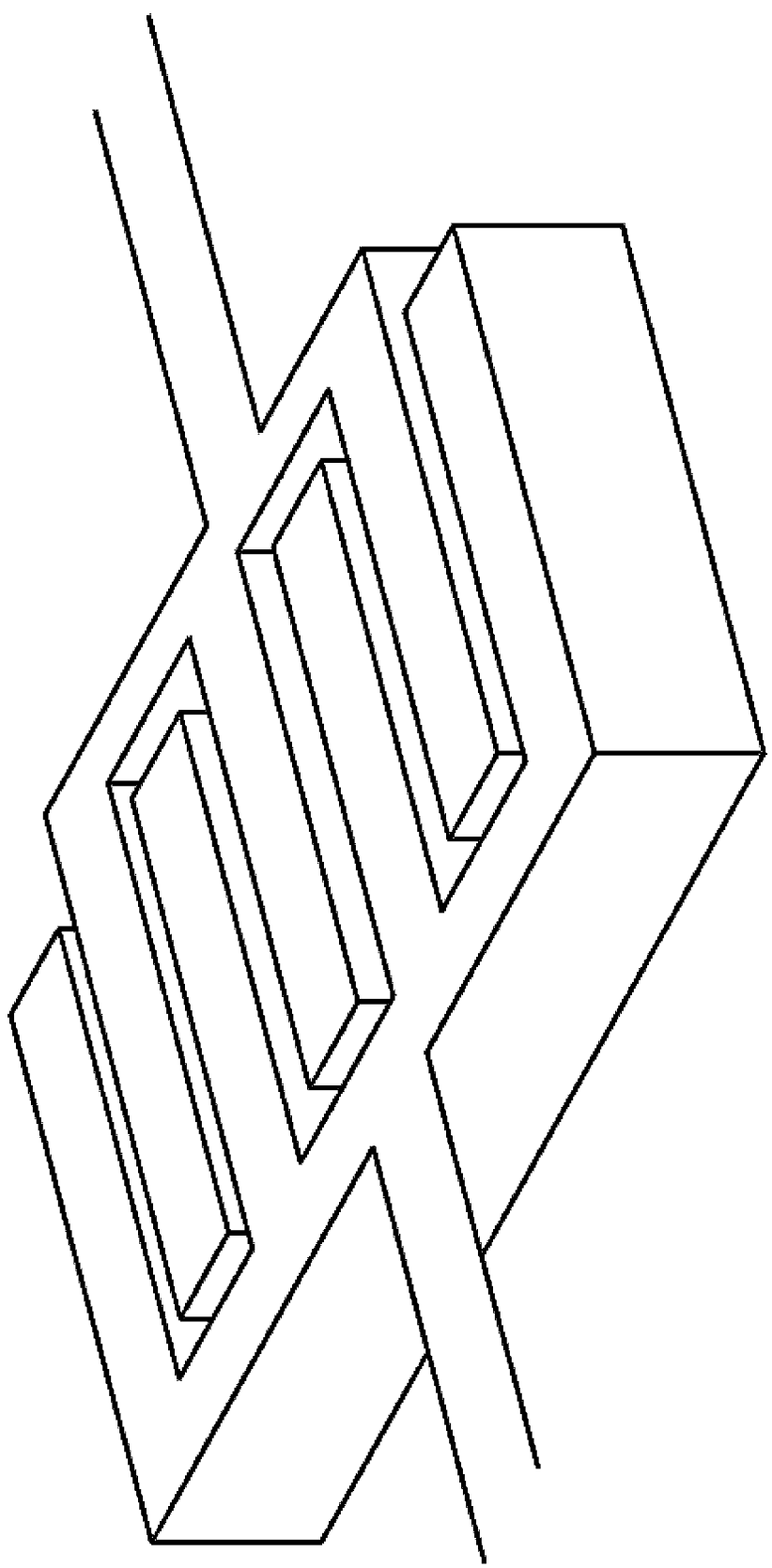
Figure 30:
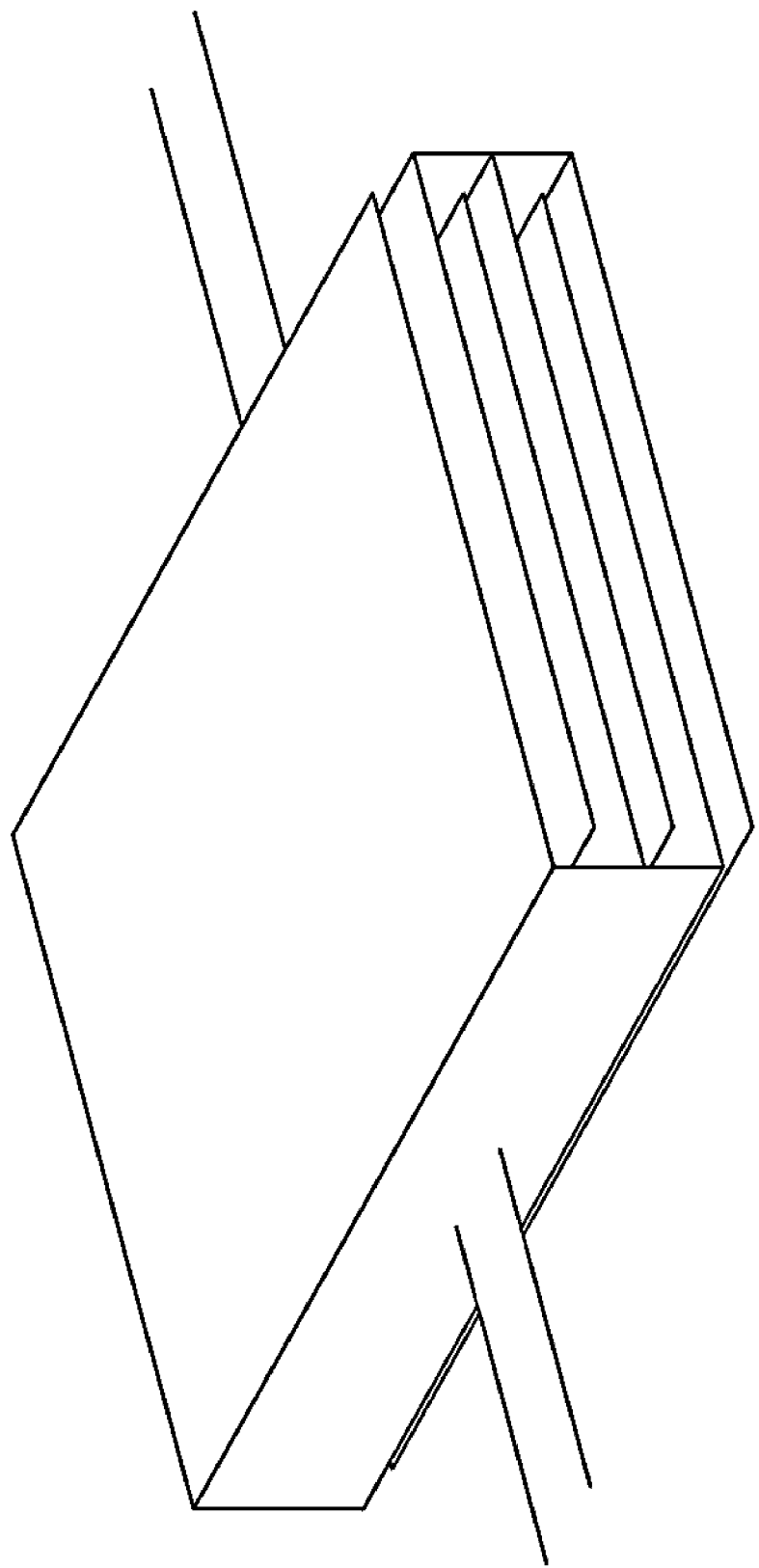

An illustration of metal pins embedded in a substrate can be seen in FIG. 26, which shows a substrate 2605 and metal pins 2610 embedded in substrate 2605. A microstrip antenna may be positioned on top of, and abutting, substrate 2605. Through 3D printing the capacitive coupling for the feedline could be increased to reduce the return loss to improve the efficiency of the antenna. A planar interdigitated capacitor can be seen in FIG. 27 between the coupling apertures. The interdigitated fingers of the capacitor store electrical energy through a buildup of voltage between the fingers. This storage of electrical energy increases capacitance. With a planar design as shown there is a limit to the surface area and thus potential electric energy that can be stored between the fingers. This shape could be extended in three dimensions for greater capacitance. Some examples of how the interdigitated capacitor could be extended to 3 dimensions can be seen in FIGS. 28, 29, and 30. FIG. 28 shows example interdigitated fingers having the form factor of a relatively thin film or sheet. FIG. 29 shows example interdigitated fingers similar to those of FIG. 28, with a difference being that the fingers in FIG. 29 are relatively thicker than the fingers of FIG. 28. FIG. 30 shows example interleaved sheets. By adapting these new shapes there is more surface area between each of the fingers in the capacitor which allows for more electrical energy storage and increased capacitance.

What is claimed is:
1. An antenna comprising:
i) a first phase comprising at least one polymer;
ii) a second phase comprising at least one first component; and, iii) an interface between the first phase and the second phase, wherein the interface has a concentration gradient of the at least one first component, whereby the concentration of the at least one first component decreases with distance away from the second phase towards the first phase, wherein the at least one first component comprises at least one functional component, at least one functional precursor component, or combinations thereof, and the at least one first component, in combination with the at least one polymer, has a high dielectric constant and/or a low dielectric loss tangent, wherein the antenna is a functional antenna, a functional precursor antenna, or a combination of a functional and functional precursor antenna.

2. The antenna of claim 1, wherein the antenna is one or more of a planar antenna, a 3D printed antenna suspended in air, a Vivaldi antenna, a low loss suspended antenna, a conformal helical antenna, an electrically small suspended antenna coil, a 3D suspended antenna feeding surface integrated waveguide (SIR network, an Ultra-Large Arrays (ULA) of antennas, a Frequency Selective Structures (FSS), a 3D suspended Metasurface and a conformal 3D reflect array.

3. The antenna of claim 1, wherein the dielectric constant is in a range of 1 to 5 and the dielectric loss tangent is in a range of 0.0001 to 0.05, and the antenna has a gain in a range of 0 to 6 dB, a dielectric loss in a range of 0 to 10% and a tunable permittivity in a range of 1 to 5.

4. The antenna of claim 1, wherein the at least one first component comprises said at least one functional component and the antenna is the functional antenna.

5. The antenna of claim 1, wherein the antenna is multifunctional and/or is a precursor to being multifunctional, and the antenna is tunable post fabrication in real time.

6. The antenna of claim 1, wherein the antenna comprises a functionally graded material (FGM).

7. The antenna of claim 1, wherein the at least one polymer together with the at least one first component is configured to act as a physical scaffold to a conductor material.

8. The antenna of claim 1, further comprising one or more of ceramic particles, a material to control permittivity, a ferroelectric material and an embedded conductive material.

9. The antenna of claim 1, wherein each of the first phase and the second phase comprise one or more of concentration gradients, composites and coatings.

10. The antenna of claim 1, wherein the at least two phases are two phases or three phases.

11. A method for making an antenna, the method comprising:
a) combining at least one first component and at least one polymerizable component to form a formulation having a high dielectric constant and/or a low dielectric loss tangent; and
b) polymerizing the at least one polymerizable component to form at least one polymer, wherein at least two phases are formed from the at least one first component and the at least one polymer,
wherein the at least one first component comprises at least one functional component, at least one functional precursor component, or combinations thereof, and
wherein the antenna is a functional antenna, a functional precursor antenna, or a combination of a functional and functional precursor antenna.

12. The method of claim 11, wherein the dielectric constant is in a range of 1 to 5 and the dielectric loss tangent is in a range of 0.0001 to 0.05, and the formulation has a gain in a range of 0 to 6 dB, a dielectric loss in a range of 0 to 10% and a tunable permittivity in a range of 1 to 5.

13. The method of claim 11, wherein the formulation is a substantially homogeneous mixture and comprises a photoinitiator, and the polymerizing is accomplished by photopolymerization during 2D or 3D printing.

14. The method of claim 13, wherein the photopolymerization is during stereolithographic (SLA) printing, digital light processing (DLP) or volumetric 3D printing.

15. The method of claim 11, further comprising sintering and/or pyrolyzing the antenna, wherein the sintering is at least one of thermal sintering, UV-VIS radiation sintering and laser sintering.

16. The method of claim 11, wherein the at least one polymerizable component comprises one or more of at least one monomer, at least one oligomer and at least one resin.

17. The method of claim 16, wherein the at least one polymerizable component comprises an acrylate and the formulation further comprises at least one cross-linking agent.

18. The method of claim 17, wherein molar concentration of the at least one crosslinking agent is less than about 35% and the at least one polymerizable component and the at least one first component diffuse towards a surface of the antenna to form an antenna comprising a coating.

19. The method of claim 17, wherein molar concentration of the at least one crosslinking agent is from 35% to 80% and the rate at which the at least one polymerizable component polymerizes is selected such that an antenna comprising a concentration gradient is formed.

20. The method of claim 11, wherein the at least one polymerizable component is in a composition with at least one ceramic precursor, and the at least one polymerizable component is present in the composition in an amount from 10% to 99% by weight based on the weight of the composition.

21. The method of claim 11, wherein the at least one first component comprises one or more of:
nanowires, microparticles, nanoparticles or combinations thereof;
ferroelectric materials, ferromagnetic materials, metal oxides, quantum dots or combinations thereof;
metal precursors, ceramic precursors, piezoelectric materials, graphene, carbon nanotubes (CNT), boron nitride nanotubes (BNNT), graphene, metal alloy precursors, metalloid precursors, porous polymers, polymer foams, conducting polymers or combinations thereof;
barium titanate, strontium titanate, barium strontium titanate, bismuth strontium calcium copper oxide, copper oxide, boron oxide, boron nitride, ferrite, lead zirconate titanate, manganese oxide, magnesium diboride, silicon nitride, steatite, titanium oxide, titanium carbide, yttrium barium copper oxide, zinc oxide, zirconium dioxide, partially stabilized zirconia, alumina, beryllia, ceria, zirconia, a metal carbide, a metal boride, a metal nitride, a metal silicide or composite materials thereof;
at least one functional monomer; and,
metal salts, metalloid salts, metal coordination compounds, organometallic compounds, organometalloid compounds or combinations thereof.

22. The method of claim 11, wherein the at least one first component comprises one or more of:
at least one fluorinated methacrylate;
transition metal carboxylates comprising 1 to 20 carbon atoms, metalloid carboxylates or combinations thereof.

23. The method of claim 22, wherein the at least one first component comprises the transition metal carboxylates comprising 1 to 20 carbon atoms,
   wherein the transition metal is selected from the group consisting of aluminum, silver, gold, platinum, titanium, and copper.

24. The method of claim 11, wherein the at least one first component is substantially soluble in the at least one polymerizable component and is substantially insoluble when the at least one polymerizable component polymerizes.

25. A formulation for making an antenna, the formulation comprising:
   a composition providing a high dielectric constant and/or a low dielectric loss tangent, the composition having at least one first component and at least one polymerizable component, the at least one polymerizable component being polymerizable to form at least one polymer,
   wherein at least two phases are formed from the at least one first component and the at least one polymer, wherein the at least one first component comprises at least one functional component, at least one functional precursor component, or combinations thereof,
   wherein the antenna is a functional antenna, a functional precursor antenna, or a combination of a functional and functional precursor antenna.

* * * * *